(12) United States Patent
Jeong et al.

(10) Patent No.: US 11,493,630 B2
(45) Date of Patent: Nov. 8, 2022

(54) LIDAR DEVICE

(71) Applicant: SOS LAB CO., LTD, Gwangju (KR)

(72) Inventors: Ji Seong Jeong, Gwangju (KR); Jun Hwan Jang, Seoul (KR); Dong Kyu Kim, Jinju-si (KR); Sung Ui Hwang, Jeollanam-do (KR); Gyeong Hwan Shin, Gwangju (KR); Bum Sik Won, Seoul (KR)

(73) Assignee: SOS LAB CO., LTD, Gwangju (KR)

( * ) Notice: Subject to any disclaimer, the term of this patent is extended or adjusted under 35 U.S.C. 154(b) by 501 days.

(21) Appl. No.: 16/718,345

(22) Filed: Dec. 18, 2019

(65) Prior Publication Data
US 2020/0124724 A1 Apr. 23, 2020

Related U.S. Application Data

(63) Continuation of application No. 16/140,272, filed on Sep. 24, 2018, now Pat. No. 10,591,598.
(Continued)

(30) Foreign Application Priority Data

Jan. 8, 2018 (KR) .................. 10-2018-0002494
Mar. 6, 2018 (KR) .................. 10-2018-0026560
(Continued)

(51) Int. Cl.
*G01S 17/08* (2006.01)
*G02B 5/09* (2006.01)
(Continued)

(52) U.S. Cl.
CPC .............. *G01S 17/08* (2013.01); *G02B 5/09* (2013.01); *G02B 26/101* (2013.01);
(Continued)

(58) Field of Classification Search
None
See application file for complete search history.

(56) References Cited

U.S. PATENT DOCUMENTS 3,944,323 A 3/1976 Starkweather
5,006,721 A 4/1991 Cameron et al.
(Continued)

FOREIGN PATENT DOCUMENTS

CN 101071285 A * 11/2007 ............. B41J 2/471
JP H 01-133017 A 5/1989
(Continued)

OTHER PUBLICATIONS

United States Office Action, U.S. Appl. No. 16/240,512, dated Jan. 13, 2021, 22 pages.
(Continued)

*Primary Examiner* — Hovhannes Baghdasaryan
(74) *Attorney, Agent, or Firm* — Fenwick & West LLP

(57) ABSTRACT

A light detection and ranging (lidar) device includes: a lower base; an upper base; a laser emitting unit for emitting a laser in a form of a point light source; a nodding mirror for transforming the laser in the form of the point light source to a line beam pattern which is perpendicular to the lower base, wherein the nodding mirror reflects the laser emitted from the laser emitting unit; a polygonal mirror for transforming the line beam pattern to a plane beam pattern and receiving a laser reflected from an object; and a sensor unit for receiving the laser reflected from the object via the polygonal mirror.

16 Claims, 44 Drawing Sheets

Related U.S. Application Data

(60) Provisional application No. 62/671,305, filed on May 14, 2018.

(30) Foreign Application Priority Data

| | | |
|---|---|---|
| Mar. 8, 2018 | (KR) | ......................... 10-2018-0027385 |
| Jul. 13, 2018 | (KR) | ......................... 10-2018-0081897 |
| Jul. 13, 2018 | (KR) | ......................... 10-2018-0081898 |
| Aug. 27, 2018 | (KR) | ......................... 10-2018-0100701 |

(51) Int. Cl.
  *G02B 27/09* (2006.01)
  *G02B 26/10* (2006.01)
  *G02B 26/12* (2006.01)

(52) U.S. Cl.
  CPC ............ *G02B 26/105* (2013.01); *G02B 26/12* (2013.01); *G02B 27/0955* (2013.01)

(56) References Cited

U.S. PATENT DOCUMENTS

| | | | |
|---|---|---|---|
| 5,268,565 | A | 12/1993 | Katoh et al. |
| 5,493,388 | A | 2/1996 | Adachi |
| 6,104,524 | A | 8/2000 | Hisano et al. |
| 6,304,321 | B1 | 10/2001 | Wangler et al. |
| 6,317,202 | B1 | 11/2001 | Hosokawa et al. |
| 8,619,237 | B2 | 12/2013 | Hillman et al. |
| 10,324,170 | B1 * | 6/2019 | Engberg, Jr ............ G01S 17/89 |
| 2003/0043364 | A1 | 3/2003 | Jamieson et al. |
| 2004/0036630 | A1 | 2/2004 | Jamieson et al. |
| 2005/0173770 | A1 | 8/2005 | Linden et al. |
| 2005/0179976 | A1 | 8/2005 | Davis et al. |
| 2005/0219504 | A1 | 10/2005 | Adachi et al. |
| 2005/0280879 | A1 | 12/2005 | Gibson et al. |
| 2006/0169880 | A1 | 8/2006 | Asai |
| 2007/0071056 | A1 | 3/2007 | Chen |
| 2008/0174845 | A1 * | 7/2008 | Shikii .................. G02B 26/123 |
| | | | 359/226.1 |
| 2009/0073417 | A1 | 3/2009 | Urata et al. |
| 2010/0002278 | A1 | 1/2010 | Maeno et al. |
| 2014/0078514 | A1 | 3/2014 | Zhu |
| 2015/0131080 | A1 | 5/2015 | Retterath et al. |
| 2016/0341399 | A1 | 11/2016 | Raz et al. |
| 2017/0287151 | A1 | 10/2017 | Han et al. |
| 2018/0039102 | A1 | 2/2018 | Baik et al. |
| 2018/0059221 | A1 | 3/2018 | Slobodyanyuk et al. |
| 2018/0120434 | A1 | 5/2018 | Jeong et al. |
| 2018/0129866 | A1 | 5/2018 | Hicks et al. |
| 2018/0284237 | A1 | 10/2018 | Campbell et al. |
| 2019/0025409 | A1 | 1/2019 | Kawazoe et al. |
| 2019/0154816 | A1 | 5/2019 | Hughes et al. |
| 2020/0241118 | A1 | 7/2020 | Jeong et al. |

FOREIGN PATENT DOCUMENTS

| | | |
|---|---|---|
| JP | H 01-262520 A | 10/1989 |
| JP | H 03-2512 A | 1/1991 |
| JP | H 06-078924 B2 | 10/1994 |
| JP | H08184673 A | 7/1996 |
| JP | H 09-274076 A | 10/1997 |
| JP | H 11-006973 A | 1/1999 |
| JP | H 11-072517 A | 3/1999 |
| JP | 2000-009422 A | 1/2000 |
| JP | 2003-121546 A | 4/2003 |
| JP | 2005-024894 A | 1/2005 |
| JP | 2005-107070 A | 4/2005 |
| JP | 2005-227219 A | 8/2005 |
| JP | 2007-088601 A | 4/2007 |
| JP | 2007-525025 A | 8/2007 |
| JP | 2008-033135 A | 2/2008 |
| JP | 2008-298520 A | 12/2008 |
| JP | 2010-014680 A | 1/2010 |
| JP | 2010-038859 A | 2/2010 |
| JP | 2010-060309 A | 3/2010 |
| JP | 2010-071725 A | 4/2010 |
| JP | 2011-203122 A | 10/2011 |
| JP | 2011-257193 A | 12/2011 |
| JP | 2011-257221 A | 12/2011 |
| JP | 2012-117996 A | 6/2012 |
| JP | 2014-006110 A | 1/2014 |
| JP | 2014-020889 A | 2/2014 |
| JP | 2014-032149 A | 2/2014 |
| JP | 2014-071029 A | 4/2014 |
| JP | 2014-071038 A | 4/2014 |
| JP | 2014-115182 A | 6/2014 |
| JP | 2014-161899 A | 9/2014 |
| JP | 2014-235075 A | 12/2014 |
| JP | 2015-178975 A | 10/2015 |
| JP | 2016-033482 A | 3/2016 |
| JP | 2016-035411 A | 3/2016 |
| JP | 6090433 B2 | 3/2017 |
| JP | 2017-090144 A | 5/2017 |
| JP | 2017-150990 A | 8/2017 |
| KR | 0136171 B1 | 1/1998 |
| KR | 1998-050810 U | 10/1998 |
| KR | 10-0278806 B1 | 2/2001 |
| KR | 2001-0081616 A | 8/2001 |
| KR | 2001-0090649 A | 10/2001 |
| KR | 10-2004-0091500 A | 10/2004 |
| KR | 10-2006-0080359 A | 7/2006 |
| KR | 10-2009-0092609 A | 9/2009 |
| KR | 10-2011-0061787 A | 6/2011 |
| KR | 10-2011-0075755 A | 7/2011 |
| KR | 10-2011-0131789 A | 12/2011 |
| KR | 10-2012-0001321 A | 1/2012 |
| KR | 10-2012-0096941 A | 8/2012 |
| KR | 10-2013-0010956 A | 1/2013 |
| KR | 10-2014-0025041 A | 3/2014 |
| KR | 10-2015-0004743 A | 1/2015 |
| KR | 10-2016-0096454 A | 8/2016 |
| KR | 10-1687994 B1 | 12/2016 |
| KR | 10-2017-0063196 A | 6/2017 |
| KR | 10-2017-0069702 A | 6/2017 |
| KR | 10-2017-0071181 A | 6/2017 |
| KR | 10-2017-0104879 A | 9/2017 |
| KR | 10-2017-0114242 A | 10/2017 |
| KR | 10-2017-0135415 A | 12/2017 |
| KR | 10-2018-0008655 A | 1/2018 |
| KR | 10-2018-0011453 A | 2/2018 |
| KR | 10-2018-0015489 A | 2/2018 |
| KR | 10-2018-0029585 A | 3/2018 |
| KR | 10-2018-0032709 A | 4/2018 |
| KR | 10-2018-0046081 A | 5/2018 |
| KR | 10-1887477 B1 | 8/2018 |
| WO | WO 2017/168500 A1 | 10/2017 |

OTHER PUBLICATIONS

Korean Intellectual Property Office, Notice of Allowance, Korean Patent Application No. 10-2018-0002494, dated Nov. 22, 2019, five pages.

Korean Intellectual Property Office, Notice of Allowance, Korean Patent Application No. 10-2018-0143973, dated Jul. 31, 2019, three pages (with concise explanation of relevance).

Korean Intellectual Property Office, Office Action, Korean Patent Application No. 10-2018-0027385, dated Jul. 7, 2019, 7 pages (with concise explanation of relevance).

Korean Intellectual Property Office, Notice of Allowance, Korean Patent Application No. 10-2018-0095385, dated May 30, 2019, 3 pages (with concise explanation of relevance).

Korean Intellectual Property Office, Notice of Allowance, Korean Patent Application No. 10-2018-0081898, dated Apr. 16, 2019, 4 pages (with concise explanation of relevance).

Korean Intellectual Property Office, Notice of Allowance, Korean Patent Application No. 10-2018-0081896, dated Apr. 16, 2019, 3 pages (with concise explanation of relevance).

Korean Intellectual Property Office, Notice of Allowance, Korean Patent Application No. 10-2018-0100701, dated Mar. 29, 2019, 3 pages.

(56) References Cited

OTHER PUBLICATIONS

Korean Intellectual Property Office, Notice of Allowance, Korean Patent Application No. 10-2018-0126278, dated Feb. 28, 2019, 3 pages.
Korean Intellectual Property Office, Notice of Allowance, Korean Patent Application No. 10-2018-0081897, dated Feb. 1, 2019, 5 pages.
Korean Intellectual Property Office, Notice of Allowance, Korean Patent Application No. 10-2018-0099340, dated Jan. 1, 2019, 7 pages (with concise explanation of relevance).
Korean Intellectual Property Office, Notice of Allowance, Korean Patent Application No. 10-2018-0120184, dated Nov. 21, 2018, 6 pages (with concise explanation of relevance).
Korean Intellectual Property Office, Office Action, Korean Patent Application No. 10-2018-0026560, dated Nov. 19, 2019, 12 pages.
Korean Intellectual Property Office, Office Action, Korean Patent Application No. 10-2018-0143975, dated Sep. 23, 2019, 10 pages (with concise explanation of relevance).
Korean Intellectual Property Office, Office Action, Korean Patent Application No. 10-2018-0002494, dated Jun. 2, 2019, 6 pages (with concise explanation of relevance).
Korean Intellectual Property Office, Office Action, Korean Patent Application No. 10-2018-0143972, dated Feb. 7, 2019, 11 pages (with concise explanation of relevance).
Korean Intellectual Property Office, Office Action, Korean Patent Application No. 10-2018-0143974, dated Jan. 30, 2019, 9 pages (with concise explanation of relevance).
Korean Intellectual Property Office, Office Action, Korean Patent Application No. 10-2018-0126278, dated Dec. 19, 2018, 6 pages (with concise explanation of relevance).
Korean Intellectual Property Office, Office Action, Korean Patent Application No. 10-2018-0081898, dated Dec. 18, 2018, 5 pages (with concise explanation of relevance).
Korean Intellectual Property Office, Office Action, Korean Patent Application No. 10-2018-0081896, dated Dec. 14, 2018, 5 pages (with concise explanation of relevance).
Korean Intellectual Property Office, Office Action, Korean Patent Application No. 10-2018-0095385, dated Nov. 26, 2018, 6 pages (with concise explanation of relevance).
Korean Intellectual Property Office, Office Action, Korean Patent Application No. 10-2018-0100701, dated Nov. 26, 2018, 6 pages (with concise explanation of relevance).
Korean Intellectual Property Office, Office Action, Korean Patent Application No. 10-2018-0081897, dated Nov. 1, 2018, 11 pages (with concise explanation of relevance).
United States Office Action, U.S. Appl. No. 16/140,272, dated Apr. 8, 2019, 9 pages.
Korean Intellectual Property Office, Notice of Allowance, Korean Patent Application No. 10-2018-0143975, dated Aug. 4, 2020, four pages.
Korean Intellectual Property Office, Notice of Allowance, Korean Patent Application No. 10-2018-0027385, dated Aug. 4, 2020, three pages.
European Patent Office, Extended European Search Report, European Patent Application No. 18898056.9, dated Sep. 10, 2021, eight pages.
PCT International Search Report and Written Opinion, PCT Application No. PCT/KR2018/014921, dated Mar. 6, 2019, 22 pages.
PCT International Search Report and Written Opinion, PCT Application No. PCT/KR2018/014923, dated Mar. 6, 2019, 19 pages.
Korean Intellectual Property Office, Grant of Patent, Korean Patent Application No. 10-2018-0026560, dated Nov. 23, 2020, five pages.

* cited by examiner

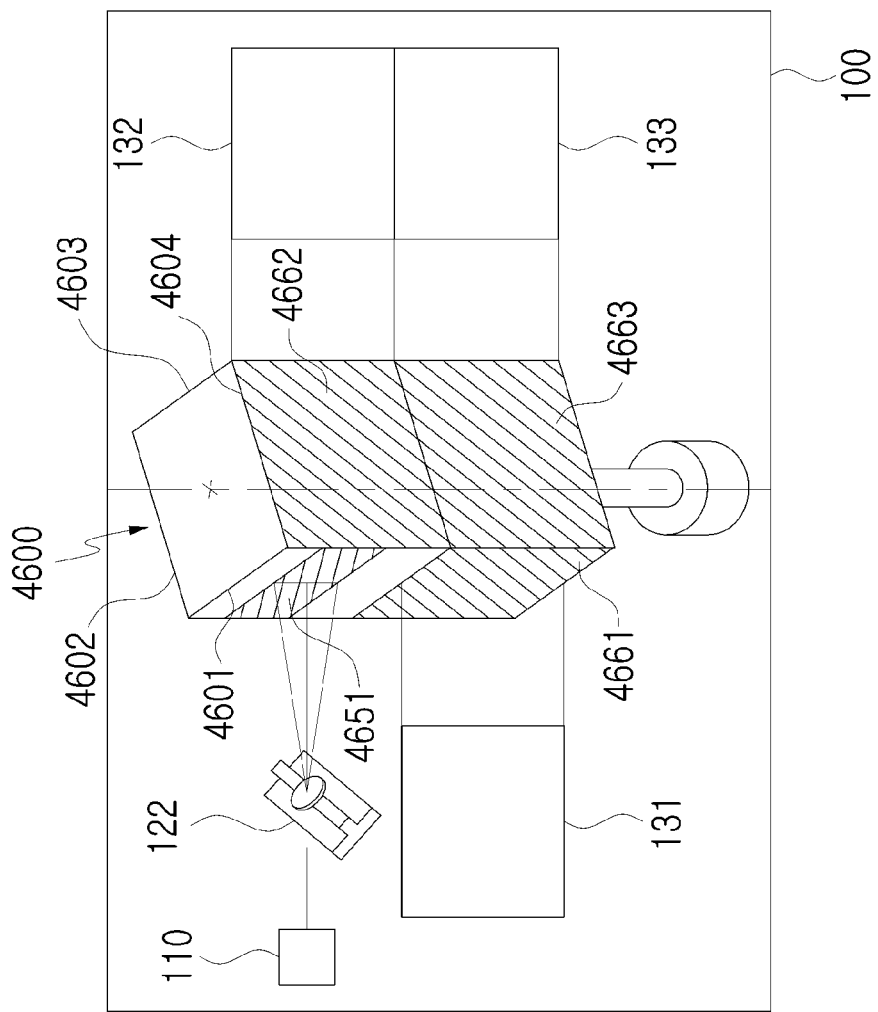

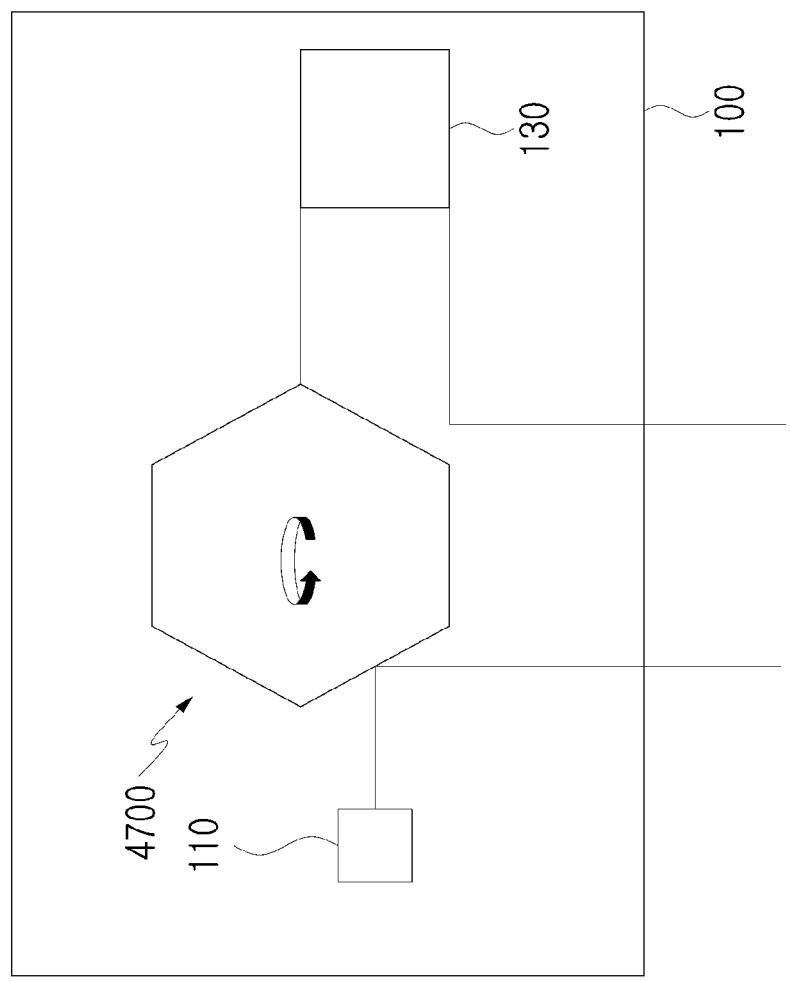

LIDAR DEVICE

CROSS-REFERENCE TO RELATED APPLICATIONS

This application is a continuation of U.S. patent application Ser. No. 16/140,272 filed on Sep. 24, 2018, which claims priority to and the benefit of Republic of Korea Patent Application No. 10-2018-0081897, filed on Jul. 13, 2018, Republic of Korea Patent Application No. 10-2018-0081898, filed on Jul. 13, 2018, and Republic of Korea Patent Application No. 10-2018-0100701, filed on Aug. 27, 2018, Republic of Korea Patent Application No. 10-2018-0002494, filed on Jan. 8, 2018, Republic of Korea Patent Application No. 10-2018-0026560, filed on Mar. 6, 2018, Republic of Korea Patent Application No. 10-2018-0027385, filed on Mar. 8, 2018, and U.S. provisional patent application No. 62/671,305, filed on May 14, 2018, the disclosures of which are incorporated herein by reference in their entirety.

TECHNICAL FIELD

The present disclosure relates to a Light Detection And Ranging (LiDAR) device which obtains ambient distance information by using a laser, and more particularly, to a lidar device which projects a laser toward an ambient object, senses the laser reflected by the object, and obtains traveling time information of the laser through measuring a laser emitting time and a laser sensing time so as to obtain distance information from the object.

BACKGROUND

Light detection and ranging (lidar) is a technology that measures a distance to an object by projecting a laser toward the object and receiving the reflected laser. As a method of measuring a distance in the lidar technology, a time of flight (TOF) which uses a flight time of laser light, a triangulation method which calculates a distance according to a position of a received laser according to a position of a received laser, and the like are used.

The triangulation method measures a distance with respect to a wide range at once mainly by using a flash laser, but has low accuracy, therefore lidar, to which the TOF method capable of performing relatively high definition/high resolution measurement with respect to a long distance, is used as a distance sensor for autonomous vehicles which have recently taken center stage as a significant application field for lidar.

Measurement distance, heat suppression, size reduction, and the like have emerged as main technical issues of lidar using the TOF method. To overcome the issues, a variety of research has been performed.

SUMMARY

The present disclosure is directed to providing improvement in performance of a light detection and ranging (lidar) device by structurally overcoming heat of the lidar device.

The present disclosure is also directed to increasing a measurable distance of a lidar device by increasing a gain of laser light reflected by an object through arrangement of components of the lidar device.

The present disclosure is also directed to sensing an object using minimum power consumption by increasing a gain of laser light reflected by the object.

The present disclosure is also directed to miniaturizing a lidar device through arrangement of components of the lidar device.

The present disclosure is also directed to dissipating heat of a lidar device by rotating a cooling fan using rotating force provided by a rotating polygonal mirror without an additional driving unit.

The present disclosure is also directed to minimizing interference between laser beams by separating a projecting portion for projecting a laser to an object from a receiving portion for receiving the laser reflected by the object among reflecting surfaces of a rotating polygonal mirror.

The present disclosure is also directed to obtaining a distance of a long-range object using minimum power consumption by using a plurality of lasers having different wavelengths.

An aspect of the present disclosure is directed to a lidar device. The device may include a lower base having a flat plate shape, an upper base disposed to face the lower base; a laser emitting unit for emitting a laser in a form of a point light source, wherein the laser emitting unit is disposed on the upper base; a nodding mirror for transforming the laser in the form of the point light source to a line beam pattern which is perpendicular to the lower base by being rotated along a first axis parallel to the lower base, wherein the nodding mirror is located below the laser emitting unit and reflects the laser emitted from the laser emitting unit; a polygonal mirror for transforming the line beam pattern to a plane beam pattern by being rotated along a second axis perpendicular to the lower base and receiving a laser reflected from an object, wherein the polygonal mirror is disposed on the lower base; and a sensor unit for receiving the laser reflected from the object via the polygonal mirror, wherein the sensor unit is located below the nodding mirror.

Another aspect of the present disclosure is directed to a lidar device. The device may include a laser emitting unit which emits a laser in the form of a point light source; a nodding mirror which reflects the laser received from the laser emitting unit while nodding along a horizontal axis so as to transform the laser in the form of the point light source to a line beam pattern; a polygonal mirror which transforms the laser in the form of the line beam pattern to a plane beam pattern by rotating along a vertical axis and receives the laser reflected by an object; and a sensor unit which receives the laser reflected by the object via the polygonal mirror, wherein when viewed from above, a first light path from the laser emitting unit to the nodding mirror, a second optical path from the nodding mirror to the polygonal mirror, and a third light path from the polygonal mirror to the sensor unit are located on one straight line.

Yet another aspect of the present disclosure is directed to a lidar device. The device may include a laser emitting unit which emits a laser in the form of a point light source; a nodding mirror which reflects the laser received from the laser emitting unit while nodding along a horizontal axis so as to transform the laser in the form of the point light source to a line beam pattern; a polygonal mirror which transforms the laser in the form of the line beam pattern to a plane beam pattern by rotating along a vertical axis and receives the laser reflected by an object; and a sensor unit which receives the laser reflected by the object via the polygonal mirror, wherein when viewed from the side, the laser emitting unit is disposed above the nodding mirror, and the sensor unit is disposed below the nodding mirror.

Still yet another aspect of the present disclosure is directed to a lidar device. The device may include a laser emitting unit which emits a laser; a laser dissipation unit for dissipating waste heat generated by the laser emitting unit; a rotating polygonal mirror which has a polygonal cylinder shape with a through hole formed therein, rotates along a rotational axis, reflects the laser emitted by the laser emitting unit toward an object, and is disposed in an area adjacent to the laser dissipation unit; and a cooling fan which is installed on the rotating polygonal mirror and generates an air current which passes through the through hole and moves toward the laser dissipation unit.

Further still another aspect of the present disclosure is directed to a lidar device. The device may include a lower base having a flat plate shape; an upper base disposed to face the lower base; a laser emitting unit for emitting a laser, wherein the laser emitting unit is disposed on the upper base; a heat dissipating unit for dissipating heat generated from the laser emitting unit; a polygonal mirror for rotating along a rotation axis and reflecting the laser emitted from the laser emitting unit to an object, the polygonal mirror having a polygonal cylinder shape forming a through hole, wherein the polygonal mirror is disposed on the lower base and adjacent to the heat dissipating unit; cooling fan for generating an airflow passing through the through hole, wherein the cooling fan is located in the polygonal mirror;

Further still another aspect of the present disclosure is directed to a rotating polygonal mirror which has a polygonal cylinder shape, rotates along a rotational axis, and reflects a laser provided from one side toward an object. The rotating polygonal mirror may include a first surface which is parallel to the rotational axis; a second surface which shares one side with the first surface and is parallel to the rotational axis; a through hole which is formed in the rotating polygonal mirror, has a cylindrical shape, and has the rotational axis as a central axis; and a cooling fan which is installed in the through hole and generates an air current which passes through the through hole.

Further still another aspect of the present disclosure is directed to a lidar device. The device may include a laser emitting unit for emitting a laser; a first scanning unit for expanding a projection area of the laser to have a line shape by changing a travel path of the laser continuously emitted from the laser emitting unit; a second scanning unit for expanding the projection area of the laser to have a plane shape by changing the travel path of the laser continuously reflected from the first scanning unit; a sensor unit for detecting the laser reflected from an object located in a scanning area; wherein the second scanning unit includes a rotating polygonal mirror which rotates along an axis and expands the projection area to have the plane shape by changing, along a horizontal direction, the travel path of the laser of which the projection area is the line shape, the line shape being formed along a vertical direction, wherein the rotating polygonal mirror includes a projecting portion for reflecting the laser acquired from the first scanning unit and a receiving portion for reflecting the laser reflected from the object located in the scanning area toward the sensor unit, wherein the projecting portion and the receiving portion of the rotating polygonal mirror are disposed on different reflection surfaces of the rotating polygonal mirror.

Further still another aspect of the present disclosure is directed to a lidar device. The device may include a laser emitting unit which emits a laser; a first scanning unit which obtains the laser emitted by the laser emitting unit and continuously changes a travel path of the laser so as to extend a projection area to a linear shape; a second scanning unit which obtains and continuously changes the laser projected by the first scanning unit which has a linear projection area, so as to extend the projection area to a surface shape; a first sensor unit which senses a laser reflected by an object located in a scanning area; and a second sensor unit which is disposed in a different position from that of the first sensor unit and senses the laser reflected by the object located in the scanning area, wherein the second scanning unit comprises a rotating polygonal mirror which changes a travel path of a laser having a perpendicular linear projection area by rotating on one axis so as to extend the projection area to a surface shape, wherein the rotating polygonal mirror comprises a projecting portion which obtains and reflects the laser projected by the first scanning unit toward the scanning area, a first receiving portion which obtains and reflects the laser reflected by the object located in the scanning area toward the first sensor unit, and a second receiving portion which obtains and reflects the laser reflected by the object located in the scanning area toward the second sensor unit, and wherein the projecting portion and the first receiving portion of the rotating polygonal mirror are located on the same reflecting surface of the rotating polygonal mirror, and the second receiving portion is located on a different reflecting surface from that of the projecting portion and the first receiving portion.

Further still another aspect of the present disclosure is directed to a lidar device. The device may include a laser emitting unit which emits a laser; a rotating polygonal mirror which obtains the laser emitted by the laser emitting unit and continuously changes a travel path so as to extend a projection area; and a sensor unit which senses a laser reflected by an object located in a scanning area, wherein the rotating polygonal mirror comprises a projecting portion which obtains and reflects the laser emitted by the laser emitting unit toward the scanning area and a receiving portion which obtains and reflects the laser reflected by the object located in the scanning area toward the sensor unit, and wherein in a case in which the number of reflecting surfaces of the rotating polygonal mirror is N, when the projecting portion of the rotating polygonal mirror is located on a first reflecting surface, the receiving portion of the rotating polygonal mirror is located in an Nth reflecting surface, and when the projecting portion of the rotating polygonal mirror is located on an Mth reflecting surface (here, M is a natural number satisfying 1<M≤N), the receiving portion of the rotating polygonal mirror is located on an M−1th reflecting surface.

Aspects of the present disclosure will not be limited to the above-described aspects, and unstated aspects can be clearly understood by those skilled in the art through the specification and the attached drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 43 is a view illustrating a projecting portion and a receiving portion of a rotating polygonal mirror of the lidar device including a plurality of sensor units according to another embodiment; and FIG. 44 is a view illustrating a rotating polygonal mirror which projects and receives lasers using reflecting surfaces which are not adjacent to each other according to one embodiment.

DETAILED DESCRIPTION

Figure 1:
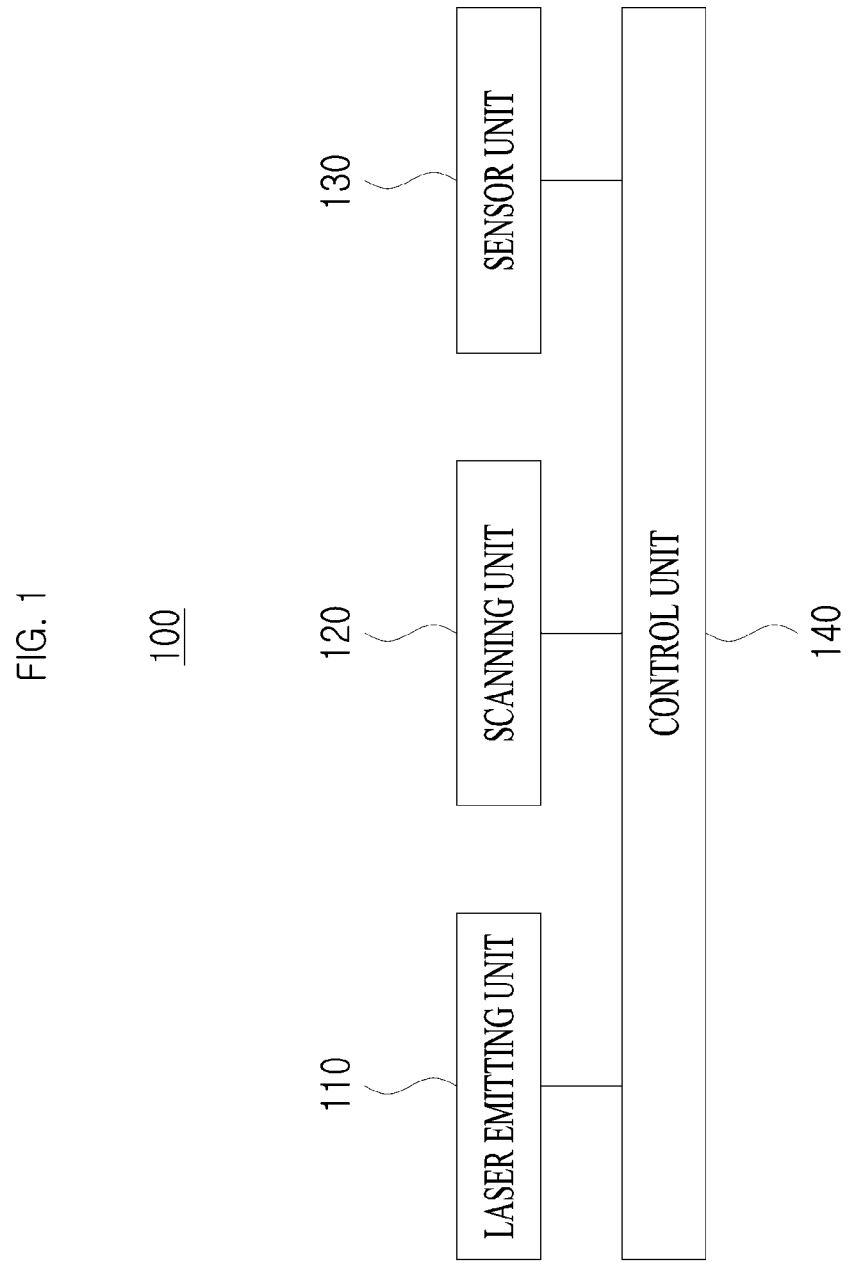
FIG. 1 is a block diagram of a light detection and ranging (lidar) device according to one embodiment.

The above-described objects, features, and advantages of the present disclosure will be more apparent through the following detailed description with reference to the attached drawings. However, since a variety of modifications and a variety of embodiments of the present disclosure may be made, hereinafter, particular embodiments are illustrated in the drawings and will be described in detail.

Throughout the drawings, thicknesses of layers and areas may be exaggerated for clarity. Designation of an element or a layer as being on "on" another element or layer includes not only a case of being directly on the other element or layer but also a case of an intervening layer or element being present therebetween. Throughout the specification, like reference numerals basically refer to like elements. Elements in the drawings with respect to each of embodiments which have the same function within the equal conceptual scope will be described as being referred to as like reference numerals.

A detailed description of well-known functions or components of the related art will be omitted when it is deemed to obscure the essence of the present disclosure. Also, ordinal numbers used herein (for example, a first, a second, and the like) are merely identification symbols for distinguishing one component from another component.

Also, the terms "module" and "unit" related to components used herein are given or mixedly used in consideration of only convenience of drafting the specification and do not have mutually distinguishable meanings or functions in and of themselves.

According to one embodiment, a light detection and ranging (lidar) device comprising: a lower base having a flat plate shape; an upper base disposed to face the lower base; a laser emitting unit for emitting a laser in a form of a point light source, wherein the laser emitting unit is disposed on the upper base; a nodding mirror for transforming the laser in the form of the point light source to a line beam pattern which is perpendicular to the lower base by being rotated along a first axis parallel to the lower base, wherein the nodding mirror is located below the laser emitting unit and reflects the laser emitted from the laser emitting unit; a polygonal mirror for transforming the line beam pattern to a plane beam pattern by being rotated along a second axis perpendicular to the lower base and receiving a laser reflected from an object, wherein the polygonal mirror is disposed on the lower base; and a sensor unit for receiving the laser reflected from the object via the polygonal mirror, wherein the sensor unit is located below the nodding mirror may be provided.

Herein, the upper base may comprise a through hole formed from a top to a bottom of the upper base so as to allow a laser emitted by the laser emitting unit to pass therethrough.

Herein, the lidar device may further comprise a flat mirror which is disposed on the upper base and reflects a laser emitted by the laser emitting unit toward the nodding mirror.

Herein, the nodding mirror may include at least one of a MEMS mirror, a resonant mirror and a galvano mirror.

Herein, the number of side-surfaces of the polygonal mirror may be n, where n is natural number which is greater than 1

Herein, the nodding mirror may be related to a vertical scan, and the polygonal mirror is related to a horizontal scan.

Herein, a rotating rate of the nodding mirror may be greater than the rotating rate of the polygonal mirror.

Herein, a range of the vertical scan may be greater than 30 degrees and a range of the horizontal scan is greater than 120 degrees.

According to another embodiment, a light detection and ranging (lidar) device comprising: a laser emitting unit which emits a laser in the form of a point light source; a nodding mirror which reflects the laser received from the laser emitting unit while nodding along a horizontal axis so as to transform the laser in the form of the point light source to a line beam pattern; a polygonal mirror which transforms the laser in the form of the line beam pattern to a plane beam pattern by rotating along a vertical axis and receives the laser reflected by an object; and a sensor unit which receives the laser reflected by the object via the polygonal mirror, wherein when viewed from above, a first light path from the laser emitting unit to the nodding mirror, a second optical path from the nodding mirror to the polygonal mirror, and a third light path from the polygonal mirror to the sensor unit are located on one straight line may be provided.

Herein, when viewed from above, the laser emitting unit and the nodding mirror may be located on one straight line, and wherein a distance between the vertical axis and the one straight line may be smaller than a rotational radius of the polygonal mirror so as to allow the polygonal mirror to receive the laser reflected by the nodding mirror.

Herein, the lidar device may further comprise a condensing lens which is installed between the polygonal mirror and the sensor unit and obtains the laser reflected by the object via the polygonal mirror.

Herein, when one surface of the polygonal mirror which is closest to the condensing lens is perpendicular to a central axis of the condensing lens, the central axis of the condensing lens may meet an end of the one surface.

Herein, when an angle between one surface of the polygonal mirror which is closest to the condensing lens and a central axis of the condensing lens is 45 degrees, the central axis of the condensing lens may pass through a center of the one surface.

Herein, when an angle between one surface of the polygonal mirror which is closest to the condensing lens and a central axis of the condensing lens is 15 degrees, the central axis of the condensing lens may pass through a center of the one surface.

Herein, the laser emitting unit, the nodding mirror, and the sensor unit may be arranged on the same plane.

Herein, a distance between the vertical axis and the same plane may be smaller than a rotational radius of the polygonal mirror so as to allow the polygonal mirror to receive the laser reflected by the nodding mirror.

Herein, the distance between the vertical axis and the same plane may be smaller than the rotational radius of the polygonal mirror and greater than half the rotational radius.

According to another embodiment, a light detection and ranging (lidar) device comprising: a laser emitting unit which emits a laser in the form of a point light source; a nodding mirror which reflects the laser received from the laser emitting unit while nodding along a horizontal axis so as to transform the laser in the form of the point light source to a line beam pattern; a polygonal mirror which transforms the laser in the form of the line beam pattern to a plane beam pattern by rotating along a vertical axis and receives the laser reflected by an object; and a sensor unit which receives the laser reflected by the object via the polygonal mirror, wherein when viewed from the side, the laser emitting unit is disposed above the nodding mirror, and the sensor unit is disposed below the nodding mirror may be provided.

Herein, the laser emitting unit may comprise a light source unit which generates a laser, a laser driver which controls the light source unit, and a laser dissipation unit for dissipating heat of the laser driver, wherein the sensor unit may be comprise a sensing unit which senses a received laser and a sensor dissipation unit for dissipating heat of the sensing unit, and wherein when viewed from above, the laser dissipation unit is disposed above one side of the nodding mirror, and the sensor dissipation unit is disposed below the other side of the nodding mirror.

Herein, the lidar device may further comprise a signal block unit installed between the laser emitting unit and the sensor unit so as to prevent signal interference between the laser emitting unit and the sensor unit.

According to another embodiment, a light detection and ranging (lidar) device comprising: a laser emitting unit which emits a laser; a laser dissipation unit for dissipating waste heat generated by the laser emitting unit; a rotating polygonal mirror which has a polygonal cylinder shape with a through hole formed therein, rotates along a rotational axis, reflects the laser emitted by the laser emitting unit toward an object, and is disposed in an area adjacent to the laser dissipation unit; and a cooling fan which is installed on the rotating polygonal mirror and generates an air current which passes through the through hole and moves toward the laser dissipation unit may be provided.

Herein, the laser dissipation unit may be disposed on the rotational axis of the rotating polygonal mirror.

Herein, the laser emitting unit may be inserted into the through hole.

Herein, the through hole may have a cylindrical shape.

Herein, the cooling fan may be coupled to the rotating polygonal mirror and integrally rotates with the rotating polygonal mirror along the rotational polygonal mirror.

Herein, the cooling fan may be installed in the through hole.

Herein, the lidar device may further comprise a driving unit which provides the rotating polygonal mirror with a rotating force; and a rotating force transfer unit which transfers the rotating force provided by the driving unit to the cooling fan, wherein the cooling fan rotates along the rotational axis of the rotating polygonal mirror by using the transferred rotating force.

Herein, the cooling fan rotates in a direction opposite to that of the rotating polygonal mirror.

Herein, the lidar device may further comprise a driving unit which provides the cooling fan with a rotating force, wherein the cooling fan rotates using the provided rotating force, is coupled to the rotating polygonal mirror, and integrally rotates with the rotating polygonal mirror along the rotational axis of the rotating polygonal mirror.

According to another embodiment, a light detection and ranging (lidar) device comprising: a lower base having a flat plate shape; an upper base disposed to face the lower base; a laser emitting unit for emitting a laser, wherein the laser emitting unit is disposed on the upper base; a heat dissipating unit for dissipating heat generated from the laser emitting unit; a polygonal mirror for rotating along a rotation axis and reflecting the laser emitted from the laser emitting unit to an object, the polygonal mirror having a polygonal cylinder shape forming a through hole, wherein the polygonal mirror is disposed on the lower base and adjacent to the heat dissipating unit; a cooling fan for generating an airflow passing through the through hole, wherein the cooling fan is located in the polygonal mirror; may be provided.

Herein, the lower base may comprise a hole through which an air current generated by the cooling fan passes.

According to another embodiment, a rotating polygonal mirror which has a polygonal cylinder shape, rotates along a rotational axis, and reflects a laser provided from one side toward an object, comprising: a first surface which is parallel to the rotational axis; a second surface which shares one side with the first surface and is parallel to the rotational axis; a through hole which is formed in the rotating polygonal mirror, has a cylindrical shape, and has the rotational axis as a central axis; and a cooling fan which is installed in the through hole and generates an air current which passes through the through hole may be provided.

Herein, an angle formed by the first surface and the second surface may be at least 90 degrees or more.

Herein, the cooling fan may integrally rotate with the first surface and the second surface.

Herein, the cooling fan may integrally rotate in a direction opposite to that of the first surface and the second surface.

According to another embodiment, a light detection and ranging (lidar) device for calculating a distance by using a laser, comprising: a laser emitting unit for emitting a laser; a first scanning unit for expanding a projection area of the laser to have a line shape by changing a travel path of the laser continuously emitted from the laser emitting unit; a second scanning unit for expanding the projection area of the laser to have a plane shape by changing the travel path of the laser continuously reflected from the first scanning unit; a sensor unit for detecting the laser reflected from an object located in a scanning area; wherein the second scanning unit includes a rotating polygonal mirror which rotates along an axis and expands the projection area to have the plane shape by changing, along a horizontal direction, the travel path of the laser of which the projection area is the line shape, the line shape being formed along a vertical direction, wherein the rotating polygonal mirror includes a projecting portion for reflecting the laser acquired from the first scanning unit and a receiving portion for reflecting the laser reflected from the object located in the scanning area toward the sensor unit, wherein the projecting portion and the receiving portion of the rotating polygonal mirror are disposed on different reflection surfaces of the rotating polygonal mirror may be provided.

Herein, in a case in which the number of reflecting surfaces of the rotating polygonal mirror is N, when the projecting portion of the rotating polygonal mirror may be located on a first reflecting surface and the receiving portion of the rotating polygonal mirror is located in an Nth reflecting surface, and when the projecting portion of the rotating polygonal mirror is located on an Mth reflecting surface (here, M is a natural number satisfying 1<M≤N), the receiving portion of the rotating polygonal mirror is located on an M−1th reflecting surface.

Herein, the first scanning unit may extend the projection area to a linear shape by changing a travel path of the laser light while nodding within a preset angle range.

Herein, in a case in which the number of reflecting surfaces of the rotating polygonal mirror is N, when the projecting portion of the rotating polygonal mirror is located on a first reflecting surface, the receiving portion of the rotating polygonal mirror may be located in an Nth reflecting surface, and when the projecting portion of the rotating polygonal mirror is located on an Mth reflecting surface (here, M is a natural number satisfying 1<M≤N), the receiving portion of the rotating polygonal mirror may be located on an M−1th reflecting surface.

According to another embodiment, a light detection and ranging (lidar) device which measures a distance using a laser, the lidar device comprising: a laser emitting unit which emits a laser; a first scanning unit which obtains the laser emitted by the laser emitting unit and continuously changes a travel path of the laser so as to extend a projection area to a linear shape; a second scanning unit which obtains and continuously changes the laser emitted by the first scanning unit which has a linear projection area, so as to extend the projection area to a surface shape; a first sensor unit which senses a laser reflected by an object located in a scanning area; and a second sensor unit which is disposed in a different position from that of the first sensor unit and senses the laser reflected by the object located in the scanning area, wherein the second scanning unit comprises a rotating polygonal mirror which changes a travel path of a laser having a perpendicular linear projection area by rotating on one axis so as to extend the projection area to a surface shape, wherein the rotating polygonal mirror comprises a projecting portion which obtains and reflects the laser emitted by the first scanning unit toward the scanning area, a first receiving portion which obtains and reflects the laser reflected by the object located in the scanning area toward the first sensor unit, and a second receiving portion which obtains and reflects the laser reflected by the object located in the scanning area toward the second sensor unit, and wherein the projecting portion and the first receiving portion of the rotating polygonal mirror are located on the same reflecting surface of the rotating polygonal mirror, and the second receiving portion is located on a different reflecting surface from that of the projecting portion and the first receiving portion may be provided.

Herein, in a case in which the number of reflecting surfaces of the rotating polygonal mirror is N, when the projecting portion and the first receiving portion of the rotating polygonal mirror are located on a first reflecting surface, the second receiving portion of the rotating polygonal mirror may be located in an Nth reflecting surface, and when the projecting portion and the first receiving portion of the rotating polygonal mirror are located on an Mth reflecting surface (here, M is a natural number satisfying 1<M≤N), the second receiving portion of the rotating polygonal mirror may be located on an M−1th reflecting surface.

Herein, any one of the projecting portion and the first receiving portion may be located on top of a virtual cross section perpendicular to a rotational axis of the rotating polygonal mirror, and wherein the other of the projecting portion and the first receiving portion may be located on a bottom of the virtual cross section perpendicular to the rotational axis of the rotating polygonal mirror.

Herein, the first scanning unit may extend the projection area to a linear shape by changing a travel path of the laser light while nodding within a preset angle range.

Herein, in a case in which the number of reflecting surfaces of the rotating polygonal mirror is N, when the projecting portion and the first receiving portion of the rotating polygonal mirror are located on a first reflecting surface, the second receiving portion of the rotating polygonal mirror may be located in an Nth reflecting surface, and when the projecting portion and the first receiving portion of the rotating polygonal mirror are located on an Mth reflecting surface (here, M is a natural number satisfying 1<M≤N), the second receiving portion of the rotating polygonal mirror may be located on an M−1th reflecting surface.

Herein, any one of the projecting portion and the first receiving portion may be located on top of a virtual cross section perpendicular to a rotational axis of the rotating polygonal mirror, and wherein the other of the projecting portion and the first receiving portion may be located on a bottom of the virtual cross section perpendicular to the rotational axis of the rotating polygonal mirror.

Herein, the lidar device may further comprise a third sensor unit which is disposed at a position different from those of the first sensor unit and the second sensor unit and senses the laser reflected by the object located in the scanning area, wherein the rotating polygonal mirror comprises a third receiving portion which obtains and reflects the laser reflected by the object located in the scanning area toward the third sensor unit, and wherein the third receiving portion is located on the same reflecting surface as that of the second receiving portion.

Herein, in a case in which the number of reflecting surfaces of the rotating polygonal mirror is N, when the projecting portion and the first receiving portion of the rotating polygonal mirror are located on a first reflecting surface, the second receiving portion and the third receiving portion of the rotating polygonal mirror may be located in an Nth reflecting surface, and when the projecting portion and the first receiving portion of the rotating polygonal mirror are located on an Mth reflecting surface (here, M is a natural number satisfying 1<M≤N), the second receiving portion and the third receiving portion of the rotating polygonal mirror may be located on an M−1th reflecting surface.

Herein, any one of the projecting portion and the first receiving portion may be located on top of a first virtual cross section perpendicular to a rotational axis of the rotating polygonal mirror, wherein the other of the projecting portion and the first receiving portion may be located on a bottom of the first virtual cross section perpendicular to the rotational axis of the rotating polygonal mirror, wherein any one of the second receiving portion and the third receiving portion may be located on top of a second virtual cross section perpendicular to the rotational axis of the rotating polygonal mirror, and wherein the other of the second receiving portion and the third receiving portion may be located on a bottom of the second virtual cross section perpendicular to the rotational axis of the rotating polygonal mirror Herein, wherein the first scanning unit may extend the projection area to a linear shape by changing a travel path of the laser light while nodding within a preset angle range.

Herein, wherein in a case in which the number of reflecting surfaces of the rotating polygonal mirror is N, when the projecting portion and the first receiving portion of the rotating polygonal mirror are located on a first reflecting surface, the second receiving portion and the third receiving portion of the rotating polygonal mirror may be located in an Nth reflecting surface, and when the projecting portion and the first receiving portion of the rotating polygonal mirror are located on an Mth reflecting surface (here, M is a natural number satisfying 1<M≤N), the second receiving portion and the third receiving portion of the rotating polygonal mirror may be located on an M−1th reflecting surface.

Herein, any one of the projecting portion and the first receiving portion may be located on top of a first virtual cross section perpendicular to a rotational axis of the rotating polygonal mirror, wherein the other of the projecting portion and the first receiving portion may be located on a bottom of the first virtual cross section perpendicular to the rotational axis of the rotating polygonal mirror, wherein any one of the second receiving portion and the third receiving portion may be located on top of a second virtual cross section perpendicular to the rotational axis of the rotating polygonal mirror, and wherein the other of the second receiving portion and the third receiving portion may be located on a bottom of the second virtual cross section perpendicular to the rotational axis of the rotating polygonal mirror.

According to another embodiment, a light detection and ranging (lidar) device which measures a distance using a laser, the lidar device comprising: a laser emitting unit which emits a laser; a rotating polygonal mirror which obtains the laser emitted by the laser emitting unit and continuously changes a travel path so as to extend a projection area; and a sensor unit which senses a laser reflected by an object located in a scanning area, wherein the rotating polygonal mirror comprises a projecting portion which obtains and reflects the laser emitted by the laser emitting unit toward the scanning area and a receiving portion which obtains and reflects the laser reflected by the object located in the scanning area toward the sensor unit, and wherein in a case in which the number of reflecting surfaces of the rotating polygonal mirror is N, when the projecting portion of the rotating polygonal mirror is located on a first reflecting surface, the receiving portion of the rotating polygonal mirror is located in an Nth reflecting surface, and when the projecting portion of the rotating polygonal mirror is located on an Mth reflecting surface (here, M is a natural number satisfying 1<M≤N), the receiving portion of the rotating polygonal mirror is located on an M−1th reflecting surface may be provided.

Herein, the sensor unit may comprise a first sensor unit which senses the laser reflected by the object located in the scanning area; and a second sensor unit which is disposed at a position different from that of the first sensor unit and senses the laser reflected by the object located in the scanning area, wherein the rotating polygonal mirror may comprise the projecting portion for obtaining and reflecting the laser emitted by the laser emitting unit toward the scanning area, a first receiving portion for obtaining and reflecting the laser reflected by the object located in the scanning area toward the first sensor unit, and a second receiving portion for obtaining and reflecting the laser reflected by the object located in the scanning area toward the second sensor unit, and wherein in a case in which the number of reflecting surfaces of the rotating polygonal mirror is N, when the projecting portion of the rotating polygonal mirror is located on the first reflecting surface, the first receiving portion of the rotating polygonal mirror may be located on the first reflecting surface, and the second receiving portion of the rotating polygonal mirror may be located in an Nth reflecting surface, and when the projecting portion of the rotating polygonal mirror is located on an Mth reflecting surface (here, M is a natural number satisfying 1<M≤N), the first receiving portion of the rotating polygonal mirror may be located on the Mth reflecting surface, and the second receiving portion of the rotating polygonal mirror may be located on an M−1th reflecting surface.

Herein, the sensor unit may further comprise a third sensor unit which is disposed at a position different from those of the first sensor unit and the second sensor unit and senses the laser reflected by the object located in the scanning area, wherein the rotating polygonal mirror may comprise a third receiving portion for obtaining and reflecting the laser reflected by the object located in the scanning area toward the third sensor unit, and wherein in a case in which the number of reflecting surfaces of the rotating polygonal mirror is N, when the projecting portion of the rotating polygonal mirror is located on the first reflecting surface, the first receiving portion of the rotating polygonal mirror may be located on the first reflecting surface and the second receiving portion and the third receiving portion of the rotating polygonal mirror may be located in an Nth reflecting surface, and when the projecting portion of the rotating polygonal mirror is located on an Mth reflecting surface (here, M is a natural number satisfying 1<M≤N), the first receiving portion of the rotating polygonal mirror may be located on the Mth reflecting surface, and the second receiving portion and the third receiving portion of the rotating polygonal mirror may be located on an M−1th reflecting surface.

Herein, any one of the projecting portion and the first receiving portion may be located on top of a first virtual cross section perpendicular to a rotational axis of the rotating polygonal mirror, wherein the other of the projecting portion and the first receiving portion may be located on a bottom of the first virtual cross section perpendicular to the rotational axis of the rotating polygonal mirror, wherein any one of the second receiving portion and the third receiving portion may be located on top of a second virtual cross section perpendicular to the rotational axis of the rotating polygonal mirror, and wherein the other of the second receiving portion and the third receiving portion may be located on a bottom of the second virtual cross section perpendicular to the rotational axis of the rotating polygonal mirror.

A light detection and ranging (lidar) device is a device for detecting a distance from and a position of an object by using a laser. For example, a distance between a lidar device and an object and a position of an object based on the lidar device may be shown as (R, theta, and pi). Also, however, the present disclosure is not limited thereto, and a distance between a lidar device and an object and a position of the object based on the lidar device may be shown as a rectangular coordinate system (X, Y, and Z), a cylindrical coordinate system (R, theta, and z), or the like.

Also, the lidar device may use a laser reflected by the object for determining a distance R from the object.

According to one embodiment, a lidar device may use time of flight (TOF) which is a time difference of an emitted laser and a sensed laser for determining a distance R from an object. For example, the lidar device may include a laser emitting unit which outputs a laser and a sensor unit which senses a reflected laser. The lidar device may check a time when the laser emitting unit emits a laser, check a time when the sensor unit senses a laser reflected by an object, and determine a distance from the object on the basis of a difference between the emission time and the sensing time.

Also, according to one embodiment, the lidar device may use a triangulation method on the basis of a sensed position of the sensed laser for determining the distance R from the object. For example, when a laser emitted from the laser emitting unit is reflected by an object which is relatively close, the reflected laser may be sensed at a place relatively far from the laser emitting unit among the sensor unit. Also, when a laser emitted from the laser emitting unit is reflected by an object which is relatively far away, the reflected laser may be sensed at a place relatively close to the laser emitting unit among the sensor unit. Accordingly, the lidar device may determine a distance from the object on the basis of a difference between the laser sensing positions.

Also, according to one embodiment, the lidar device may use a phase shift of a sensed laser to determine a distance R from an object. For example, the lidar device may sense a phase with respect to amplitude through amplitude modulation on a laser emitted by the laser emitting unit, sense a phase of amplitude of a laser reflected by an object which is present in a scanning area, and determine a distance from the object which is present in the scanning area on the basis of a phase difference between the emitted laser and the sensed laser.

Also, according to one embodiment, the lidar device may determine a position of an object by using an angle of an emitted laser. For example, when the lidar device recognizes an emission angle (theta and pi) of one laser projected toward a scanning area of the lidar device and a laser reflected by an object which is present in the scanning area is sensed by the sensor unit, the lidar device may determine a position of the object using the emission angle (theta and pi) of the emitted laser.

Also, according to one embodiment, the lidar device may determine a position of an object by using an angle of a received laser. For example, when a first object and a second object are present at the same distance R from the lidar device but are at different positions (theta and pi) on the basis of the lidar device, a laser reflected by the first object and a laser reflected by the second object may be sensed at different points of the sensor unit. The lidar device may determine a position of the object on the basis of the points of the sensor unit which sense the reflected lasers.

Also, according to one embodiment, the lidar device may have a scanning area which includes a random peripheral object to detect a position of the object. Here, the scanning area shows a detectable area as one screen and may refer to a set of dots, lines, and faces which form the one screen for one frame. Also, the scanning area may refer to a projection area of a laser emitted by the lidar device, and the projection area may refer to a set of dots, lines, and surfaces where lasers emitted during one frame meet a spherical surface at the same distance. Also, a field of view (FOV) may refer to a detectable field and may be defined as an angle range of the scanning area when the lidar device is viewed as a starting point.

Hereinafter, components of the lidar device according to one embodiment will be described in detail.

FIG. 1 is a view of the lidar device according to one embodiment.

Referring to FIG. 1, a lidar device 100 according to one embodiment may include a laser emitting unit 110, a scanning unit 120, a sensor unit 130, and a control unit 140. However, the lidar device 100 is not limited to the above-described configuration and may be a device which includes more or less components than the above. For example, without the scanning unit, the lidar device may include only the laser emitting unit, the sensor unit, and the control unit.

Each of the laser emitting unit 110, the scanning unit 120, the sensor unit 130, and the control unit 140 which are included in the lidar device 100 may be formed as a plurality thereof. For example, the lidar device may include a plurality of laser emitting units, a plurality of scanning units, and a plurality of sensor units. Naturally, a single laser emitting unit, a plurality of scanning units, and a single sensor unit may be included.

Each of the laser emitting unit 110, the scanning unit 120, the sensor unit 130, and the control unit 140 which are included in the lidar device 100 may include a plurality of sub-components. For example, the lidar device may include a laser emitting unit which is a single array including a plurality of laser emitting elements.

The laser emitting unit 110 may emit a laser. The lidar device 100 may measure a distance from an object by using the emitted laser.

Also, the laser emitting unit 110 may include one or more laser emitting elements. In one embodiment, the laser emitting unit 110 may include a single laser emitting element or may include a plurality of laser emitting elements. Also, when the plurality of laser emitting elements are included, the plurality of laser emitting elements may form one array.

Also, the laser emitting unit 110 may emit a laser in a band of 905 nm and may emit a laser in a band of 1550 nm. Also, the laser emitting unit 110 may emit a laser with a wavelength from 800 nm to 1000 nm. A wavelength of an emitted laser may be present in a variety of ranges or may be present in a particular range.

Also, when the laser emitting unit 110 includes a plurality of laser emitting elements, the laser emitting elements may emit lasers in the same wavelength band and may emit lasers in different wavelength bands. For example, when a laser emitting unit includes two laser emitting elements, one laser emitting element may emit a laser in a band of 905 nm and another laser emitting element may emit a laser in a band of 1550 nm.

Also, the laser emitting elements may include a laser diode (LD), a solid-state laser, a high power laser, a light emitting diode (LED), a vertical cavity surface emitting laser (VCSEL), an external cavity diode laser (ECDL), and the like, but are not limited thereto.

The scanning unit 120 may change an emission direction and/or size of a laser emitted by the laser emitting unit 110. For example, the scanning unit 120 may change an emission direction of an emitted laser by changing a movement direction of the laser, may change a size or an emission direction of an emitted laser by diffusing the emitted laser or changing a phase thereof, and may change an emission direction and a size of a laser by diffusing the laser and changing a movement direction of the laser.

Also, the scanning unit 120 may extend a scanning area or change a scanning direction of the lidar device 100 by changing an emission direction and/or size of a laser emitted by the laser emitting unit 110.

Also, the scanning unit 120 may include a fixed mirror, which changes a movement direction of a laser to a fixed angle to change a movement direction of an emitted laser, a nodding mirror, which continuously changes a movement direction while nodding within a preset angle range, and a rotating mirror, which continuously changes a movement direction of a laser while rotating on one axis, but is not limited thereto.

Also, the scanning unit 120 may include a lens, a prism, a microfluidic lens, liquid crystals, and the like to diffuse emitted lasers but is not limited thereto.

Also, the scanning unit 120 may include an optical phased array (OPA) and the like to change an emission direction by changing a phase of an emitted laser but is not limited thereto.

Also, the nodding mirror may continuously change a movement direction of an emitted laser to extend or change a projection area of the laser and may nod within a preset angle range. Here, nodding may refer to rotating on one or a plurality of axes and reciprocating within a certain angle range. Also, the nodding mirror may be a resonance scanner, microelectromechanical systems (MEMS) mirror, a voice coil motor (VCM), or the like but is not limited thereto.

Also, the rotating mirror may continuously change a movement direction of an emitted laser to extend or change a projection area of the laser and may rotate on one axis. Also, the rotating mirror may be a single face mirror rotating on an axis, a conical mirror rotating on an axis, or polygonal mirror rotating on an axis but is not limited thereto and may be a mirror rotating on an axis without a limit in angle range.

Also, the scanning unit 120 may include a single scanning unit or a plurality of scanning units. Also, the scanning unit may include one or more optical elements and there is no limit in a configuration thereof.

The sensor unit 130 may sense a laser reflected by an object located in a scanning area of the lidar device 100.

Also, the sensor unit 130 may include one or more sensor elements. In one embodiment, the sensor unit 130 may include a single sensor element or may include a sensor array including a plurality of sensor elements. For example, the sensor unit 130 may include one avalanche photodiode (APD) and may include silicon photomultipliers (SiPM) in which a plurality of single-photon avalanche diodes (SPAD) form an array. Also, a plurality of APDs may form a single channel or form a plurality of channels.

Also, when a plurality of sensor units are present, the plurality of sensor units may include different sensors. For example, when three sensor units are present, one of the sensor units may be formed of the APD, another may be formed of the SPAD, and the other may be formed of the SiPM.

Also, when a plurality of sensor units are present and a laser emitting unit includes a plurality of wavelengths, the plurality of sensor units may include sensors for different wavelengths. For example, when a laser emitting unit emits lasers of a wavelength in a band of 905 nm and a wavelength in a band of 1550 nm and there are two sensor units, one of the sensor units may sense the laser in the band of 905 nm and the other may sense the laser in the band of 1550 nm.

Also, the sensor elements may include a p-n photodiode, a photo transistor, a PIN photodiode, an APD, an SPAD, an SiPM, a charge-coupled device (CCD), and the like but are not limited thereto.

The control unit 140 may determine a distance from the lidar device to an object located in a scanning area on the basis of a sensed laser. Also, the control unit 140 may control operations of the components of the lidar device such as the laser emitting unit 110, the scanning unit 120, the sensor unit 130, and the like.

Hereinafter, the scanning unit 120 will be described in more detail.

Figure 2:
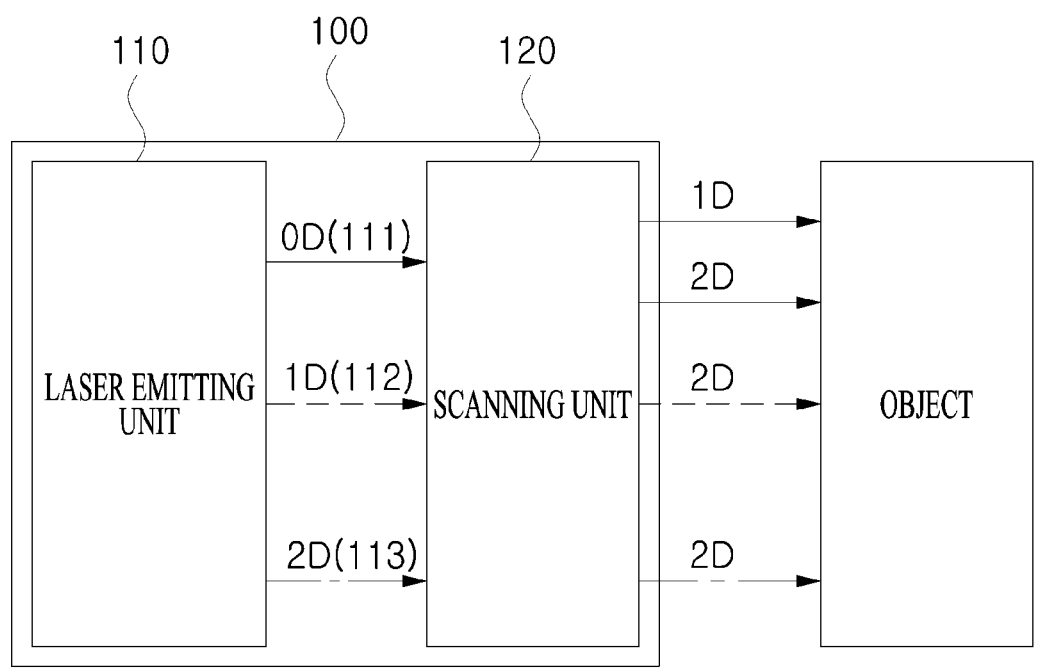
FIG. 2 is a block diagram illustrating a function of a scanning unit in the lidar device according to one embodiment.

FIG. 2 is a view illustrating a function of the scanning unit in the lidar device according to one embodiment.

Referring to FIG. 2, the function of the scanning unit 120 may vary according to a projection area of a laser emitted by the laser emitting unit 110.

According to one embodiment, when the laser emitting unit 110 includes a single laser emitting element, a laser 111 emitted by the laser emitting unit 110 may have a dot-shaped projection area. Here, the scanning unit 120 may change an emission direction and a size of the laser 111 such that a scanning area of the lidar device may be extended to a linear shape or a surface shape.

Also, the scanning unit 120 may change the emission direction of the laser 111 having a dot-shaped projection area by continuously changing a movement direction of the laser 111 such that the scanning area of the lidar device may be extended to a surface shape.

Also, the scanning unit 120 may change the size of the laser 111 having the dot-shaped projection area by diffusing the laser 111 such that the scanning area of the lidar device may be extended to a linear or surface shape.

Also, the scanning unit 120 may change the size and the emission direction of the laser 111 having the dot-shaped projection area by changing a phase of the laser 111 such that the scanning area of the lidar device may be extended to a linear or surface shape.

Also, the scanning unit 120 may change the emission direction of the laser 111 having the dot-shaped area primarily by continuously changing the movement direction of the laser 111 and secondarily by changing the movement direction of the laser 111 to a direction different from the previously changed movement direction such that the scanning area of the lidar device 100 may be extended to a surface shape.

Also, the scanning unit 120 may change the emission direction and the size of the laser 111 having the dot-shaped area primarily by continuously changing the movement direction of the laser 111 and secondarily by diffusing the laser 111 such that the scanning area of the lidar device 100 may be extended to a surface shape Also, the scanning unit 120 may change the emission direction and the size of the laser 111 having the dot-shaped area primarily by diffusing the laser 111 and secondarily by changing a movement direction of the diffused laser 111 such that the scanning area of the lidar device 100 may be extended to a surface shape.

According to another embodiment, when the laser emitting unit 110 includes a plurality of laser emitting elements, a projection area of a laser 112 emitted by the laser emitting unit 110 may have a linear shape. Here, the scanning unit 120 may change an emission direction and a size of the laser 112 such that a scanning area of the lidar device may be extended to a surface shape.

Here, the scanning unit 120 may change an emission direction of the laser 112 having a linear projection area by continuously changing a movement direction of the laser 112 such that the scanning area of the lidar device may be extended to a surface shape.

Also, the scanning unit 120 may change the size of the laser 112 having the linear projection area by diffusing the laser 112 such that the scanning area of the lidar device may be extended to a surface shape.

Also, the scanning unit 120 may change the emission direction and the size of the laser 112 having a linear projection area by changing a phase of the laser 112 such that the scanning area of the lidar device may be extended to a surface shape.

According to another embodiment, when the laser emitting unit 110 includes an array of laser emitting elements aligned in a line, a projection area of the laser 112 emitted by the laser emitting unit 110 may have a linear shape. Here, the scanning unit 120 may change an emission direction and a size of the laser 112 such that a scanning area of the lidar device may be extended to a surface shape.

Here, the scanning unit 120 may change the emission direction of the laser 112 having a linear projection area by continuously changing a movement direction of the laser 112 such that the scanning area of the lidar device may be extended to a surface shape.

Also, the scanning unit 120 may change the size of the laser 112 having the linear projection area by diffusing the laser 112 such that the scanning area of the lidar device may be extended to a surface shape.

Also, the scanning unit 120 may change the emission direction and the size of the laser 112 having the linear projection area by changing a phase of the laser 112 such that the scanning area of the lidar device may be extended to a surface shape.

According to another embodiment, when the laser emitting unit 110 includes a plurality of laser emitting elements, a projection area of a laser 113 emitted by the laser emitting unit 110 may have a surface shape. Here, the scanning unit 120 may change an emission direction and a size of the laser 113 such that a scanning area of the lidar device may be extended or a scanning direction thereof may be changed.

Here, the scanning unit 120 may change the emission direction of the laser 113 having a surface-shaped projection area by continuously changing a movement direction of the laser 113 such that the scanning area of the lidar device may be extended or the scanning direction thereof may be changed.

Also, the scanning unit 120 may change the size of the laser 113 having the surface-shaped projection area by diffusing the laser 113 such that the scanning area of the lidar device may be extended or the scanning direction thereof may be changed.

Also, the scanning unit 120 may change the emission direction and the size of the laser 113 having the surface-shaped projection area by changing a phase of the laser 113 such that the scanning area of the lidar device may be extended or the scanning direction thereof may be changed.

According to another embodiment, when a laser emitting element formed of a surface-shaped array is included, a projection area of the laser 113 emitted by the laser emitting unit 110 may have a surface shape. Here, the scanning unit 120 may change an emission direction and a size of the laser 113 such that a scanning area of the lidar device may be extended or a scanning direction thereof may be changed.

Here, the scanning unit 120 may change the emission direction of the laser 113 having the surface-shaped projection area by continuously changing a movement direction of the laser 113 such that the scanning area of the lidar device may be extended or the scanning direction thereof may be changed.

Also, the scanning unit 120 may change the size of the laser 113 having the surface-shaped projection area by diffusing the laser 113 such that the scanning area of the lidar device may be extended or the scanning direction thereof may be changed.

Also, the scanning unit 120 may change the emission direction and the size of the laser 113 having the surface-shaped projection area by changing a phase of the laser 113 such that the scanning area of the lidar device may be extended or the scanning direction thereof may be changed.

Hereinafter, a lidar device in which a projection area of a laser emitted by the laser emitting unit has a dot shape will be described in detail.

Figure 3:
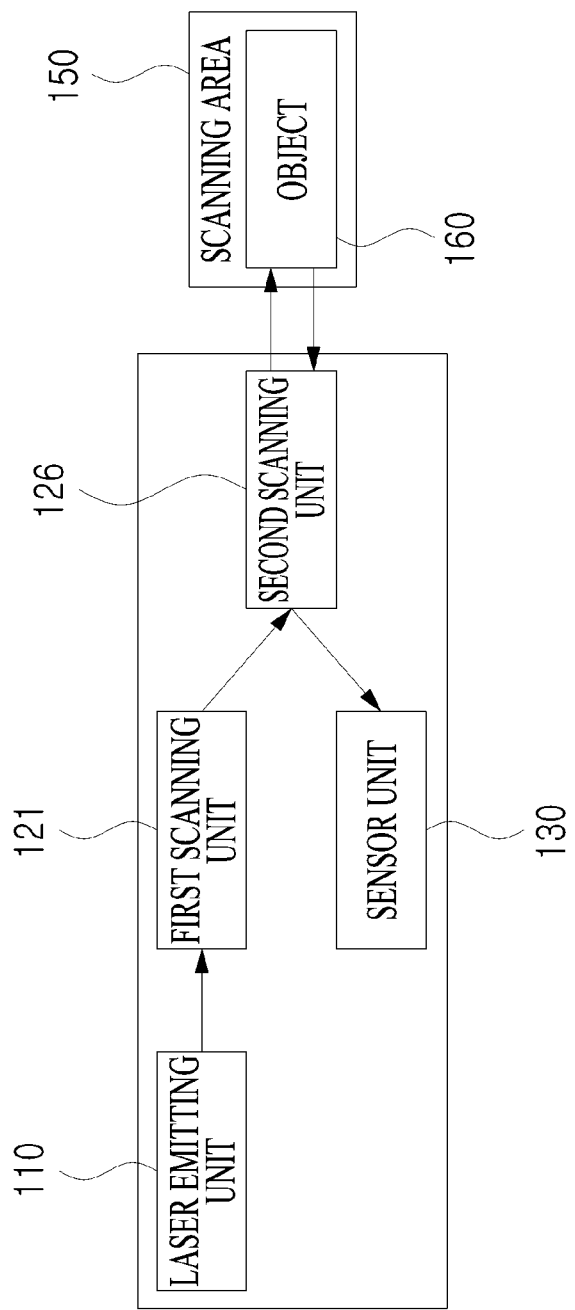
FIG. 3 is a block diagram of a lidar device according to another embodiment.

FIG. 3 is a block diagram view of a lidar device according to another embodiment.

Referring to FIG. 3, a lidar device according to one embodiment may include the laser emitting unit 110, a first scanning unit 121, a second scanning unit 126, and the sensor unit 130.

Since the laser emitting unit 110 and the sensor unit 130 have been described above with reference to FIGS. 1 and 2, a detailed description of the laser emitting unit 110 and the sensor unit 130 will be omitted hereafter.

The scanning unit 120 which has been described above with reference to FIGS. 1 and 2 may include the first scanning unit 121 and the second scanning unit 126.

The first scanning unit 121 may extend a projection area of a laser to a linear shape by changing a projection direction and/or a size of the emitted laser. For example, the first scanning unit 121 may extend the projection area of the laser to a linear shape by continuously changing a movement direction of the emitted laser. Also, the first scanning unit 121 may extend the projection area of the laser to a linear shape by diffusing the emitted laser to have a linear shape.

Also, the second scanning unit 126 may extend a projection area of a laser projected by the first scanning unit 121 to a surface shape by changing an emission direction and/or a size of the laser. For example, the second scanning unit 126 may extend the projection area of the laser projected by the first scanning unit 121 to a surface shape by continuously changing a movement direction of the laser. Also, the second scanning unit 126 may extend the projection area of the laser projected by the first scanning unit 121 by diffusing the laser such that a scanning area 150 of the lidar device 100 may be extended to a surface shape.

Referring to FIG. 3, a light path of a laser projected by the lidar device 100 is shown in FIG. 3. In detail, the laser emitting unit 110 may emit a laser. The laser emitted by the laser emitting unit 110 may reach the first scanning unit 121, and the first scanning unit 121 may project the laser toward the second scanning unit 126. Also, the laser may reach the second scanning unit 126, and the second scanning unit 126 may project the laser toward the scanning area 150. Also, the laser projected toward the scanning area 150 of the lidar device 100 may be reflected by an object 160 which is present in the scanning area 150 and may be projected toward the sensor unit 130 by the second scanning unit 126. The sensor unit 130 may sense the laser projected by the second scanning unit 126.

The lidar device 100 may be a device for measuring a distance from the lidar device 100 to the object 160 by using lasers. Accordingly, since it is necessary for the lidar device 100 to project a laser toward the object 160, the lidar device 100 may have a projection method for efficiently measuring a distance from the object 160. Here, the projection method may include methods of determining a projection path of the laser emitted by the laser emitting unit 110 to the object 160 located in the scanning area 150 and determining the scanning area 150. Accordingly, hereinafter, a projection path and the scanning area 150 of the lidar device will be described.

In detail, the laser emitting unit 110 may emit a laser toward the first scanning unit 121, the first scanning unit 121 may project the received laser toward the second scanning unit 126, and the second scanning unit 126 may project the projected laser toward the scanning area 150 of the lidar device 100.

In more detail, a projection area of the laser emitted by the laser emitting unit 110 may have a dot shape, and the emitted laser may be projected toward the second scanning unit 126 by the first scanning unit 121. Here, the first scanning unit 121 may extend a projection area of the laser having a dot-shaped projection area to a linear shape by changing an emission direction and/or a size of the laser. That is, the first scanning unit 121 may receive the laser having the dot-shaped projection area from the laser emitting unit 110 and may project a laser having a linear projection area toward the second scanning unit 126.

Here, the second scanning unit 126 may extend the linear projection area of the laser to a surface shape by changing an emission direction and/or a size of the laser, and the laser projected by the first scanning unit 121 may be projected toward the scanning area by the second scanning unit 126. That is, the second scanning unit 126 may receive the laser having the linear projection area from the first scanning unit 121 and may emit a laser having a surface-shaped projection area toward the scanning area 150. Also, the second scanning unit 126 projects the laser having the surface-shaped projection area such that the scanning area 150 of the lidar device 100 may be extended to a surface shape.

Since it is necessary for the lidar device 100 to sense a laser reflected by an object, the lidar device 100 may have a reception method for efficiently measuring a distance from the object. Here, the reception method may include methods of determining a reception path of the laser reflected by the object to reach the sensor unit and determining an amount of laser which reaches the sensor unit. Accordingly, hereinafter, the reception path of the lidar device 100 and the amount of laser which reaches the sensor unit will be described.

In detail, the laser projected toward the scanning area 150 of the lidar device 100 may be reflected by the object 160 which is present in the scanning area 150 of the lidar device. Also, the laser reflected by the object 160 may move toward the second scanning unit 126, and the second scanning unit 126 may receive, reflect, and project the laser reflected by the object 160 toward the sensor unit 130. Here, properties of the laser reflected by the object 160 may vary according to a color and a material of the object 160, an incident angle of the laser, or the like.

Also, the laser reflected by the object 160 may be projected toward the sensor unit 130 through the second scanning unit 126. That is, the laser reflected by the object 160 may be projected toward the sensor unit by only the second scanning unit 126 and may not be projected toward the sensor unit 130 through both the first scanning unit 121 and the second scanning unit 126. Also, the laser reflected by the object 160 may be projected toward the sensor unit 130 by only the second scanning unit 126 and may not be projected toward the sensor unit 130 without being reflected/projected through both the first scanning unit 121 and the second scanning unit 126. Accordingly, an amount of laser which reaches the sensor unit 130 may be determined on the basis of the second scanning unit 126.

Also, the laser reflected by the object 160 is shown as being projected toward the sensor unit 130 through the second scanning unit 126 in FIG. 3 but is not limited thereto. As necessary, the laser reflected by the object 160 may reach the sensor unit 130 through the first scanning unit 121 and the second scanning unit 126. Also, the laser reflected by the object 160 may reach the sensor unit 130 without being reflected/projected through the first scanning unit 121 and the second scanning unit 126.

As described above, the lidar device including the laser emitting unit 110 which emits a dot-shaped laser, the first scanning unit 121, and the second scanning unit 126 may extend the scanning area 150 to a surface shape by using the first scanning unit 121 and the second scanning unit 126. Accordingly, the lidar device may provide better effects in durability and stability than those of a lidar device which extends a scanning area to a surface shape through mechanical rotation of the lidar device itself. Also, it is possible to measure a longer distance than that of a lidar device which extends a scanning area to a surface shape by using laser diffusion. Also, it is possible to project a laser toward a desired region of interest by controlling operations of the first scanning unit 121 and the second scanning unit 126.

When a projection area of a laser emitted by the laser emitting unit 110 of the lidar device 100 has a dot shape, the lidar device 100 may include the first scanning unit 121 and the second scanning unit 126. Here, an emitted laser having a dot-shaped projection area may be extended to a surface-shaped projection area through the first scanning unit 121 and the second scanning unit 126 such that the scanning area 150 of the lidar device 100 may be extended to a surface shape.

Also, the lidar device 100 may have an FOV which varies according to necessity for each use thereof. For example, a fixed lidar device for three-dimensional mapping may require a maximally wide FOV in vertical and horizontal directions, and a lidar device disposed in a vehicle may require a relatively narrower FOV in a vertical direction in comparison to a relatively wider FOV in a horizontal direction. Also, a lidar device disposed in a drone may require a maximally wide FOV in vertical and horizontal directions. Accordingly, when an FOV necessary in a vertical direction differs from an FOV necessary in a horizontal direction, the first scanning unit 121 may change a movement direction of a laser in a direction which requires a relatively narrow FOV and the second scanning unit 126 may change the movement direction of the laser in a direction which requires a relatively wider FOV so as to reduce an overall size of the lidar device 100.

Also, when a laser projected toward the scanning area 150 is reflected by the object 160 which is present in the scanning area 150, the lidar device 100 measures a distance by sensing the reflected laser. Here, the laser may be diffusely reflected in all directions according to a color and a material of the object 160 which is present in the scanning area 150 and an incident angle and the like of the laser projected toward the object 160. Accordingly, it may be necessary to reduce diffusion of the laser in order to measure a distance of the object 160 which is at a long distance. To this end, the first scanning unit 121 and the second scanning unit 126 may not extend a size of the laser but may extend a projection area of the laser by continuously changing a movement direction.

Also, to allow the lidar device 100 to perform three-dimensional scanning, the first scanning unit 121 and the second scanning unit 126 may mutually change the movement direction of the laser. For example, the first scanning unit 121 may continuously change the movement direction of the laser to a direction vertical to the ground, and the second scanning unit 126 may continuously change the movement direction of the laser to a direction parallel to the ground.

Also, in the lidar device 100, the first scanning unit 121 may receive a laser having a dot-shaped projection area from the laser emitting unit 110 but the second scanning unit 126 may receive a laser having a linear projection area from the first scanning unit 121. Accordingly, the second scanning unit 126 may be greater than the first scanning unit 121. Also, according thereto, the smaller first scanning unit 121 may have a higher scanning speed than that of the greater second scanning unit 126. Here, the scanning speed may refer to a speed of continuously changing a movement of a laser.

Also, when a laser projected toward the scanning area 150 is reflected by the object 160 which is present in the scanning area 150, the lidar device 100 measures a distance by sensing the reflected laser. Here, the laser may be diffusely reflected in all directions according to a color and a material of the object 160 which is present in the scanning area 150 and an incident angle and the like of the laser projected toward the object 160. Accordingly, it may be necessary to increase an amount of laser capable of being sensed by the sensor unit 130 in order measure a distance from the object which is at a long distance. For this, a laser reflected by the object 160 may be projected toward the sensor unit 130 through only the second scanning unit 126, which is a bigger one of the first scanning unit 121 and the second scanning unit 126.

Accordingly, in order to smoothly perform the above-described function, the first scanning unit 121 of the lidar device 100 may include a nodding mirror and the second scanning unit 126 of the lidar device 100 may include a rotating polygonal mirror.

Hereinafter, the lidar device which includes the first scanning unit 121 including the nodding mirror and the second scanning unit 126 including the rotating polygonal mirror will be described in detail.

Figure 4:
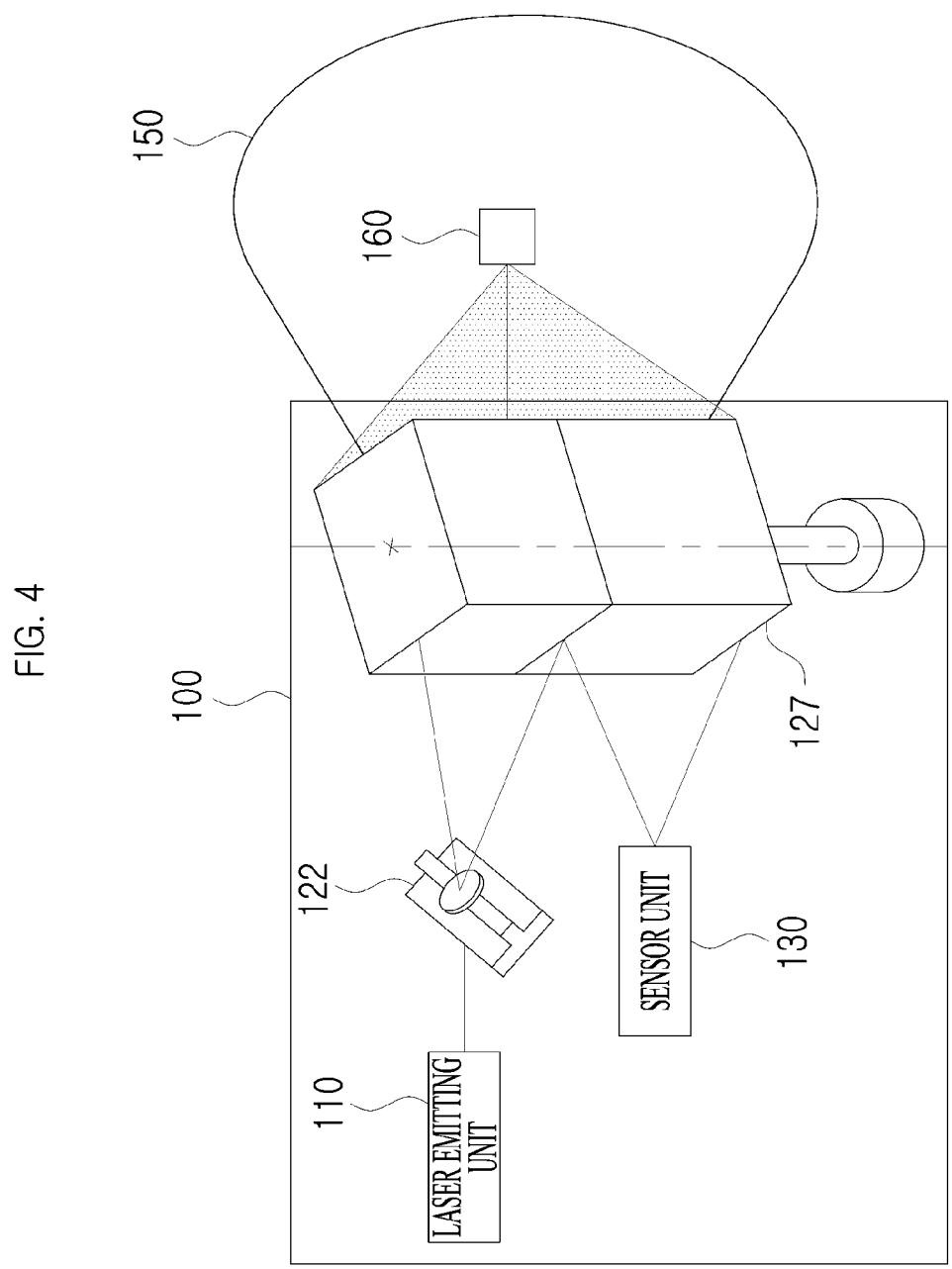
FIG. 4 is a view of the lidar device according to one embodiment.

FIG. 4 relates to the lidar device according to one embodiment.

Referring to FIG. 4, the lidar device 100 according to one embodiment may include the laser emitting unit 110, a nodding mirror 122, a rotating polygonal mirror 127, and the sensor unit 130.

Since the laser emitting unit 110 and the sensor unit 130 have been described above with reference to FIGS. 1 and 2, a detailed description of the laser emitting unit 110 and the sensor unit 130 will be omitted hereafter.

The first scanning unit 121 which has been described with reference to FIG. 3 may include the nodding mirror 122, and the second scanning unit 126 may include the rotating polygonal mirror 127.

The nodding mirror 122 may be one implementation example of the above-described first scanning unit 121. The nodding mirror 122 may nod on one axis within a preset angle range or may nod on two axes within a preset angle range. Here, when the nodding mirror 122 nods on one axis within the preset angle range, a projection area of a laser emitted by the nodding mirror 122 may have a linear shape. Here, when the nodding mirror 122 nods on two axes within the preset angle range, a projection area of a laser emitted by the nodding mirror 122 may have a surface shape.

Also, a nodding speed of the nodding mirror 122 may be the same within the whole preset angle range or may be different within the whole preset angle range. For example, the nodding mirror 122 may nod at the same angular speed within the whole angle range. Also, for example, the nodding mirror 122 may nod at a relatively slow speed at both ends of a preset angle and may nod at a relatively high speed at a central part of the preset angle.

Also, the nodding mirror 122 may continuously change a movement direction of a laser emitted by the laser emitting unit 110 by receiving and reflecting the laser and nodding within the preset angle range. Accordingly, a projection area of the laser may be extended to a linear or surface shape.

Also, the rotating polygonal mirror 127 may be one implementation example of the above-described second scanning unit 126. The rotating polygonal mirror 127 may rotate on one axis. Here, the rotating polygonal mirror 127 may continuously change a movement direction of a laser projected by the nodding mirror 122 by receiving and reflecting the laser and rotating on one axis. Also, accordingly, a projection area of the laser may be extended to a surface shape, and as a result, the scanning area 310 of the lidar device 100 may be extended to a surface shape.

Also, a rotating speed of the rotating polygonal mirror 127 may be the same within a whole range of rotation angle and may be different within a rotation angle range. For example, a rotating speed when a direction of a laser projected by the rotating polygonal mirror 127 faces a central part of the scanning area 310 may be relatively lower than a rotating speed when the direction of the laser projected by the rotating polygonal mirror 127 faces a side part of the scanning area 310. Also, a rotating speed may vary according to the number of rotation times of the rotating polygonal mirror 127.

Also, when a vertical FOV of the lidar device 100 is set to be narrower than a horizontal FOV thereof, the nodding mirror 122 may extend a projection area of a laser emitted by the laser emitting unit 110 to a linear shape perpendicular to the ground by continuously changing a movement direction of the laser to be perpendicular to the ground. Also, here, the rotating polygonal mirror 127 may extend a projection area of a laser projected by the nodding mirror 122 to a surface shape by continuously changing a movement direction of the laser to be parallel to the ground such that the scanning area 310 of the lidar device 100 may be extended to a surface shape. Accordingly, the nodding mirror 122 may vertically extend the scanning area 310, and the rotating polygonal mirror 127 may horizontally extend the scanning area 310.

Also, since the nodding mirror 122 reflects a laser emitted by the laser emitting unit 110, a size of the nodding mirror 122 may be similar to a diameter of the laser. However, since a laser projected by the nodding mirror 122 has a linear projection area, a size of the rotating polygonal mirror 127 may be larger than a size of the projection area so as to reflect the laser projected by the nodding mirror 122. Accordingly, the size of the nodding mirror 122 may be smaller than the size of the rotating polygonal mirror 127, and a nodding speed of the nodding mirror 122 may be higher than a rotating speed of the rotating polygonal mirror 127.

Hereinafter, a laser projection method and a laser reception method of the lidar device 100 having the above-described configuration will be described.

Referring back to FIG. 4, a travel path of a laser of the lidar device 100 may be determined from when the laser is emitted until it is sensed. In detail, a laser emitted by the laser emitting unit 110 of the lidar device 100 is projected toward the rotating polygonal mirror 127 through the nodding mirror 122. The laser projected toward the rotating polygonal mirror 127 may be projected toward the scanning area 150 of the lidar device 100 through the rotating polygonal mirror 127. Also, the laser projected toward the scanning area 150 of the lidar device 100 may be reflected by the object 160 which is present in the scanning area 150 and may be projected toward the sensor unit 130 by the rotating polygonal mirror 127. Also, the sensor unit 130 may sense the laser projected by the rotating polygonal mirror 127.

The lidar device 100 may be a device for measuring a distance from the lidar device 100 to the object 160 by using lasers. Accordingly, since it is necessary for the lidar device 100 to project a laser toward the object 160, the lidar device 100 may have a projection method for efficiently measuring a distance from the object 160. Here, the projection method may include methods of determining a projection path of the laser emitted by the laser emitting unit 110 to the object 160 located in the scanning area 150 and determining the scanning area 150. Accordingly, hereinafter, a projection path and the scanning area 150 of the lidar device 100 will be described.

In detail, the laser emitting unit 110 may emit a laser toward the nodding mirror 122, the nodding mirror 122 may project the emitted laser toward the rotating polygonal mirror 127, and the rotating polygonal mirror 127 may project the projected laser toward the scanning area 150 of the lidar device 100.

Here, the laser emitting unit 110 may emit a laser toward the nodding mirror 122, and a projection area of the emitted laser may have a dot shape.

Here, the laser emitted by the laser emitting unit 110 may be projected toward the rotating polygonal mirror 127 through the nodding mirror 122. Here, the nodding mirror 122 may extend a dot-shaped projection area of the laser to a linear shape by changing an emission direction of the laser. That is, the nodding mirror 122 may receive the laser having the dot-shaped projection area from the laser emitting unit 110 and may emit a laser having a linear projection area toward the rotating polygonal mirror 127.

Here, the nodding mirror 122 may extend the emission of the laser emitted by the laser emitting unit 110 to a linear shape perpendicular to the ground by continuously changing a movement direction of the laser in a direction perpendicular to the ground.

Also, the laser projected by the nodding mirror 122 may be projected toward the scanning area 150 through the rotating polygonal mirror 127. Here, the rotating polygonal mirror 127 may extend a linear projection area of the laser to a surface shape by changing an emission direction of the laser. That is, the rotating polygonal mirror 127 may receive the laser having the linear projection area from the nodding mirror 122 and may project a laser having a surface-shaped projection area toward the scanning area 150. Also, the rotating polygonal mirror 127 projects the laser having the surface-shaped projection area such that the scanning area 150 of the lidar device 100 may be extended to a surface shape.

Also, the rotating polygonal mirror 127 may extend the projection area of the laser projected by the nodding mirror 122 to a surface shape by continuously changing a movement direction of the laser in a direction horizontal to the ground.

Also, here, the scanning area 150 of the lidar device 100 may be determined on the basis of a preset angle of the nodding mirror 122 and the number of reflecting surfaces of the rotating polygonal mirror 127 such that an FOV of the lidar device 100 may be determined. For example, when the nodding mirror 122 continuously changes a movement direction of the laser to be a direction vertical to the ground, a vertical FOV of the lidar device 100 may be determined on the basis of the preset angle of the nodding mirror 122. Also, when the rotating polygonal mirror 127 continuously changes a movement direction of the laser to be a direction parallel to the ground, a horizontal FOV of the lidar device 100 may be determined on the basis of the number of reflecting surfaces of the rotating polygonal mirror 127.

The lidar device 100 may be a device for measuring a distance from the lidar device 100 to the object 160 by using lasers. Accordingly, it is necessary to sense a laser reflected by the object 160 such that the lidar device 100 may have a reception method for efficiently measuring a distance from the object 160. Here, the reception method may include methods of determining a reception path of the laser reflected by the object 160 to reach the sensor unit and determining an amount of laser which reaches the sensor unit. Accordingly, hereinafter, the reception path of the lidar device 100 and the amount of laser which reaches the sensor unit 130 will be described.

In detail, the laser projected toward the scanning area 150 of the lidar device 100 may be reflected by the object 160 which is present in the scanning area 150 of the lidar device. Also, the laser reflected by the object 160 may move toward the rotating polygonal mirror 127, and the rotating polygonal mirror 127 may receive, reflect, and project the laser reflected by the object 160 toward the sensor unit 130. Here, properties of the laser reflected by the object 160 may vary according to a color and a material of the object 160, an incident angle of the laser, or the like.

Also, the laser reflected by the object 160 may be projected toward the sensor unit 130 through the rotating polygonal mirror 127. That is, the laser reflected by the object 160 may be projected toward the sensor unit 130 by only the rotating polygonal mirror 127 and may not be projected toward the sensor unit 130 through both the nodding mirror 122 and the rotating polygonal mirror 127. Also, the laser reflected by the object 160 may be projected toward the sensor unit 130 by only the rotating polygonal mirror 127 and may not be projected toward the sensor unit 130 through both the nodding mirror 122 and the rotating polygonal mirror 127. Accordingly, an amount of laser which reaches the sensor unit 130 may be determined on the basis of the rotating polygonal mirror 127.

Here, emission of the laser reflected by the object 160 toward the sensor unit 130 through only the rotating polygonal mirror 127 may increase and make the amount of laser which reaches the sensor unit 130 more uniform than emission of the laser toward the sensor unit 130 through both the nodding mirror 122 and the rotating polygonal mirror 127.

In detail, when the laser reflected by the object 160 is projected toward the sensor unit 130 through only the rotating polygonal mirror 127, the amount of laser which reaches the sensor unit 130 may be determined on the basis of a size of the reflecting surfaces of the rotating polygonal mirror 127 and a rotation angle of the rotating polygonal mirror 127.

On the other hand, when the laser reflected by the object 160 is projected toward the sensor unit 130 through both the nodding mirror 122 and the rotating polygonal mirror 127, the amount of laser which reaches the sensor unit 130 may be determined on the basis of a size and a nodding angle of the nodding mirror 122, the size of the reflecting surfaces of the rotating polygonal mirror 127 and the rotation angle of the rotating polygonal mirror 127. That is, the amount of laser which reaches the sensor unit 130 may be determined on the basis of a smaller one of the size of the nodding mirror 122 and the size of the rotating polygonal mirror 127 and may vary according to the nodding angle of the nodding mirror 122 and the rotation angle of the rotating polygonal mirror 127. Accordingly, the amount of laser which reaches the sensor unit 130 may be smaller than when and may rapidly change when the laser is projected toward the sensor unit 130 through only the rotating polygonal mirror 127.

Hereinafter, structures of a lidar device according to a variety of embodiments will be described with reference to the drawings.

Figure 5:
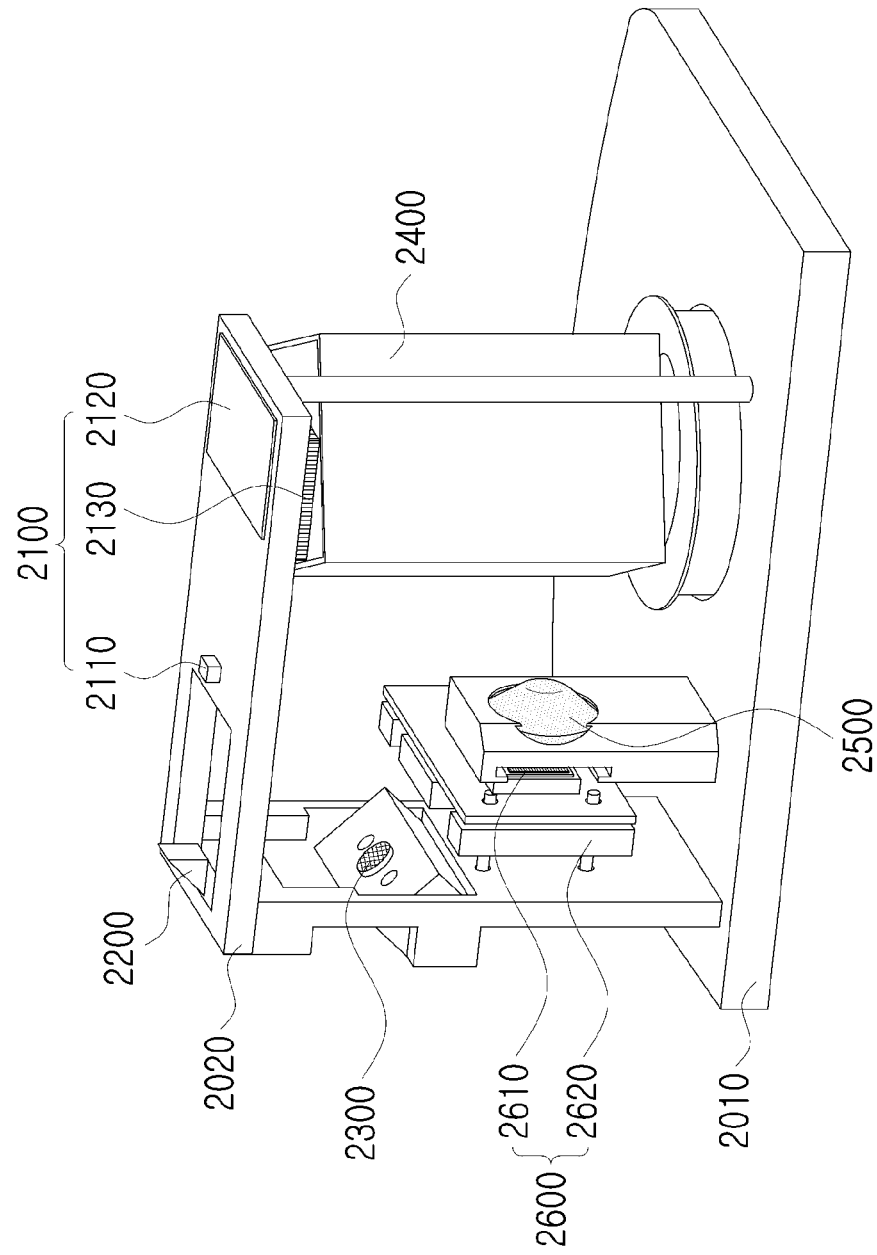
FIG. 5 is a perspective view of a lidar device according to one embodiment.

FIG. 5 is a perspective view of a lidar device according to one embodiment.

Referring to FIG. 5, a lidar device 2000 may include a laser emitting unit 2100, a flat mirror 2200, a nodding mirror 2300, a polygonal mirror 2400, a condensing lens 2500, and a sensor unit 2600. Hereinafter, components of the lidar device will be described in detail.

The lidar device 2000 may include a lower base 2010 provided as a flat panel shape and an upper base 2020 disposed to face the lower base 2010.

The laser emitting unit 2100 according to one embodiment may be installed on the upper base 2020. For example, the laser emitting unit 2100 may provide a laser emitted downward from a top thereof. The laser emitting unit 2100 may be installed on the upper base 2020 and may emit a laser toward the flat mirror 2200.

The laser emitting unit 2100 according to one embodiment may include a light source unit 2110 which generates a laser, a laser driver 2120 which is electrically connected to the light source unit 2110 and controls the light source unit 2110, and a laser dissipation unit 2130 for dissipating heat of the laser driver 2120.

The flat mirror 2200 according to one embodiment may be installed on the upper base 2020. For example, the flat mirror 2200 may reflect a laser emitted from the laser emitting unit 2100 toward the nodding mirror 2300. The flat mirror 2200 may be disposed on one side of the laser emitting unit 2100 and may reflect the emitted laser downward. Also, here, it is apparent that the flat mirror 2200 is an example of a means for changing a direction of a laser emitted from one direction through reflection, refraction, and the like and may be replaced by another optical means such as a prism.

The nodding mirror 2300 according to one embodiment may be installed below the flat mirror 2200. For example, the nodding mirror 2300 may receive a laser emitted by the laser emitting unit 2100 and reflected by the flat mirror 220. In detail, the nodding mirror 2300 may be installed at a height corresponding to an upper area which is a projection area of the polygonal mirror 2400. Here, the nodding mirror 2300 may reflect a laser toward a projection area of the polygonal mirror 2400.

Also, the nodding mirror 2300 may be provided as an MEMS mirror, a resonant mirror, a mirror galvanometer, and a diffusing lens.

The polygonal mirror 2400 according to one embodiment may be installed on one side of the nodding mirror 2300. For example, the polygonal mirror 2400 may obtain a laser reflected by the nodding mirror 2300. Here, the polygonal mirror 2400 may be installed between the upper base 2020 and the lower base 2010. Also, the polygonal mirror 2400 may rotate along an axis perpendicular to the lower base 2010 and the upper base 2020. For example, the polygonal mirror 2400 may rotate clockwise or counterclockwise. Also, a rotational axis of the polygonal mirror 2400 may be fixed to the lower base 2010.

The number of side-surfaces of the polygonal mirror 2400 is n, where n is natural number which is greater than 1. The polygonal mirror 2400 may be provided as a double-faced mirror, a triangular mirror, a square mirror, a hexagonal mirror, an octagonal mirror, and a twin-angle mirror.

The condensing lens 2500 according to one embodiment may be installed on one side of the polygonal mirror 2400. For example, the condensing lens 2500 may obtain a laser reflected by the polygonal mirror 2400. In detail, the condensing lens 2500 may be installed at a height corresponding to a lower area of a reception area of the polygonal mirror 2400. Here, the condensing lens 2500 may obtain a laser reflected by the reception area of the polygonal mirror 2400. Also, the condensing lens 2500 may be installed below the nodding mirror 2300. Also, a central axis of the condensing lens 2500 may meet with the polygonal mirror 2400. Accordingly, the condensing lens 2500 may obtain a laser reflected by the reception area of the polygonal mirror 2400.

The sensor unit 2600 according to one embodiment may be installed in an area adjacent to the condensing lens 2500. For example, the sensor unit 2600 may receive a laser which passes through the condensing lens 2500. In detail, the sensor unit 2600 may be installed to have a height corresponding to the condensing lens 2500. Accordingly, the sensor unit 2600 may be installed below the nodding mirror 2300. Also, a distance between the polygonal mirror 2400 and the sensor unit 2600 may be longer than a distance between the polygonal mirror 2400 and the condensing lens 2500 so as to allow the laser reflected by the polygonal mirror 2400 to pass through the condensing lens 2500 and then to be sensed by the sensor unit 2600.

Here, the sensor unit 2600 may include a sensing unit 2610 which senses a received laser and a sensor dissipation unit 2620 for dissipating heat of the sensing unit 2610. For example, the sensing unit 2610 may be provided as an array including photodiodes, and the sensor dissipation unit 2620 may include a heat sink and a heat fin for dissipating heat of the sensing unit 2610.

A laser emitted as a point light source shape from the laser emitting unit 2100 may be reflected by the nodding mirror 2300 which nods along an axis parallel to the lower base 2010 so as to form a line beam pattern perpendicular to the lower base 2010. Here, the laser of the line beam pattern which is reflected by the nodding mirror 2300 may be reflected by the polygonal mirror 2400 which rotates along an axis perpendicular to the lower base 2010 so as to form a plane beam pattern. Also, the laser of the plane beam pattern which is reflected by the polygonal mirror 2400 may be projected toward an object outside the lidar device, and the laser reflected by the object may be reflected by the polygonal mirror 2400, may pass through the condensing lens 2500, and then may be received by the sensor unit 2600.

Meanwhile, a laser path from the light source unit 2110 to the nodding mirror 2300 may be defined as a first light path. Also, a laser path from the nodding mirror 2300 to the polygonal mirror 2400 may be defined as a second light path. Also, a laser path from the polygonal mirror 2400 to the sensing unit 2610 may be defined as a third light path.

Hereinafter, arrangement of the components of the lidar device 2000 will be described with reference to the drawings.

Figure 6:
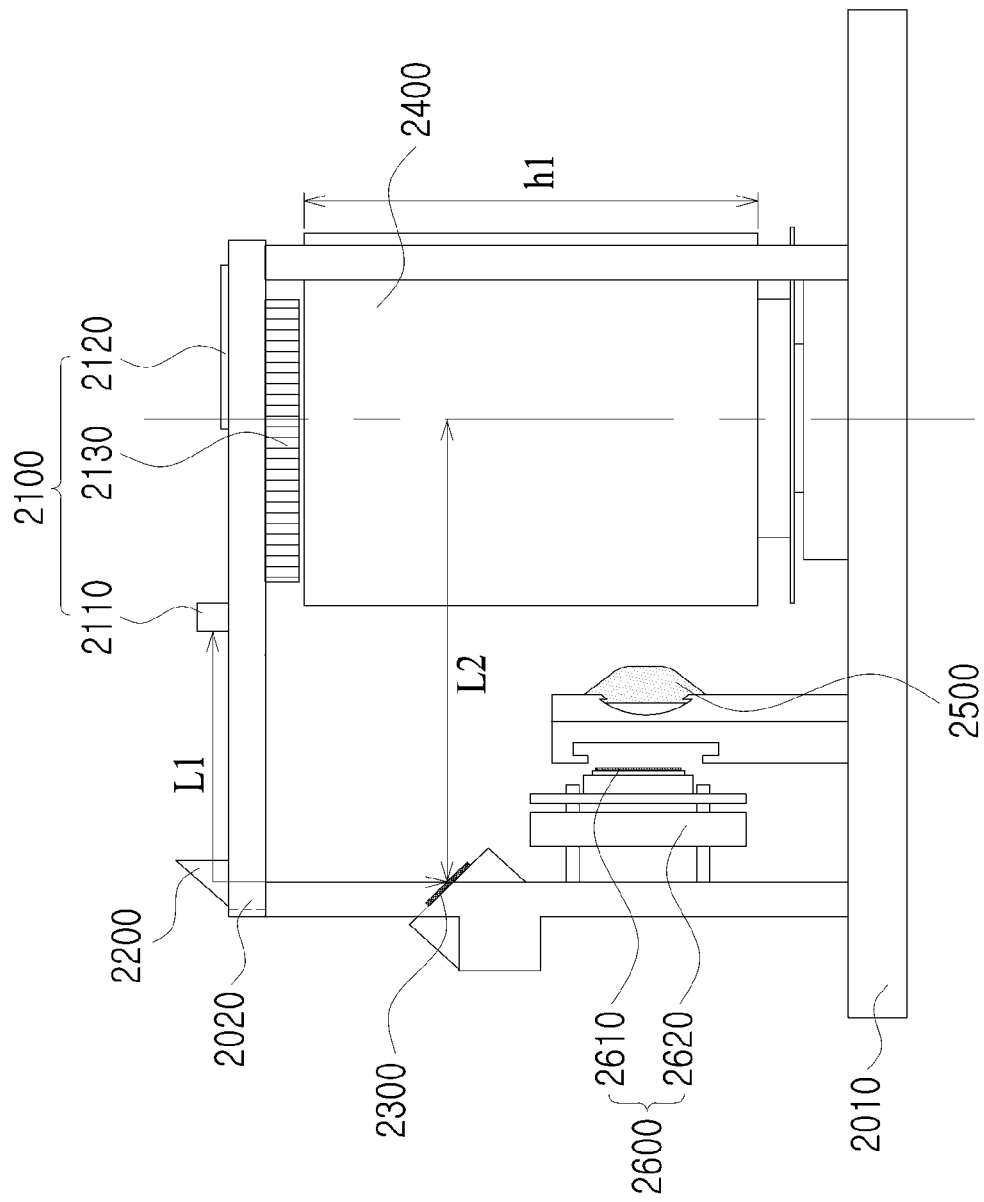
FIGS. 6 to 8 are side views of lidar devices according to a variety of embodiments.
Figure 7:
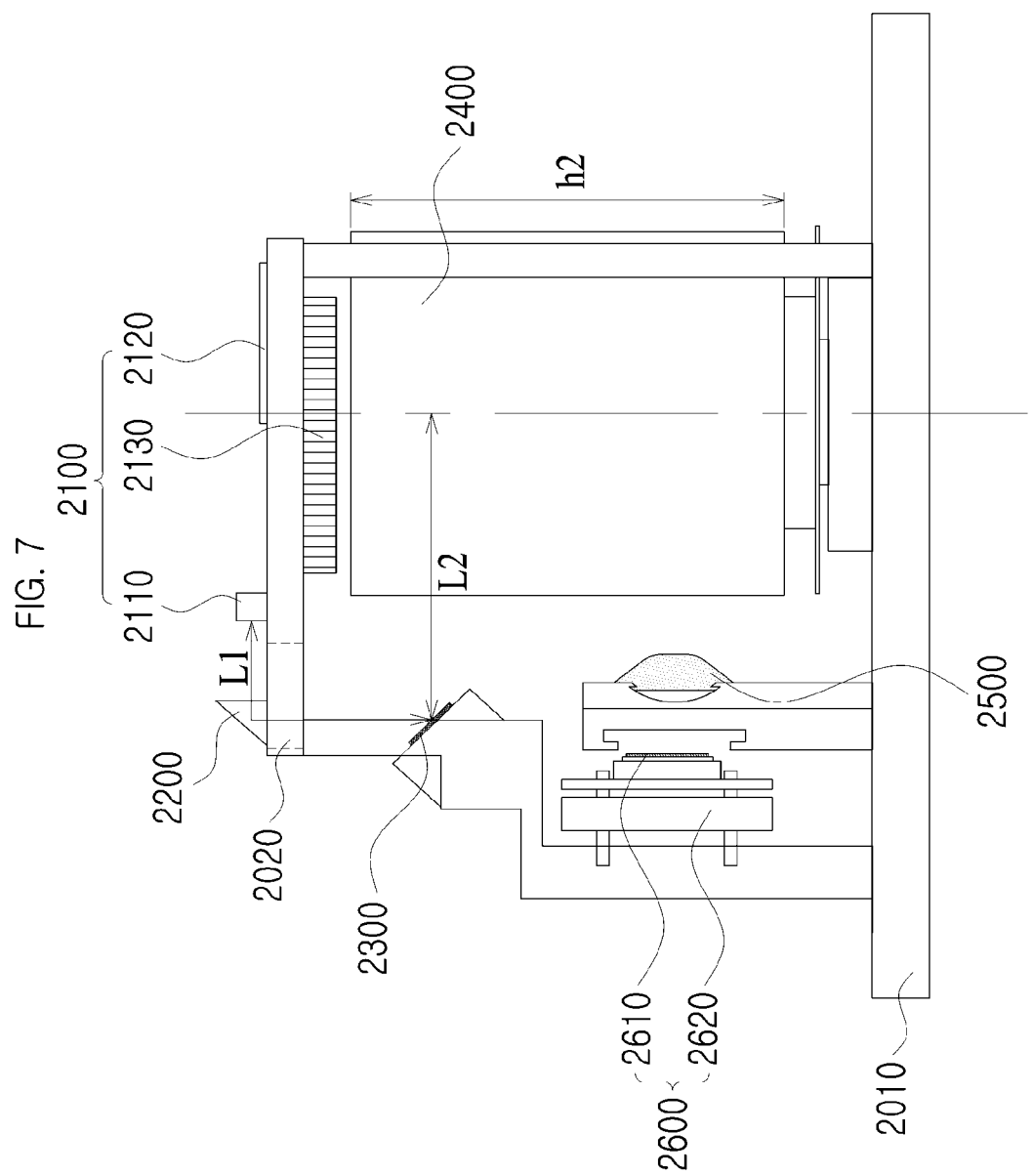
Figure 8:
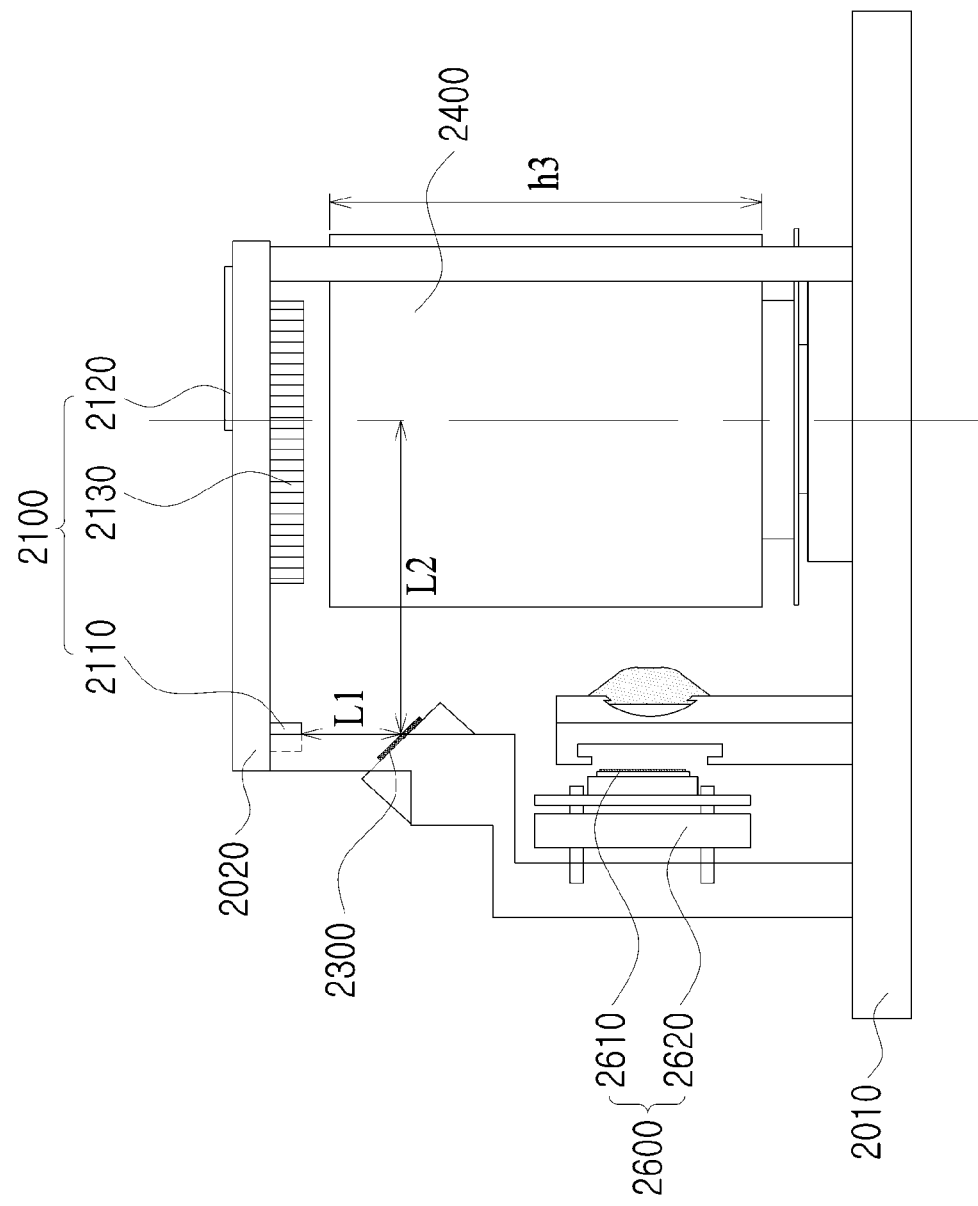

FIGS. 6 to 8 are side views of the lidar device for illustrating a variety of embodiments.

Referring to FIGS. 6 to 8, the lidar device 2000 may include the laser emitting unit 2100, the flat mirror 2200, the nodding mirror 2300, the polygonal mirror 2400, the condensing lens 2500, and the sensor unit 2600. Also, although not shown in the drawings, the lidar device 2000 may include a control unit 2700.

In FIGS. 6 and 7, the laser emitting unit 2100 may include the light source unit 2110 which generates a laser. The light source unit 2110 may be installed on the upper base 2020 of the lidar device 2000 and may emit a laser in one direction.

As an example, the light source unit 2110 may be installed on top of the upper base 2020. Here, the light source unit 2110 may emit a laser in a direction parallel to the upper base 2020. Also, the lidar device 2000 may include the flat mirror 2200 which reflects the laser emitted from the light source unit 2110. The flat mirror 2200 may reflect a laser, which is emitted in a direction parallel to the upper base 2020, in a direction vertical to the upper base 2020.

The upper base 2020 may include a through hole. Here, the laser reflected by the flat mirror 2200 may be emitted in a direction vertical to the upper base 2020. Accordingly, the laser reflected by the flat mirror 2200 in a perpendicular direction may pass through the through hole and be emitted downward from top.

As another example, the light source unit 2110 may be installed on a bottom of the upper base 2020. Here, the light source unit 2110 may emit a laser in a direction parallel to the upper base 2020. Also, the lidar device 2000 may include the flat mirror 2200 which reflects the laser emitted from the light source unit 2110. Here, the flat mirror 2200 may be disposed below the upper base 2020 and may reflect the laser, which is emitted in the horizontal direction, in the horizontal direction. In this case, the through hole for passing the laser in the vertical direction may not be included.

Also, the laser reflected by the flat mirror 2200 in the vertical direction may be projected toward the nodding mirror 2300. Here, when the light source unit 2110 is installed on the bottom of the upper base 2020, a travel path of a laser emitted from the light source unit 2110 toward the nodding mirror 2300 may decrease. Accordingly, when a laser projected toward the nodding mirror 2300 is diffused, a size of the laser projected toward the nodding mirror 2300 may decrease. Accordingly, the nodding mirror 2300 which reflects the emitted laser may be manufactured in a small size.

Also, although not shown in the drawings, the lidar device 2000 may include a collimator which is disposed between the light source unit 2110 and the flat mirror 2200 and makes a laser emitted from the light source unit 2110 more uniform.

FIG. 8 is a side view illustrating the light source unit 2110 according to another embodiment.

Referring to FIG. 8, the light source unit 2110 may emit a laser downward from top. Here, the light source unit 2110 may be installed on the upper base 2020 of the lidar device 2000.

As an example, the light source unit 2110 may be installed on the bottom of the upper base 2020. Here, the light source unit 2110 may be connected to the bottom of the upper base 2020 and may emit a laser toward the nodding mirror 2300. Also, when the light source unit 2110 is installed on the bottom of the upper base 2020, a light path of an emitted laser from the light source unit 2110 to the nodding mirror 2300 may decrease. Accordingly, when a laser projected toward the nodding mirror 2300 is diffused, a size of the projected laser may decrease. Accordingly, the nodding mirror 2300 which reflects the projected laser may be manufactured in a small size.

As another example, the light source unit 2110 may be installed on top of the upper base 2020. Here, the upper base 2020 may include a through hole through which a laser emitted from the light source unit 2110 passes.

Also, in FIGS. 6 to 8, the laser emitting unit 2100 may include the laser driver 2120 which controls an operation of the light source unit 2110. In detail, the laser driver 2120 may control the operation of the light source unit 2110 by receiving a signal from the control unit 2700 and applying a current to the light source unit 2110.

The laser driver 2120 may be connected to the light source unit 2110 to control the operation of the light source unit 2110. Here, the laser driver 2120 may be installed on one side of the upper base 2020 of the lidar device 2000.

For example, the laser driver 2120 may be installed on top of the upper base 2020. Also, the laser driver 2120 may be installed on the bottom of the upper base 2020.

Also, the laser emitting unit 2100 according to one embodiment may include the laser dissipation unit 2130 for dissipating heat of the light source unit 2110 and the laser driver 2120. The laser dissipation unit 2130 may be installed on the upper base 2020 of the lidar device 2000 and may discharge heat generated by the light source unit 2110 and the laser driver 2120. In detail, the laser dissipation unit 2130 may discharge heat transferred from the light source unit 2110 and the laser driver 2120 through heat exchange with outdoor air. Here, the laser dissipation unit 2130 may include a heat sink, a heat fin, a heat pipe, and/or a heat fin plate. Also, the laser dissipation unit 2130 is not limited thereto and may include any component for achieving the same object.

The laser dissipation unit 2130 according to one embodiment may be installed in an area adjacent to the laser driver 2120. In detail, the laser dissipation unit 2130 may be installed on the upper base 2020 of the lidar device 2000 where the laser driver 2120 is installed. As an example, the laser dissipation unit 2130 may be installed on the bottom of the upper base 2020.

Meanwhile, a length of the first light path may be defined as a first length L1. Here, a height of the polygonal mirror 2400 may vary according to the first length L1. For example, when a laser, which is emitted from the light source unit 2110 toward the polygonal mirror 2400, is diffused, a size of the emitted laser increases as the first length L1 increases. Accordingly, as the first length L1 increases, it is necessary to increase the height of the polygonal mirror 2400 toward which a laser reflected by the light source unit 2110 is emitted. In particular, it may be necessary to increase a height of the projection area of the polygonal mirror 2400 for receiving the laser reflected by the light source unit 2110 as the first length L1 increases.

In detail, the light source unit 2110 according to an embodiment of FIG. 7 may be disposed on top of the upper base 2020. On the other hand, the light source unit 2110 according to an embodiment of FIG. 8 may be disposed on the bottom of the upper base 2020. Accordingly, the first length L1 according to the embodiment of FIG. 8 may be shorter than the first length L1 according to the embodiment of FIG. 7. Accordingly, a second height h2 which is a height of the polygonal mirror 2400 according to the embodiment of FIG. 7 may be higher than a third height h3 which is a height of the polygonal mirror 2400 according to the embodiment of FIG. 8.

Meanwhile, when a laser in the form of a point light source emitted from the light source unit 2110 is reflected by the nodding mirror 2300, the laser may have a line beam pattern. In detail, the nodding mirror 2300 may reflect the laser in the form of a point light source as the line beam pattern by nodding along an axis parallel to the upper base 2020 of the lidar device 2000.

Here, the laser emitted from the light source unit 2110 and projected by the nodding mirror 2300 may be diffused. In this case, as a size of the laser increases, it is necessary to increase a size of the nodding mirror 2300 which receives and reflects the laser. Also, when the size of the nodding mirror 2300 is smaller than a size of the received laser, a light amount of the laser reflected by the nodding mirror 2300 may decrease.

Hereupon, as shown in FIGS. 6 and 7, the nodding mirror 2300 may be disposed directly under the flat mirror 2200 which reflects a horizontal light emitted from the light source unit 2110 directly downward. Accordingly, a length of a laser path from the light source unit 2110 to the nodding mirror 2300 may be minimized. Accordingly, the nodding mirror 2300 may be manufactured in a small size.

Also, as shown in FIG. 8, when the lidar device does not include the flat mirror 2200, the nodding mirror 2300 may be disposed directly under the light source unit 2110. Accordingly, a length of a laser path of a laser emitted from the light source unit 2110 and is projected toward the nodding mirror 2300 may be minimized. Accordingly, the nodding mirror 2300 may be manufactured in a small size.

Meanwhile, the nodding mirror 2300 may be disposed on one side of the polygonal mirror 2400 in order to reflect an obtained laser toward the polygonal mirror 2400. In detail, the nodding mirror 2300 may be installed at a height corresponding to a height of a projection area of the polygonal mirror 2400. Accordingly, the laser emitted from the laser emitting unit 2100 and reflected by the nodding mirror 2300 may be projected toward the projection area of the polygonal mirror 2400.

Meanwhile, a length of the second light path may be defined as a second length L2. Also, a rotational radius of the polygonal mirror 2400 may be defined as R, and a rotational diameter thereof may be defined as 2R. Here, the second length L2 may be larger than at least the rotational radius R of the polygonal mirror 2400 so as to not allow the nodding mirror 2300 to collide with the polygonal mirror 2400.

Also, a height of the polygonal mirror 2400 may vary according to the second length L2. For example, when a laser, which is projected from the nodding mirror 2300 toward the polygonal mirror 2400, is diffused, a size of the projected laser increases as the second length L2 increases. Accordingly, as the second length L2 increases, it is necessary to increase the height of the polygonal mirror 2400 toward which a laser reflected by the nodding mirror 2300 is projected. In particular, it may be necessary to increase a height of the projection area of the polygonal mirror 2400 for receiving the laser reflected by the nodding mirror 2300 as the second length L2 increases.

As shown in FIG. 6, the second length L2 may be greater than a distance from the sensing unit 2610 to the rotational axis of the polygonal mirror 2400. Also, the second length L2 may be greater than a distance from the condensing lens 2500 to the rotational axis of the polygonal mirror 2400. Also, here, the polygonal mirror 2400 may have a height h1.

As shown in FIGS. 7 and 8, the second length L2 may be shorter than 2R. Also, the second length L2 may be shorter than a distance from the sensing unit 2610 to the rotational axis of the polygonal mirror 2400. Also, the second length L2 may be shorter than the distance from the condensing lens 2500 to the rotational axis of the polygonal mirror 2400. Here, the polygonal mirror 2400 may have the height h2 lower than the first height h1.

Also, the second length L2 may be equal to R. Here, a laser path length from the nodding mirror 2300 to the polygonal mirror 2400 may be minimized. Accordingly, it is possible to miniaturize the polygonal mirror 2400. In particular, it is possible to minimize the height of the projection area of the polygonal mirror 2400.

A laser projected toward an external object through the projection area of the polygonal mirror 2400 may be reflected by the object and be received by a reception area of the polygonal mirror 2400. Also, the laser received by the reception area may be reflected by the reception area, pass through the condensing lens 2500, and then be sensed by the sensing unit 2610.

Here, the reception area may be located in the lower area of the polygonal mirror 2400. Accordingly, the sensing unit 2610 may be disposed corresponding to a height of the reception area in order to receive the laser reflected by the reception area. For example, when viewed from the side, the height of the reception area may be equal to a height of the center of the sensing unit 2610.

Meanwhile, a temperature of the sensing unit 2610 may increase while the sensing unit 2610 senses the received laser. Also, a temperature of the laser driver 2120 which controls the light source unit 2110 emitting the laser may increase while the laser is emitted. Also, as the sensor unit 2600 and the laser emitting unit 2100 are close to each other, signal interference between the sensor unit 2600 and the laser emitting unit 2100 may increase.

Hereupon, the sensing unit 2610 may be spaced apart from the laser driver 2120 to prevent the lidar device from being heated. As an example, the sensing unit 2610 may be disposed on an opposite side from the laser driver 2120 on the basis of the nodding mirror 2300 when viewed from the side. In detail, when viewed from the side, the sensing unit 2610 may be disposed on a left side of the nodding mirror 2300 and the laser driver 2120 may be disposed on a right side of the nodding mirror 2300. As another example, the sensing unit 2610 may be disposed at a diagonal position to the laser driver 2120 on the basis of the nodding mirror 2300 when viewed from the side. In detail, when viewed from the side, the sensing unit 2610 may be disposed on a bottom left side of the nodding mirror 2300 and the laser driver 2120 may be disposed on a top right side of the nodding mirror 2300.

Accordingly, it is possible to prevent the lidar device 2000 from being overheated while operating. Also, the signal interference between the sensor unit 2600 and the laser emitting unit 2100 may be prevented.

The condensing lens 2500 according to one embodiment may be installed on one side of the sensing unit 2610. For example, the condensing lens 2500 may be disposed between the sensing unit 2610 and the polygonal mirror 2400. Accordingly, the condensing lens 2500 may condense a laser reflected by the polygonal mirror 2400.

Meanwhile, disposition of the condensing lens 2500 may vary according to arrangement of the light source unit 2110 and the nodding mirror 2300 and a size of the polygonal mirror 2400.

Hereinafter, the disposition of the condensing lens 2500 in consideration of the arrangement of the light source unit 2110 and the nodding mirror 2300 and the size of the polygonal mirror 2400 will be described. First, arrangement of the light source unit 2110 and the nodding mirror 2300 according to one embodiment will be described.

Figure 9:
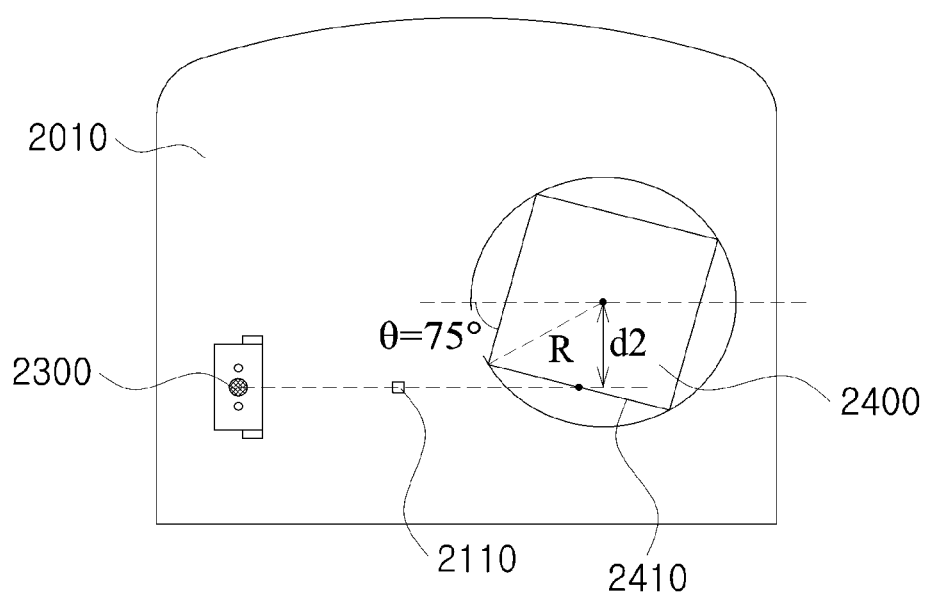
FIG. 9 is a view illustrating arrangement of a light source unit and a nodding mirror according to one embodiment.

FIG. 9 is a view illustrating arrangement of the light source unit and the nodding mirror according to one embodiment.

When viewed from above, a shortest distance between a straight line, which passes through a center of the light source unit 2110 and a center of the nodding mirror 2300, and a central axis of the polygonal mirror 2400 may be defined as a second distance d2.

Also, when viewed from above, one surface of the polygonal mirror 2400 where the straight line, which passes through the center of the light source unit 2110 and the center of the nodding mirror 2300, and the polygonal mirror 2400 meet each other may be defined as an emission surface 2410.

Also, when viewed from above, when the straight line, which passes through the center of the light source unit 2110 and the center of the nodding mirror 2300, meets the emission surface 2410 at a right angle, a rotation angle θ of the polygonal mirror 2400 may be 90°×n (n is an integer).

The light source unit 2110 according to one embodiment, when viewed from above, may be disposed such that the straight line, which passes through the center of the light source unit 2110 and the center of the nodding mirror 2300, passes through a perpendicular central line of the emission surface 2410. Also, the nodding mirror 2300 according to one embodiment, when viewed from above, may be disposed such that the straight line, which passes through the center of the light source unit 2110 and the center of the nodding mirror 2300, passes through the perpendicular central line of the emission surface 2410.

In detail, when viewed from above, the straight line, which passes through the center of the light source unit 2110 and the center of the nodding mirror 2300, may meet the perpendicular central line of the emission surface 2410 when the rotation angle θ of the polygonal mirror 2400 is 75°. Here, the perpendicular central line of the emission surface 2410 may be understood as a line which passes through a center of the emission surface 2410 and is perpendicular to the lower base 10. Also, the perpendicular central line of the emission surface 2410 may be understood as the same meaning hereafter.

Meanwhile, here, the second distance d2 may be $$\frac{R}{\sqrt{2}} \times \cos 15°.$$

Also, when viewed from above, a horizontal width of a laser beam emitted from the light source unit 2110 may be identical to a perpendicular length of the emission surface 2410 when the rotation angle θ of the polygonal mirror 2400 is 75°. Here, the perpendicular length may be defined as a length in a direction perpendicular to the central axis of the condensing lens 2500 when viewed from above.

Meanwhile, the disposition of the condensing lens 2500 may vary according to the size of the polygonal mirror 2400. In detail, the disposition of the condensing lens 2500 may vary according to a width Wp of the emission surface 2410 of the polygonal mirror 2400. Also, a condensing area of the condensing lens 2500 may vary according to the disposition of the condensing lens 2500. Meanwhile, a condensing area of the condensing lens 2500 may be defined as an area of the emission surface 2410 projected onto the condensing lens 2500 while the polygonal mirror 2400 rotates 360°. Also, hereafter, the condensing area of the condensing lens 2500 may be understood as an average area of the emission surface 2410 projected onto the condensing lens 2500 while the polygonal mirror 2400 rotates 360°.

Meanwhile, a measurable distance of the lidar device 2000 may vary according to the condensing area.

Figure 10:
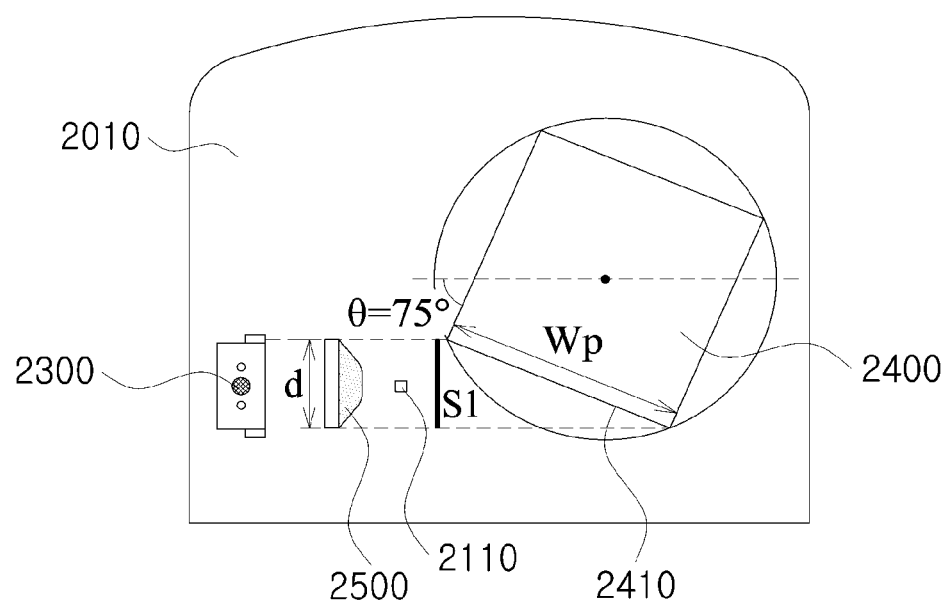
FIGS. 10 to 14 are top views illustrating dispositions of a condensing lens according to a variety of embodiments.

FIG. 10 is a top view illustrating disposition of the condensing lens according to one embodiment.

Referring to FIG. 10, the light source unit 2110 and the nodding mirror 2300, when viewed from above, may be arranged such that the straight line, which passes through the center of the light source unit 2110 and the center of the nodding mirror 2300, passes through the perpendicular central line of the emission surface 2410. Also, the rotation angle θ of the polygonal mirror 2400 according to one embodiment may be 75°.

Here, the polygonal mirror 2400 according to one embodiment may satisfy Equation $$Wp = \frac{d}{\cos 75°}.$$

That is, the width Wp of the emission surface 2410 of the polygonal mirror 2400 may be equal to $$Wp = \frac{d}{\cos 75°}.$$

Here, d is a size of a diameter of the condensing lens 2500.

Here, the condensing lens 2500, when viewed from above, may be disposed such that the center thereof is located on a straight line which passes through the nodding mirror 2300 and the light source unit 2110. Accordingly, when viewed from above, the center of the condensing lens 2500, the center of the light source unit 2110, the center of the nodding mirror 2300, and the perpendicular central line may be arranged on one straight line. That is, the center of the condensing lens 2500, when viewed from above, may be disposed in alignment with the straight line which passes through the nodding mirror 2300 and the light source unit 2110.

Accordingly, the condensing lens 2500 may obtain a laser reflected by the emission surface 2410. Also, a laser gain of the condensing lens may be increased.

Meanwhile, as shown in FIG. 10, the condensing area of the condensing lens 2500 may be a first area S1.

Meanwhile, the polygonal mirror 2400 according to another embodiment may satisfy Equation $$W_p < \frac{d}{\cos 75°}.$$

That is, the width Wp of the emission surface 2410 of the polygonal mirror 2400 may be smaller than $$\frac{d}{\cos 75°}.$$

Accordingly, a size of the polygonal mirror 2400 may be smaller than the size of the polygonal mirror 2400 according to an embodiment of FIG. 10. Accordingly, it may be possible to miniaturize the lidar device 2000.

Meanwhile, the condensing lens 2500 may be disposed at a variety of positions. Hereinafter, disposition of the condensing lens 2500 according to a variety of embodiments which satisfy Equation $$Wp < \frac{d}{\cos 75°}$$

will be described.

Figure 11:
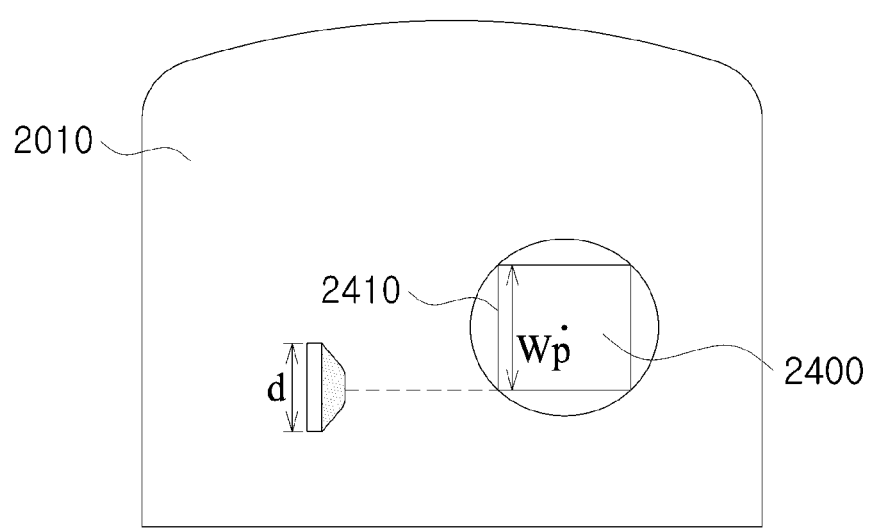

FIG. 11 is a view illustrating disposition of the condensing lens according to one embodiment.

Referring to FIG. 11, the rotation angle θ of the polygonal mirror 2400 may be 0°. Also, the width Wp of the emission surface 2410 of the polygonal mirror 2400 may be smaller than $$\frac{d}{\cos 75°}.$$

Also, although not shown in the drawing, the light source unit 2110 and the nodding mirror 2300 may be arranged like an embodiment of FIG. 9. That is, the light source unit 2110 and the nodding mirror 2300 may be arranged such that the straight line, which passes through the center of the light source unit 2110 and the center of the nodding mirror 2300, passes through the perpendicular central line of the emission surface 2410 when the rotation angle θ of the polygonal mirror 2400 is 75°. Also, here, the second distance d2 may be $$\frac{R}{\sqrt{2}} \times \cos 15°.$$

The condensing lens 2500 according to one embodiment may be disposed such that the central axis thereof meets an end of the emission surface 2410. Accordingly, when viewed from above, the central axis of the condensing lens 2500 may meet a corner of the polygonal mirror 2400. Here, the rotation angle θ of the polygonal mirror 2400 may be 0°. That is, the condensing lens 2500 may be disposed such that the central axis thereof meets the end of the emission surface 2410 when the rotation angle θ of the polygonal mirror 2400 is 0°.

Here, a condensing area of the condensing lens 2500 may be a second area S2. Also, the second area S2 may be, on average, smaller than the first area S1. Accordingly, the measurable distance of the lidar device according to the embodiment of FIG. 10 may be longer than a measurable distance of the lidar device according to an embodiment of FIG. 11.

Figure 12:
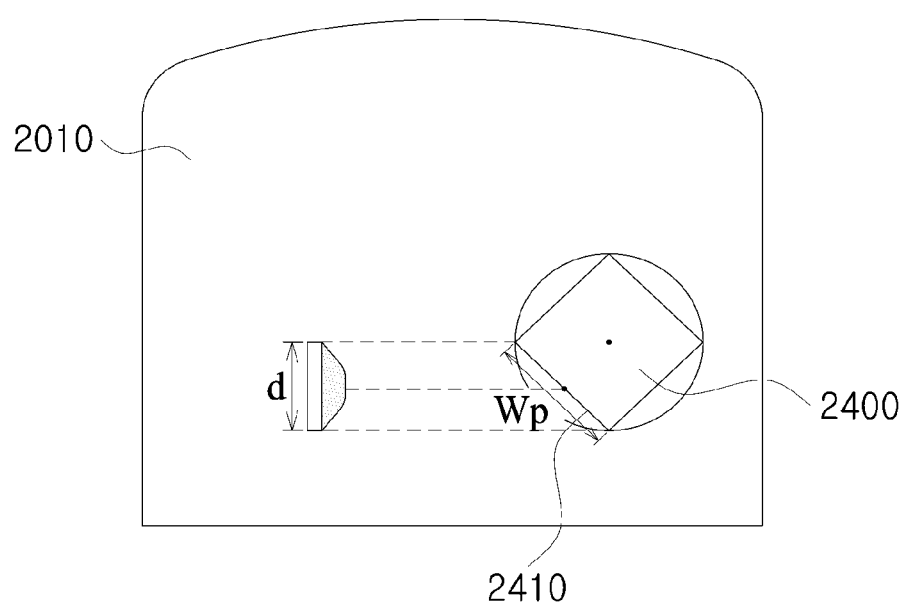

FIG. 12 is a view illustrating disposition of the condensing lens according to another embodiment.

Referring to FIG. 12, the rotation angle θ of the polygonal mirror 2400 may be 45°. Also, the width Wp of the emission surface 2410 of the polygonal mirror 2400 may be smaller than $$\frac{d}{\cos 75°}.$$

Also, although not shown in the drawing, the light source unit 2110 and the nodding mirror 2300 may be arranged like the embodiment of FIG. 9. That is, the light source unit 2110 and the nodding mirror 2300 may be arranged such that the straight line, which passes through the center of the light source unit 2110 and the center of the nodding mirror 2300, passes through the perpendicular central line of the emission surface 2410 when the rotation angle θ of the polygonal mirror 2400 is 75°. Also, here, the second distance d2 may be $$\frac{R}{\sqrt{2}} \times \cos 15°.$$

The condensing lens 2500 according to one embodiment may be disposed such that the central axis thereof meets the perpendicular central line of the emission surface 2410. Here, the rotation angle θ of the polygonal mirror 2400 may be 45°. That is, the condensing lens 2500 may be disposed such that the central axis thereof meets the perpendicular central line of the emission surface 2410 when the rotation angle θ of the polygonal mirror 2400 is 45°.

Here, a condensing area of the condensing lens 2500 may be a third area S3. Also, the third area S3 may be, on average, smaller than the first area S1. Accordingly, the measurable distance of the lidar device according to the embodiment of FIG. 10 may be longer than a measurable distance of the lidar device according to an embodiment of FIG. 12.

Figure 13:
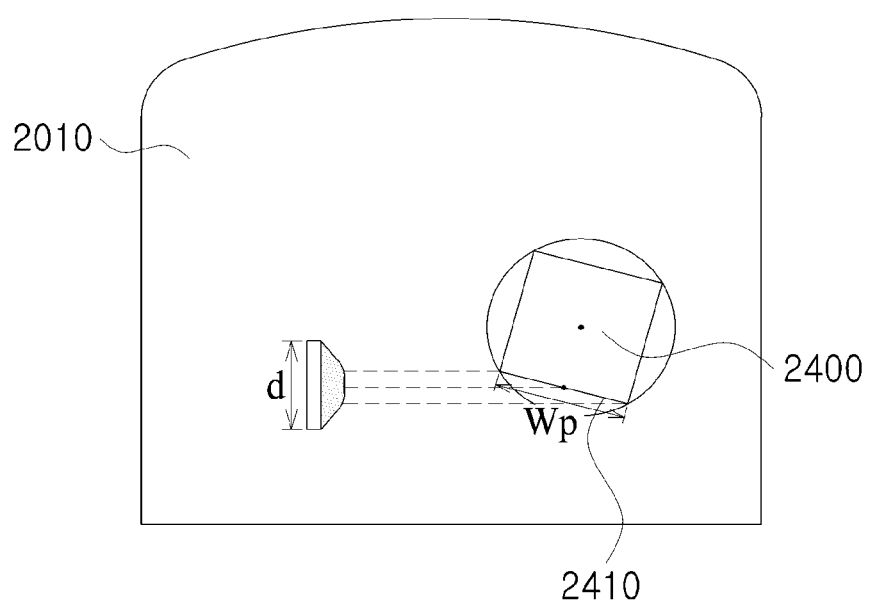

FIG. 13 is a view illustrating disposition of the condensing lens according to still another embodiment.

Referring to FIG. 13, the rotation angle θ of the polygonal mirror 2400 may be 75°. Also, the width Wp of the emission surface 2410 of the polygonal mirror 2400 may be smaller than $$\frac{d}{\cos 75°}.$$

Also, although not shown in the drawing, the light source unit 2110 and the nodding mirror 2300 may be arranged like the embodiment of FIG. 9. That is, the light source unit 2110 and the nodding mirror 2300 may be arranged such that the straight line, which passes through the center of the light source unit 2110 and the center of the nodding mirror 2300, passes through the perpendicular central line of the emission surface 2410 when the rotation angle θ of the polygonal mirror 2400 is 75°. Also, here, the second distance d2 may be $$\frac{R}{\sqrt{2}} \times \cos 15°.$$

The condensing lens 2500 according to one embodiment may be disposed such that the central axis thereof meets the perpendicular central line of the emission surface 2410. Here, the rotation angle θ of the polygonal mirror 2400 may be 75°. That is, the condensing lens 2500 may be disposed such that the central axis thereof meets the perpendicular central line of the emission surface 2410 when the rotation angle θ of the polygonal mirror 2400 is 75°.

Here, a condensing area of the condensing lens 2500 may be a fourth area S4. Also, the fourth area S4 may be, on average, smaller than the first area S1. Accordingly, the measurable distance of the lidar device according to the embodiment of FIG. 10 may be longer than a measurable distance of the lidar device according to an embodiment of FIG. 13.

Also, the fourth area S4 may be, on average, larger than the second area S2 or the third area S3. Accordingly, the measurable distance of the lidar device according to the embodiment of FIG. 13 may be longer than a measurable distance of the lidar device according to the embodiment of FIG. 11 or 12.

Figure 14:
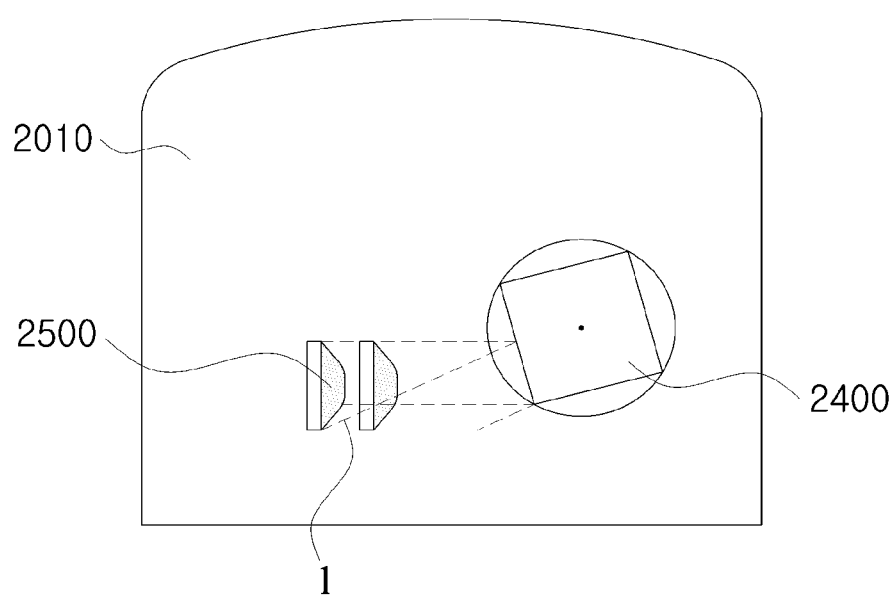

Meanwhile, a condensing area of the condensing lens 2500 may vary according to a distance between the condensing lens 2500 and the polygonal mirror 2400. Referring to FIG. 14, the condensing lens 2500 may be disposed at a first position relatively far from the polygonal mirror 2400 and a second position relatively close thereto. When the condensing lens 2500 is disposed at the second position, an auxiliary line 1 which indicates a closest scanning range may overlap with the condensing lens 2500. In this case, a laser projected toward the polygonal mirror 2400 from the outside may be blocked by the condensing lens 2500. Accordingly, a substantial condensing area of the condensing lens 2500 may be reduced.

Accordingly, so as to not allow the substantial condensing area of the condensing lens 2500 to be reduced, it may be necessary to space the condensing lens 2500 and the polygonal mirror 2400 a certain distance or more apart. For example, the condensing lens 2500 may be disposed at least at the first position.

Hereinafter, a variety of embodiments will be described with reference to top views of the lidar device. In detail, a scanning range of the lidar device and a condensing area of the condensing lens according to arrangement of the components of the lidar device will be described.

FIGS. 15 to 20 are top views of lidar devices according to a variety of embodiments. Referring to FIGS. 15 to 20, the lidar device 2000 may include the condensing lens 2500 which is disposed between the sensing unit 2610 and the polygonal mirror 2400 and makes a laser reflected by the polygonal mirror 2400 a parallel ray or a convergent ray.

Also, when viewed from above, the sensing unit 2610 may be disposed such that a center thereof is located on the central axis of the condensing lens 2500. Accordingly, a light amount of a laser obtained by the sensing unit 2610 may increase.

When viewed from above, a first light path from the light source unit 2110 to the nodding mirror 2300 may be parallel to the central axis of the condensing lens 2500. Also, a second light path from the nodding mirror 2300 to the polygonal mirror 2400 may be parallel to the central axis of the condensing lens 2500. Also, a third light path from the polygonal mirror 2400 to the sensing unit 2610 may be parallel to the central axis of the condensing lens 2500.

Also, when viewed from above, the first light path, the second light path, and the third light path may be located on one straight line. Accordingly, the lidar device 2000 may be structurally simplified and may be miniaturized.

Also, a distance between the central axis of the condensing lens 2500 and the rotational axis of the polygonal mirror 2400 may be smaller than R. Here, a light amount of the laser reflected by the polygonal mirror 2400 and received by the condensing lens 2500 may increase. Also, a light amount of laser reflected by the polygonal mirror 2400 and obtained by the sensing unit 2610 may increase. Accordingly, a measurable distance of the lidar device 2000 may increase. Also, intensity of laser necessary for measuring a distance may decrease.

Also, as described above, when viewed from above, a shortest distance between the straight line, which passes through the center of the light source unit 2110 and the center of the nodding mirror 2300, and the central axis of the polygonal mirror 2400 may be defined as the second distance d2. Here, the second distance d2 may be smaller than R. Accordingly, a laser emitted from the light source unit 2110 may be projected toward the polygonal mirror 2400.

Also, a position of a central axis of a horizontal scanning range of the lidar device 2000 may vary according to the second distance d2. For example, when the second distance d2 is equal to R, the central axis of the horizontal scanning range of the lidar device 2000 may be perpendicular to the central axis of the condensing lens 2500.

Also, a condensing area of the condensing lens 2500 may vary according to the rotation angle θ of the polygonal mirror 2400, a size of the polygonal mirror 2400, and the second distance d2. Meanwhile, as described above, the condensing area of the condensing lens 2500 may be understood as an area of the emission surface 2410 projected onto the condensing lens 2500 while the polygonal mirror 2400 rotates 360°. For example, in FIG. 16, the condensing area of the condensing lens 2500 may be a fifth area S5.

Also, the light amount of laser obtained by the sensing unit 2610 may vary according to the condensing area of the condensing lens 2500. Also, the measurable distance of the lidar device 2000 may vary according to the light amount of laser obtained by the sensing unit 2610.

Meanwhile, the light source unit 2110, the nodding mirror 2300, the polygonal mirror 2400, the condensing lens 2500, and the sensing unit 2610 of the lidar device 2000 may be arranged in a variety of ways.

Hereinafter, the arrangement of the light source unit 2110, the nodding mirror 2300, the polygonal mirror 2400, the condensing lens 2500, and the sensing unit 2610 will be described.

Figure 15:
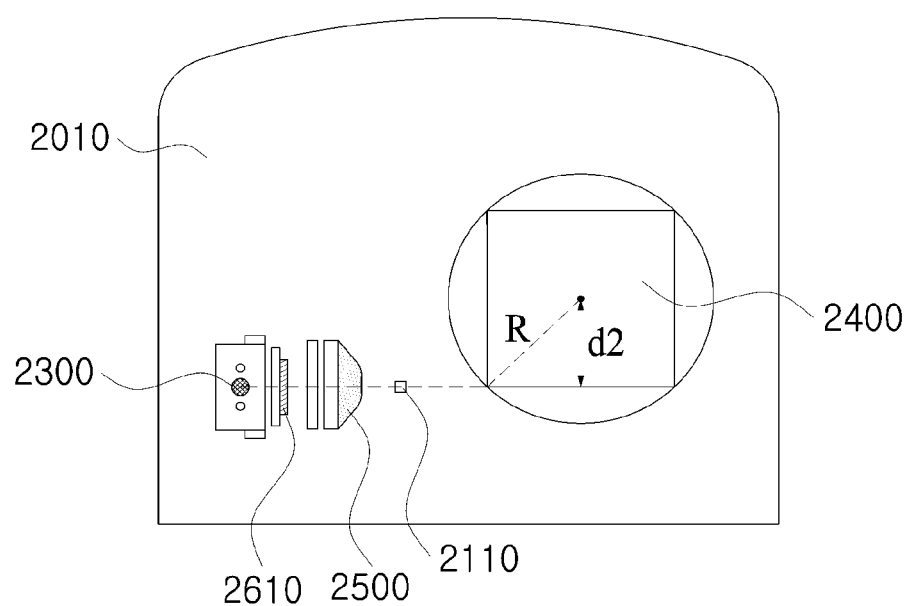
FIGS. 15 to 20 are top views of lidar devices according to a variety of embodiments.
Figure 16:
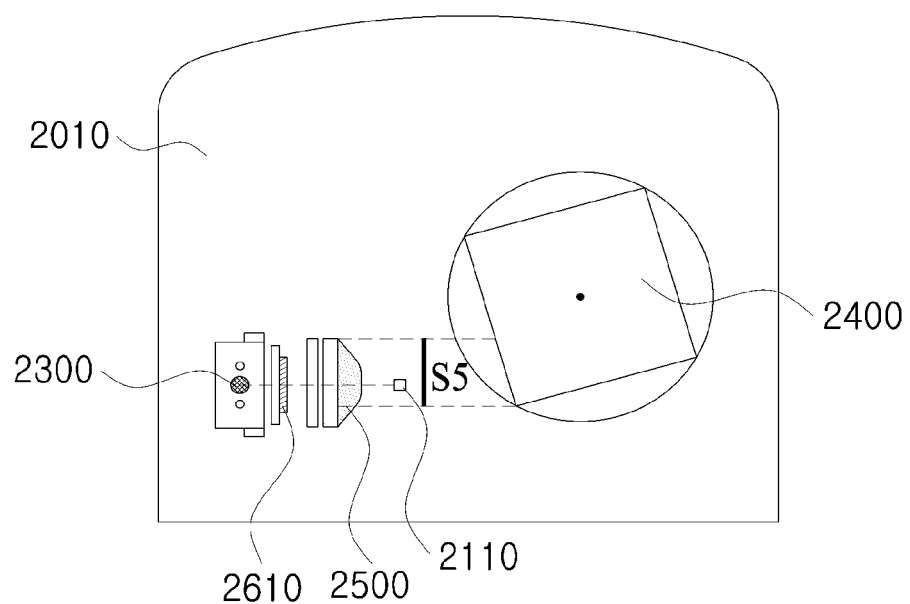

FIGS. 15 and 16 are top views of lidar devices according to other embodiments.

Referring to FIG. 15, when viewed from above, the light source unit 2110, the nodding mirror 2300, and the sensing unit 2610 may be arranged to be in one plane. Accordingly, when viewed from above, the first light path, the second light path, and the third light path may be located on one straight line. Here, the one plane may be perpendicular to the lower base 2010.

Also, as shown in FIG. 15, a distance from the one plane to the rotational axis of the polygonal mirror 2400 may be smaller than a rotational radius R of the polygonal mirror 2400. Accordingly, a laser reflected by the nodding mirror 2300 may be projected toward the polygonal mirror 2400.

Also, in detail, the second distance d2 may be $R/\sqrt{2}$. Here, according to rotation of the polygonal mirror 2400, the lidar device 2000 may have a first horizontal scanning range HF1 on the basis of an axis perpendicular to the central axis of the condensing lens 2500. That is, a central axis of the first horizontal scanning range HF1 may be perpendicular to the central axis of the condensing lens 2500.

Also, referring to FIG. 16, the condensing lens 2500 may have the fifth area S5.

Figure 17:
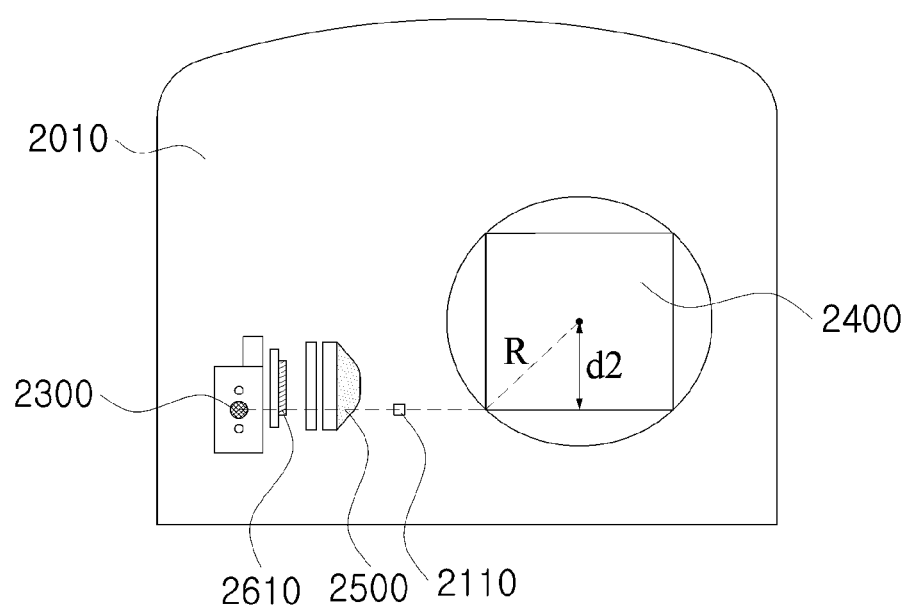
Figure 18:
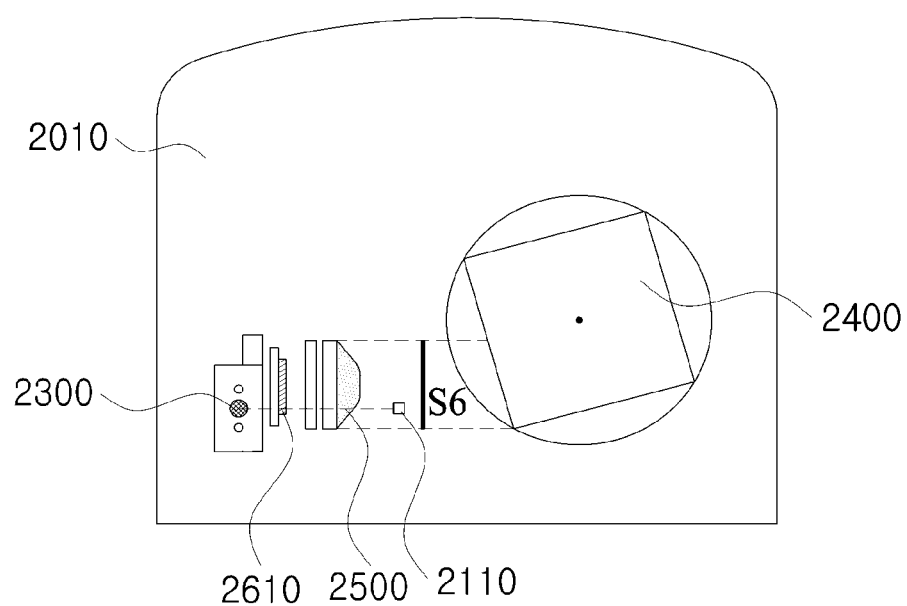

FIGS. 17 and 18 are top views illustrating lidar devices according to other embodiments.

Referring to FIG. 17, when viewed from above, the light source unit 2110 and the nodding mirror 2300 may deviate from the central axis of the condensing lens 2500. Accordingly, the first light path, the second light path, and the third light path may not coincide with the central axis of the condensing lens 2500.

Also, as shown in FIG. 17, the second distance d2 may be $R/\sqrt{2}$. Here, according to rotation of the polygonal mirror 2400, the lidar device 2000 may have a second horizontal scanning range HF2 on the basis of the axis perpendicular to the central axis of the condensing lens 2500. That is, a central axis of the second horizontal scanning range HF2 may be perpendicular to the central axis of the condensing lens 2500. Here, the second horizontal scanning range HF2 may be equal to the first horizontal scanning range HF1.

Also, referring to FIG. 18, the polygonal mirror 2400 may have the sixth area S6. Here, the sixth area S6 may be larger than the fifth area S5. Accordingly, a light amount of laser obtained by the sensing unit 2610 according to an embodiment of FIG. 18 may be greater than a light amount of laser obtained by the sensing unit 2610 according to an embodiment of FIG. 16. Accordingly, a measurable distance of the lidar device according to the embodiment of FIG. 18 may be longer than a measurable distance of the lidar device according to the embodiment of FIG. 16.

Figure 19:
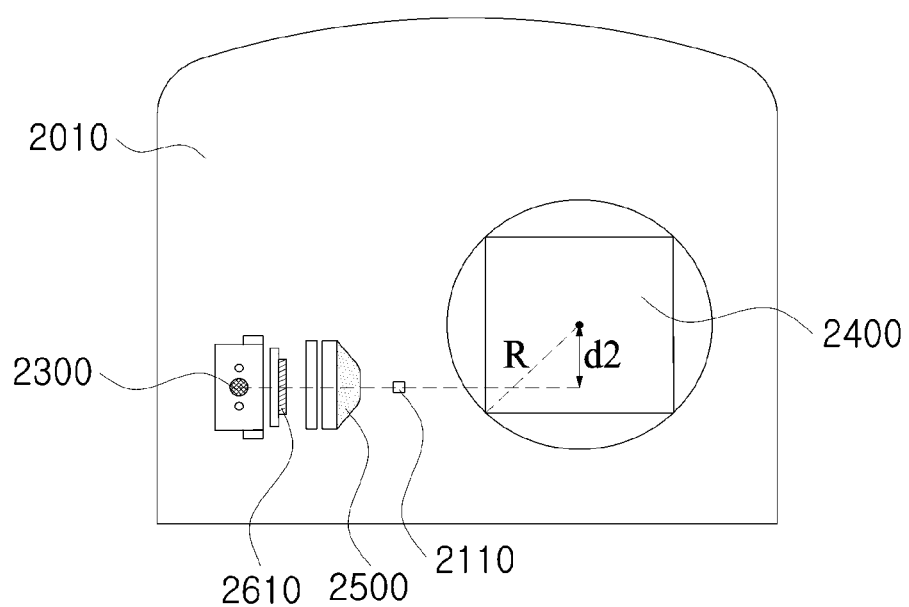
Figure 20:
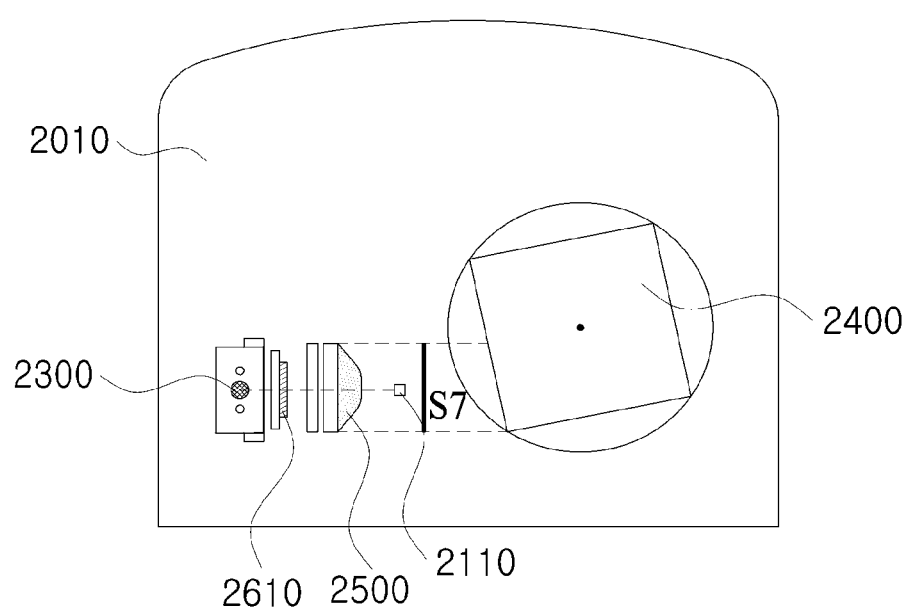

FIGS. 19 and 20 are top views illustrating lidar devices according to other embodiments.

Referring to FIG. 19, when viewed from above, the light source unit 2110, the nodding mirror 2300, and the sensing unit 2610 may be arranged to be in one plane. Accordingly, when viewed from above, the first light path, the second light path, and the third light path may be located on one straight line. Here, the one plane may be perpendicular to the lower base 2010.

Also, as shown in FIG. 19, a distance from the one plane to the rotational axis of the polygonal mirror 2400 may be smaller than the rotational radius R of the polygonal mirror 2400. Accordingly, a laser reflected by the nodding mirror 2300 may be projected toward the polygonal mirror 2400.

Also, in detail, the second distance d2 may be R/2. Here, according to rotation of the polygonal mirror 2400, the lidar device 2000 may have a third horizontal scanning range HF3.

Here, a central axis of the third horizontal scanning range HF3 may not be perpendicular to the central axis of the condensing lens 2500. Also, the third horizontal scanning range HF3 may be smaller than the first horizontal scanning range HF1 or the second horizontal scanning range HF2.

Also, referring to FIG. 20, the polygonal mirror 2400 may have the seventh area S7. Here, the seventh area S7 may be larger than the fifth area S5. Accordingly, a light amount of laser obtained by the sensing unit 2610 according to an embodiment of FIG. 20 may be greater than the light amount of laser obtained by the sensing unit 2610 according to the embodiment of FIG. 16. Accordingly, a measurable distance of the lidar device according to the embodiment of FIG. 20 may be longer than the measurable distance of the lidar device according to the embodiment of FIG. 16.

Also, the seventh area S7 may be smaller than the sixth area S6. Accordingly, the light amount of laser obtained by the sensing unit 2610 according to the embodiment of FIG. 20 may be equal to the light amount of laser obtained by the sensing unit 2610 according to the embodiment of FIG. 18. Accordingly, a measurable distance of the lidar device according to the embodiment of FIG. 20 may be equal to the measurable distance of the lidar device according to the embodiment of FIG. 18.

Also, the seventh area S7 may be larger than the fifth area S5. Accordingly, the light amount of laser obtained by the sensing unit 2610 according to the embodiment of FIG. 20 may be greater than the light amount of laser obtained by the sensing unit 2610 according to the embodiment of FIG. 16. Accordingly, the measurable distance of the lidar device according to the embodiment of FIG. 20 may be longer than the measurable distance of the lidar device according to the embodiment of FIG. 16.

A variety of arrangement and position relationships among the components of the lidar device have been described above.

Hereinafter, a variety of implementation examples of the lidar device in consideration of an arrangement and position relationship of the above-described components of the lidar device will be described. However, the following implementation examples are merely several examples and the arrangement of the above-described components of the lidar device may be combined in another form.

FIG. 5 is a perspective view of a lidar device according to a first implementation example.

Referring to FIG. 5, the lidar device may include the laser emitting unit 2100, the flat mirror 2200, the nodding mirror 2300, the polygonal mirror 2400, the condensing lens 2500, and the sensor unit 2600.

Hereinafter, the components of the lidar device will be described in detail.

The lidar device 2000 may include the lower base 2010 provided as a flat panel shape and the upper base 2020 disposed to face the lower base 2010.

The laser emitting unit 2100 may include the light source unit 2110 which generates a laser, the laser driver 2120 which controls the light source unit 2110, and the laser dissipation unit 2130 for dissipating heat of the laser driver 2120.

The light source unit 2110 may be installed above the upper base 2020 and may emit a laser toward one side. For example, the light source unit 2110 may emit a laser in a direction parallel to the upper base 2020 toward the flat mirror 2200. Here, the emitted laser may have a pattern having a point light source shape.

Also, the laser driver 2120 electrically connected to the light source unit 2110 may adjust an exit point in time and an exit cycle of the laser by applying an electrical signal to the light source unit 2110. As an example, the laser driver 2120 may be installed on the upper base 2020.

Meanwhile, as the electrical signal is applied to the light source unit 2110, heat is generated in the laser driver 2120. Here, when the heat is not dissipated, performance of the lidar device 2000 may be reduced. Hereupon, the laser dissipation unit 2130 for dissipating heat of the laser driver 2120 may be installed in an area adjacent to the laser driver 2120. For example, the laser dissipation unit 2130 may be installed on the upper base 2020. Also, the laser dissipation unit 2130 may be installed below the upper base 2020 and may be thermally connected to the laser driver 2120.

The laser dissipation unit 2130 may receive and externally discharge the heat generated by the laser driver 2120. For example, the laser dissipation unit 2130 may dissipate the heat generated by the laser driver 2120 by transferring the heat to outdoor air through heat exchange with the outdoor air.

Also, the lidar device 2000 may include the flat mirror 2200 which changes a movement direction of the laser provided by the laser emitting unit 2100. For example, the flat mirror 2200 may change a movement direction of a laser emitted from the laser emitting unit 2100, which moves parallel to the upper base 2020, to a direction perpendicular to the upper base 2020. In more detail, the flat mirror 2200 may change the movement direction of the emitted laser such that the emitted laser is emitted downward from the top of the upper base 2020.

Also, the flat mirror 2200 may be provided as a flat panel-shaped mirror and may reflect a laser emitted from the laser emitting unit 2100 in the direction perpendicular to the upper base 2020. Accordingly, the laser reflected by the flat mirror 2200 may be projected toward the nodding mirror 2300.

The nodding mirror 2300 may change the movement direction of the laser reflected by the flat mirror 2200 by reflecting the laser. For example, the nodding mirror 2300 may be disposed below the flat mirror 2200 and may reflect the laser reflected by the flat mirror 2200 toward the polygonal mirror 2400. Also, the nodding mirror 2300 may reflect the laser reflected by the flat mirror 2200 in the direction perpendicular to the upper base 2020.

Also, in the implementation example, the second length L2 may be longer than a distance from the sensor unit 2600 to the polygonal mirror 2400. That is, the nodding mirror 2300 may be disposed to be farther from the polygonal mirror 2400 than the sensor unit 2600. Accordingly, the polygonal mirror 2400 may have the height h1.

Meanwhile, the polygonal mirror 2400 may form a plane beam pattern from a line beam-shaped laser reflected by the nodding mirror 2300 by rotating along a rotational axis perpendicular to the lower base 2010. Here, the rotational axis of the polygonal mirror 2400 may be fixed to the lower base 2010.

Also, the sensing unit 2610 for obtaining a laser reflected by an object may be disposed on one side of the polygonal mirror 2400. As an example, the sensing unit 2610 may obtain a laser which is reflected by the object, projected by the polygonal mirror 2400, and then reflected again by the polygonal mirror 2400. Here, the sensing unit 2610 may be disposed such that the center thereof is located on the central axis of the condensing lens 2500. Accordingly, a laser obtainment rate of the sensing unit 2610 may increase.

Also, the light source unit 2110 and the nodding mirror 2300 may be arranged such that the straight line, which passes through the center of the light source unit 2110 and the center of the nodding mirror 2300, passes through the perpendicular central line of the emission surface 2410 when the rotation angle θ of the polygonal mirror 2400 is 75°. Also, here, the second distance d2 may be $$\frac{R}{\sqrt{2}} \times \cos 15°.$$

Also, the condensing lens 2500 may be disposed according to the embodiment of FIG. 11. That is, the condensing lens 2500 may be disposed such that the central axis thereof meets the end of the emission surface 2410 when the rotation angle θ of the polygonal mirror 2400 is 0°.

Also, the condensing area of the condensing lens 2500 may be the second area S2.

Figure 21:
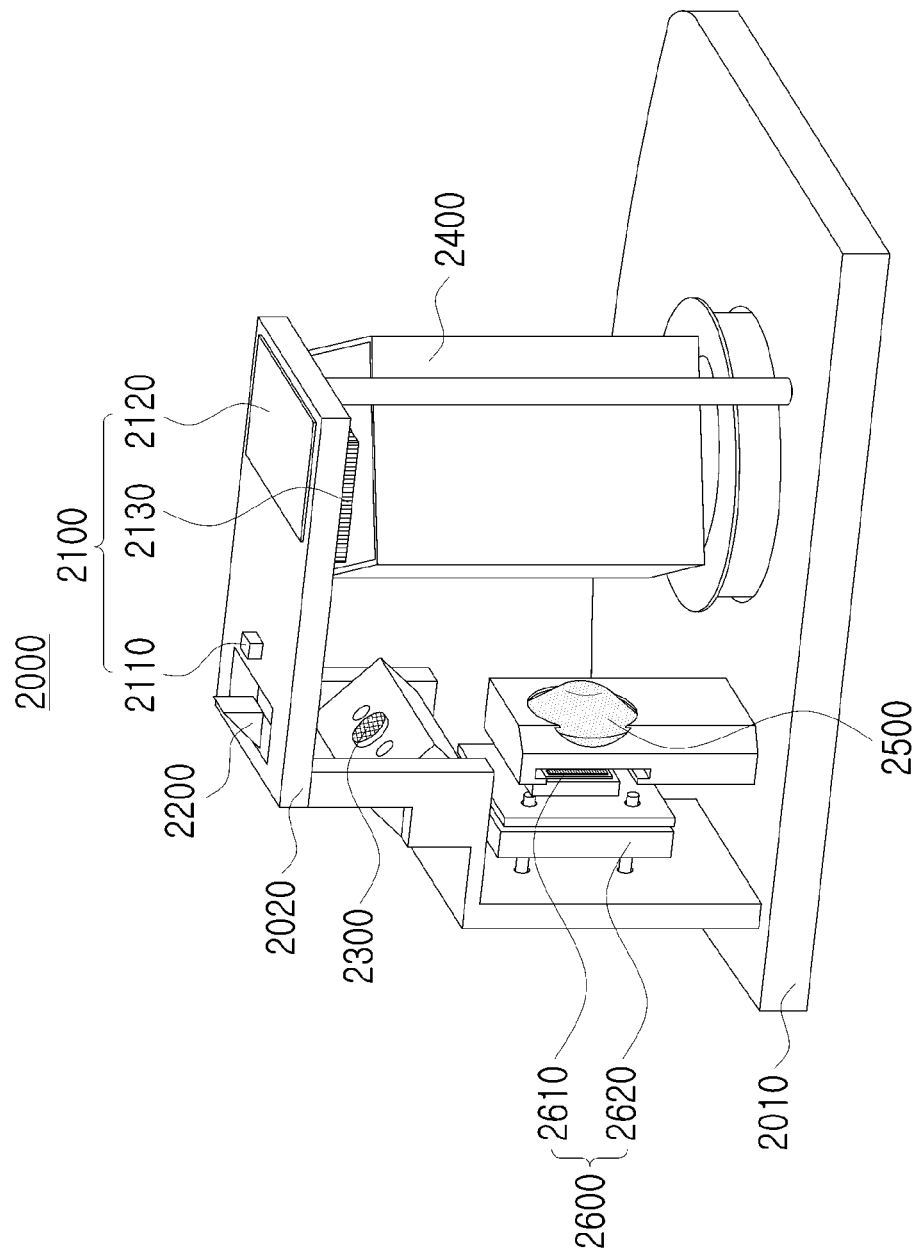
FIG. 21 is a perspective view of a lidar device according to a second implementation example.

FIG. 21 is a perspective view of a lidar device according to a second implementation example.

Referring to FIG. 21, the lidar device may include the laser emitting unit 2100, the flat mirror 2200, the nodding mirror 2300, the polygonal mirror 2400, the condensing lens 2500, and the sensor unit 2600. Also, a description of the laser emitting unit 2100, the polygonal mirror 2400, the condensing lens 2500, and the sensor unit 2600 according to the first implementation example may be applied as is. Accordingly, for convenience of description, differences from the first implementation example will mainly be described below.

Also, the second length L2 may be shorter than a distance from the sensor unit 2600 to the polygonal mirror 2400. That is, the nodding mirror 2300 may be disposed to be closer to the polygonal mirror 2400 than the sensor unit 2600. Accordingly, the polygonal mirror 2400 may have the height h2 lower than the first height h1. Accordingly, the lidar device according to the second implementation example may be manufactured to be smaller than the lidar device according to the first implementation example.

Also, the condensing lens 2500 may be disposed according to the embodiment of FIG. 12. In detail, the condensing lens 2500 may be disposed such that the central axis thereof meets the perpendicular central line of the emission surface 2410 when the rotation angle θ of the polygonal mirror 2400 is 45°.

Here, the condensing area of the condensing lens 2500 may be the third area S3.

Figure 22:
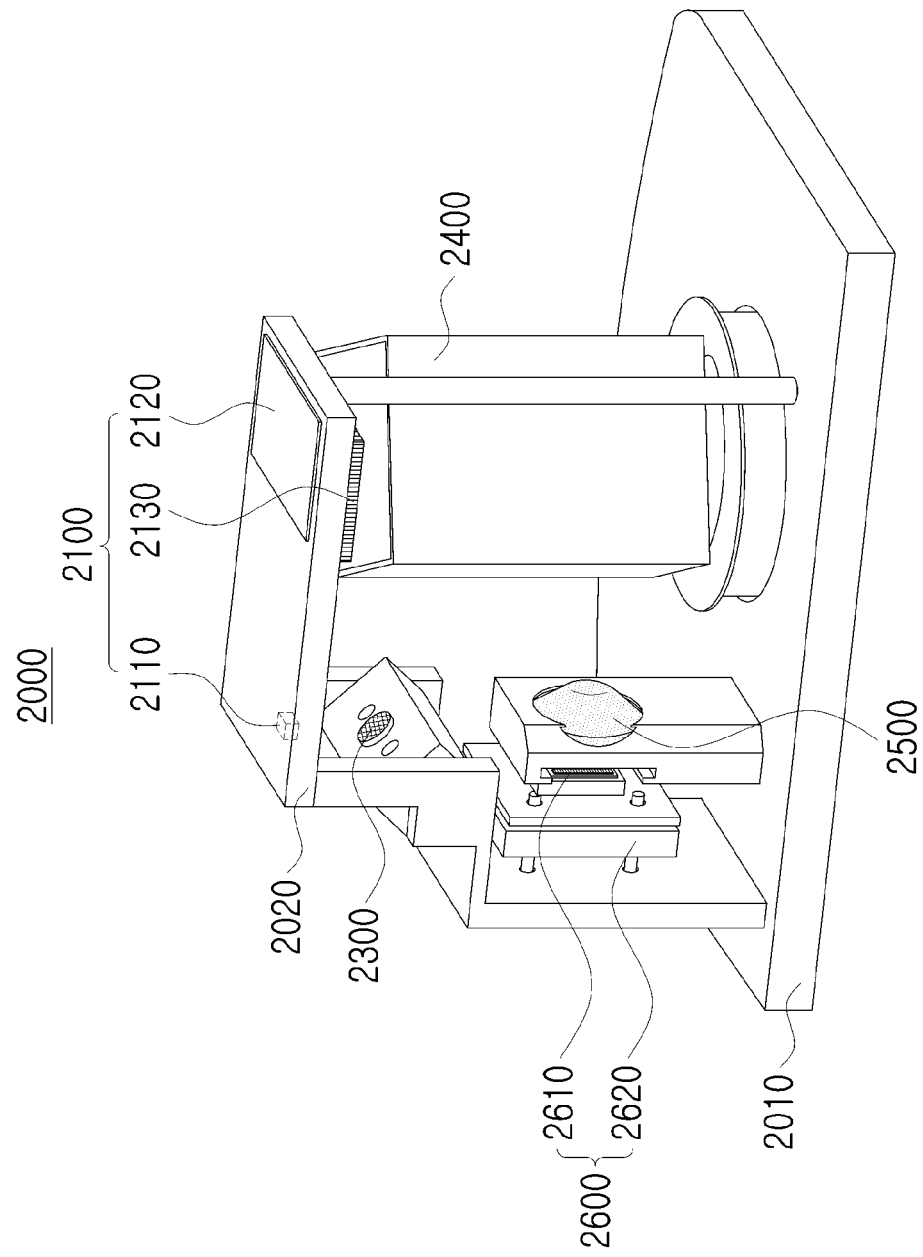
FIG. 22 is a perspective view of a lidar device according to a third implementation example.

FIG. 22 is a perspective view of a lidar device according to a third implementation example.

Referring to FIG. 22, the lidar device may include the laser emitting unit 2100, the flat mirror 2200, the nodding mirror 2300, the polygonal mirror 2400, the condensing lens 2500, and the sensor unit 2600. Also, a description of the laser emitting unit 2100, the polygonal mirror 2400, the condensing lens 2500, and the sensor unit 2600 according to the first implementation example may be applied as is.

Accordingly, for convenience of description, differences from the first and second implementation examples will be mainly described below.

The light source unit 2110 may be disposed according to the embodiment of FIG. 8. Accordingly, the polygonal mirror 2400 according to the third implementation example may be smaller than the polygonal mirrors 2400 according to the first and second implementation examples.

Also, the second length L2 may be shorter than a distance from the sensor unit 2600 to the polygonal mirror 2400. That is, the nodding mirror 2300 may be disposed to be closer to the polygonal mirror 2400 than the sensor unit 2600. Accordingly, the polygonal mirror 2400 may have the height h3 lower than the second height h2. Accordingly, the lidar device according to the third implementation example may be manufactured to be smaller than the lidar devices according to the first and second implementation examples.

Also, the condensing lens 2500 may be disposed according to the embodiment of FIG. 13. In detail, the condensing lens 2500 may be disposed such that the central axis thereof meets the perpendicular central line of the emission surface 2410 when the rotation angle θ of the polygonal mirror 2400 is 75°.

Here, the condensing area of the condensing lens 2500 may be the fourth area S4. Also, the fourth area S4 may be larger than the second area S2 or the third area S3. Accordingly, a measurable distance of the lidar device according to the third implementation embodiment may be longer than a measurable distance of the lidar device according to the first or second embodiment.

Above, it has been described that the lidar device 100 obtains distance information with respect to the object 160 by emitting a laser toward the object 160 through the laser emitting unit 110 and receiving the laser reflected by the object 160.

Meanwhile, when the lidar device 100 operates the laser emitting unit 110, waste heat may be generated in the laser emitting unit 110. Here, when the waste heat is not discharged outside the lidar device 100, the performance of the lidar device may be degraded. For example, the waste heat generated by the laser emitting unit 110 may degrade the performance of the laser emitting unit 110.

Accordingly, the lidar device 100 may include dissipation means for dissipating the waste heat generated by the laser emitting unit 110.

Hereinafter, the lidar device including the dissipation means according to one embodiment will be described below.

Figure 23:
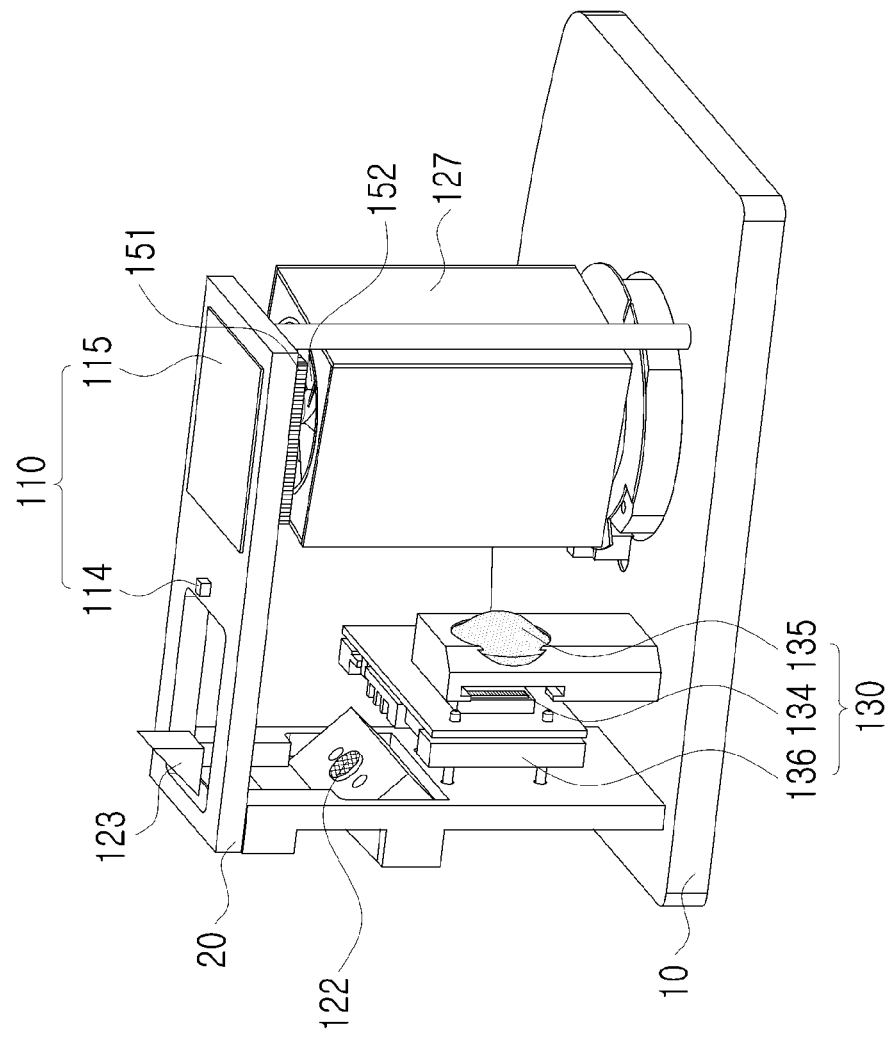
FIG. 23 is a perspective view of the lidar device according to one embodiment.

FIG. 23 is a three-dimensional view of the lidar device according to one embodiment.

Referring to FIG. 23, the lidar device 100 according to one embodiment may include a lower base 10, an upper base 20, the laser emitting unit 110, the nodding mirror 122, a flat mirror 123, the rotating polygonal mirror 127, the sensor unit 130, a laser dissipation unit 151, and a cooling fan 152.

The lower base 10 and/or the upper base 20 according to one embodiment may be provided as a flat panel shape. Also, the upper base 20 may be disposed to face the lower base 10. The lower base 10 and/or the upper base 20 may include one or more holes through which an air current may pass.

The laser emitting unit 110 according to one embodiment may be installed on the upper base 20. For example, the laser emitting unit 110 may be installed on the upper base 20 and may emit a laser. Here, the laser emitting unit 110 may emit a laser in the form of a point light source.

Also, the laser emitting unit 110 may include a light source unit 114 which generates a laser and a laser driver 115 which controls the light source unit 114.

Also, although not shown in the drawings, the lidar device 100 may include a collimator which makes a laser emitted from the light source unit 114 more uniform. Here, the collimator may be disposed in a laser emission direction of the light source unit 114.

A laser emitted from the laser emitting unit 110 may be reflected by the flat mirror 123. The flat mirror 123 according to one embodiment may change a travel path of the laser emitted from the laser emitting unit 110 by reflecting the laser. Also, here, it is apparent that the flat mirror 123 is an example of a means for changing a direction of a laser emitted from one direction through reflection, refraction, and the like and may be replaced by another optical means such as a prism.

The nodding mirror 122 according to one embodiment may change the travel path of the laser reflected by the flat mirror 123 by reflecting the laser. For example, the nodding mirror 122 may reflect the laser reflected by the flat mirror 123 toward the rotating polygonal mirror 127. Also, the nodding mirror 122 may transform a laser in the form of a point light source to a line beam pattern perpendicular to the lower base 10 by nodding along an axis parallel to the lower base 10. Also, the nodding mirror 122 may be provided as an MEMS mirror, a resonant mirror, a mirror galvanometer, or a diffusing lens.

Meanwhile, the rotating polygonal mirror 127 according to one embodiment may change a travel path of the laser reflected by the nodding mirror 122 by reflecting the laser. For example, the rotating polygonal mirror 127 may reflect the laser reflected by the nodding mirror 122 toward the object 160. Also, the rotating polygonal mirror 127 may transform a laser having a line beam pattern to a plane beam pattern by rotating along an axis perpendicular to the lower base 10.

Also, the rotating polygonal mirror 127 may change a travel path of a laser in the form of a point light source provided from one side by reflecting the laser. Here, the rotating polygonal mirror 127 may transform the laser in the form of a point light source to a line beam pattern parallel to the lower base 10 by rotating along an axis perpendicular to the lower base 10.

Also, the rotating polygonal mirror 127 may have a polygonal cylinder shape. For example, the rotating polygonal mirror 127 may have a square pillar shape.

Also, the lidar device according to one embodiment may include the sensor unit 130. The sensor unit 130 according to one embodiment may include a sensing unit 134 which senses a laser, a condensing lens 135 which obtains a laser, and a sensor dissipation unit 136 for dissipating heat of the sensing unit 134. Also, the sensing unit 134 may be provided as an array including photodiodes and the sensor dissipation unit 136 may include a heat sink and a heat fin for dissipating heat of the sensing unit 134.

Also, the lidar device 100 according to one embodiment may include a laser dissipation unit 151 for dissipating waste heat generated by the laser emitting unit 110 and a cooling fan 152 which supplies an air current to the laser dissipation unit 151.

In detail, the laser dissipation unit 151 according to one embodiment may absorb waste heat generated by the laser emitting unit 110. Also, the laser dissipation unit 151 may discharge the absorbed waste heat. For example, the laser dissipation unit 151 may discharge the absorbed waste heat through heat exchange with ambient air.

Also, the cooling fan 152 according to one embodiment may be installed on the rotating polygonal mirror 127. For example, the cooling fan 152 may generate an air current which passes through a through hole of the rotating polygonal mirror 127. The cooling fan 152 may supply the air current to the laser dissipation unit 151. Accordingly, a heat dissipation effect of the laser dissipation unit 151 may be improved.

Also, the cooling fan 152 according to one embodiment may supply an air current to the laser emitting unit. Accordingly, the waste heat generated by the laser emitting unit 110 may be dissipated. Accordingly, it is possible to prevent performance of the laser emitting unit 110 from being degraded by generation of waste heat.

The lidar device 100 may emit a laser by using the laser emitting unit 110. Here, the emitted laser may be projected toward the nodding mirror 122 and/or the flat mirror 123. Also, the projected laser may be projected toward the rotating polygonal mirror 127. Here, the laser projected toward the rotating polygonal mirror 127 may be a laser which is reflected by the nodding mirror 122 and/or the flat mirror 123. Accordingly, a laser projected outward by the lidar device 100 may have a line beam pattern or a plane beam pattern.

The lidar device 100 may project a laser toward the object 160 by using the rotating polygonal mirror 127. Accordingly, the projected laser may be projected toward the object 160 and be reflected by the object 160. Here, the lidar device 100 may sense the laser reflected by the object 160 by using the sensing unit 134. Accordingly, the lidar device 100 may obtain distance information with respect to the object 160.

Above, the components and operation of the lidar device according to one embodiment have been described.

Hereinafter, the rotating polygonal mirror included in the lidar device according to one embodiment will be described.

Figure 24:
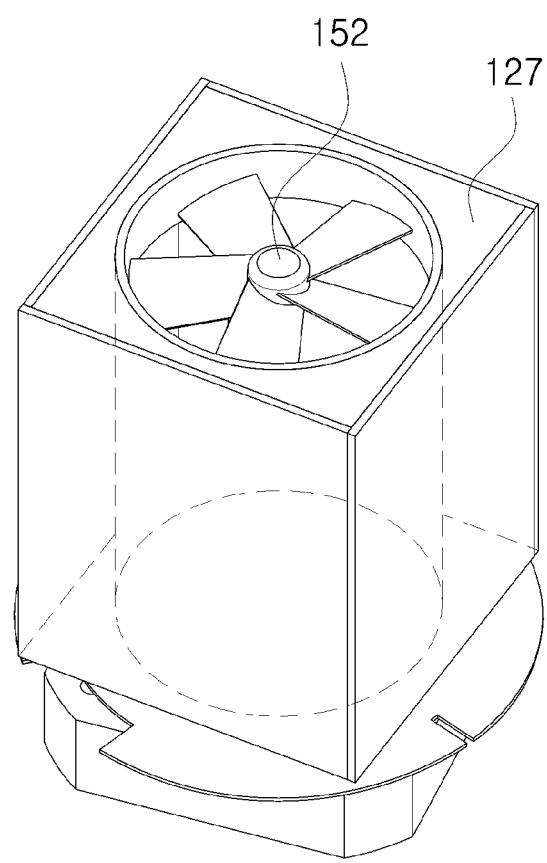
FIG. 24 is a view of a rotating polygonal mirror according to one embodiment.

FIG. 24 is a view illustrating the rotating polygonal mirror according to one embodiment.

The rotating polygonal mirror 127 according to one embodiment may extend a scanning range of the lidar device 100.

As an example, the rotating polygonal mirror 127 may transform a laser in the form of a point light source provided from one side to a laser having a line beam pattern. Here, the rotating polygonal mirror 127 may form a laser having the line beam pattern parallel to the lower base 10 by rotating along a rotational axis perpendicular to the lower base 10. Also, the rotating polygonal mirror 127 may form a laser having the line beam pattern perpendicular to the lower base 10 by rotating along a rotational axis parallel to the lower base 10. As another example, the rotating polygonal mirror 127 may transform the laser having the line beam pattern provided from one side to a laser having a plane beam pattern by rotating along the rotational axis.

Also, referring to FIG. 24, the rotating polygonal mirror 127 according to one embodiment may be provided as a polygonal cylinder shape. For example, the rotating polygonal mirror 127 may include a first surface perpendicular to the lower base 10 and a second surface which shares one side with the first surface. Here, the second surface may be perpendicular to the lower base 10. Also, the first surface and the second surface may be perpendicular to each other.

Also, the rotating polygonal mirror 127 according to one embodiment may include a through hole. Here, the through hole may form a flow path through which air may pass. Accordingly, an air current, which passes through the rotating polygonal mirror 127, may be formed along the through hole.

Also, the through hole according to one embodiment may be formed along the rotational axis of the rotating polygonal mirror 127. That is, the rotating polygonal mirror 127 may include a through hole formed in a direction of the rotational axis thereof. Accordingly, the air current, which passes through the through hole, may be moved in the direction of the rotational axis of the rotating polygonal mirror 127.

The through hole according to one embodiment may have a polygonal cylinder shape. In detail, the through hole may have a square pillar shape. Also, the through hole may have a circular cross section when viewed from above. Here, the through hole may have a cylindrical shape. Also, the through hole may have a variety of shapes and is not limited to the above-described examples.

Also, the cooling fan 152, which forms the air current passing through the through hole according to one embodiment, may be disposed in the through hole. For example, the cooling fan 152 may be installed in the through hole.

As described above, since the lidar device 100 includes the laser emitting unit 110 which generates heat, a heat dissipation means for dissipating heat of the lidar device 100 may be included.

Hereinafter, the heat dissipation means of the lidar device will be described.

Figure 25:
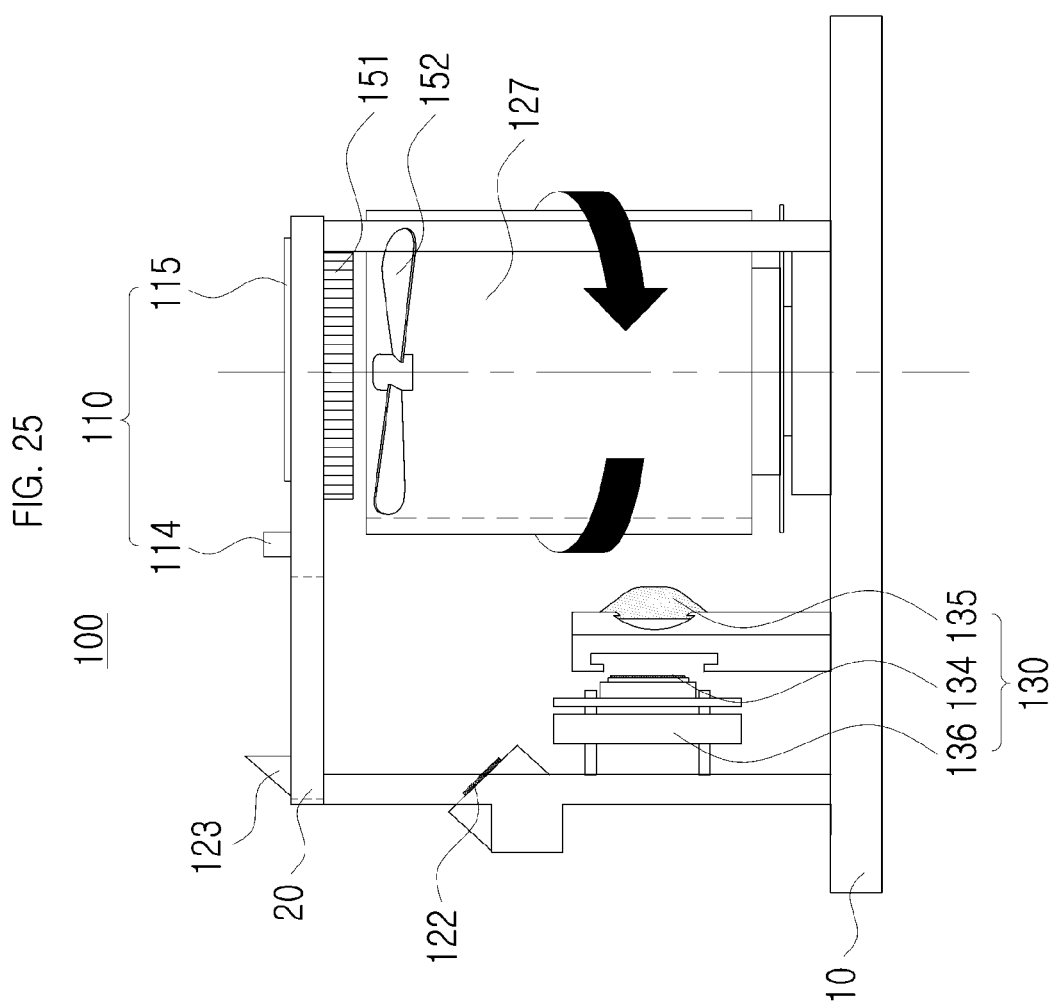
FIG. 25 is a side view of a lidar device according to a first implementation example.

FIG. 25 is a side view of a lidar device according to an embodiment of FIG. 23 when viewed from the side.

Referring to FIG. 25, the lidar device 100 may include the lower base 10, the upper base 20, the laser emitting unit 110, the nodding mirror 122, the flat mirror 123, the rotating polygonal mirror 127, the sensor unit 130, the laser dissipation unit 151, and the cooling fan 152. Also, although not shown in the drawing, the lidar device 100 may include a driving unit which provides a rotating force to the rotating polygonal mirror 127 and a rotating force transfer unit which transfers the rotating force provided by the driving unit to the cooling fan 152.

Also, a description of the components of the lidar device with reference to FIG. 23 may be applied as is. For convenience of description, the cooling fan 152 and the laser dissipation unit 151 will mainly be described below.

The cooling fan 152 according to one embodiment may generate an air current. For example, the cooling fan 152 may generate an air current which passes through the through hole.

Also, the cooling fan 152 according to one embodiment may supply an air current to one side. For example, the cooling fan 152 may supply an air current to the laser dissipation unit 151.

The cooling fan 152 according to one embodiment may be installed on the rotating polygonal mirror 127. For example, the cooling fan 152 may be installed such that a center thereof is located on a rotational axis of the rotating polygonal mirror 127. Here, the cooling fan 152 may rotate along the rotational axis. Accordingly, the cooling fan 152 may generate an air current which moves toward the rotational axis.

Also, the cooling fan 152 may be installed on one side of the rotating polygonal mirror 127. For example, the cooling fan 152 may be installed above or below the rotating polygonal mirror 127 while the center thereof is located on the rotational axis of the rotating polygonal mirror 127.

Also, the cooling fan 152 may be installed in a through hole of the rotating polygonal mirror 127. For example, the cooling fan 152 may be installed in the through hole while the center thereof is located on the rotational axis of the rotating polygonal mirror 127.

Also, the cooling fan 152 according to one embodiment may integrally rotate with the rotating polygonal mirror 127. For example, the cooling fan 152 may be coupled to and rotate with the rotating polygonal mirror 127. Here, the cooling fan 152 may be disposed in the through hole and be connected to the rotating polygonal mirror 127. Accordingly, the cooling fan 152 may rotate in the same direction as that of the rotating polygonal mirror 127.

Also, the cooling fan 152 according to one embodiment may rotate while being spaced apart from the rotating polygonal mirror 127. For example, the driving unit may provide a rotating force to the rotating polygonal mirror 127. Here, the cooling fan 152 may receive a rotating force provided by the driving unit through the rotating force transfer unit. Also, the rotating force transfer unit may be provided as a shaft. As an example, the rotating force transfer unit may transfer a rotating force provided by the driving unit to the cooling fan 152 while transferring the rotating force to the cooling fan 152 in a direction opposite that of the rotating force provided to the rotating polygonal mirror 127. Accordingly, the cooling fan 152 may rotate in an opposite direction from that of the rotating polygonal mirror 127. As another example, the rotating force transfer unit may transfer, to the cooling fan 152, a rotating force in the same direction as that of the rotating force provided to the rotating polygonal mirror 127. Accordingly, the cooling fan 152 may rotate in the same direction as that of the rotating polygonal mirror 127.

Also, the rotating force transfer unit may transfer a rotating force provided by the driving unit to the rotating polygonal mirror 127. For example, the cooling fan 152 may rotate due to a rotating force provided by the driving unit, and the rotating polygonal mirror 127 may rotate due to a rotating force provided by the rotating force transfer unit. Here, the cooling fan 152 and the rotating polygonal mirror 127 may rotate while being spaced apart.

Also, a rotating speed of the rotating polygonal mirror 127 and a rotating speed of the cooling fan 152 may differ from each other. In detail, the rotating force transfer unit may transfer a rotating force to the cooling fan 152 such that the cooling fan 152 rotates at a speed different from that of the rotating polygonal mirror 127. For example, the rotating force transfer unit may include a gearshift. Accordingly, the cooling fan 152 may rotate at a speed different from that of the rotating polygonal mirror 127. Here, the rotating speed of the rotating polygonal mirror 127 and the rotating speed of the cooling fan 152 may be adjusted by the control unit 140.

Referring to FIG. 25, the lidar device according to one embodiment may include the laser dissipation unit 151.

The laser dissipation unit 151 according to one embodiment may dissipate waste heat generated by the laser emitting unit 110. For example, the laser dissipation unit 151 may discharge waste heat generated by the laser driver 115. In detail, the laser dissipation unit 151 may absorb waste heat generated by the laser driver 115 and may transfer the absorbed waste heat to ambient air. Also, the laser dissipation unit 151 may induce heat exchange between the waste heat generated by the laser driver 115 and the ambient air. Accordingly, the laser dissipation unit 151 may prevent the waste heat from being accumulated on the laser emitting unit 110.

Also, the laser dissipation unit 151 according to one embodiment may transfer waste heat generated by the laser emitting unit 110 to one side. For example, the laser dissipation unit 151 may be thermally connected to the laser emitting unit 110 and may receive the waste heat from the laser emitting unit 110. Here, the laser dissipation unit 151 may transfer the waste heat to an area close to the cooling fan 152. Accordingly, the waste heat transferred from the laser dissipation unit 151 may be diffused by an air current supplied by the cooling fan 152. Accordingly, the laser dissipation unit 151 may prevent the waste heat from being accumulated on the laser emitting unit 110.

The laser dissipation unit 151 according to one embodiment may be installed in an area adjacent to the laser emitting unit 110. Accordingly, the laser dissipation unit 151 may effectively absorb the waste heat generated by the laser emitting unit 110. For example, the laser dissipation unit 151 may be installed on the upper base 20 on which the laser emitting unit 110 is installed. Of course, when the laser emitting unit 110 is installed on the lower base 10, the laser dissipation unit 151 may be installed on the lower base 10.

In detail, the laser dissipation unit 151 may be disposed to be closer to the laser driver 115 than the light source unit 114. This is because an amount of waste heat generated by the laser driver 115 may be greater than an amount of waste heat generated by the light source unit 114. Also, the laser driver 115 may be installed on the same base as that of the laser dissipation unit 151, but the light source unit 114 may not be installed on the same base.

Also, the laser dissipation unit 151 according to one embodiment may be installed on one side of the rotating polygonal mirror 127. For example, the laser dissipation unit 151 may be installed on the rotational axis of the rotating polygonal mirror 127. In detail, the laser dissipation unit 151 may be disposed on the rotational axis of the rotating polygonal mirror 127 and inserted into the through hole of the rotating polygonal mirror 127.

The heat dissipation means, which may be included in the lidar device, has been described above.

Hereinafter, a variety of embodiments of the lidar device including the heat dissipation means will be described. Also, the above description with reference to FIGS. 23 to 25 may be applied as is to components of a lidar device according to each implementation example. Accordingly, heat dissipation means of the lidar device according to each implementation example will be mainly described.

FIG. 25 is a side view of a lidar device according to a first implementation example.

Referring to FIG. 25, the lidar device according to the first implementation example may include the lower base 10, the upper base 20, the laser emitting unit 110, the nodding mirror 122, the flat mirror 123, the rotating polygonal mirror 127, the sensor unit 130, the laser dissipation unit 151, and the cooling fan 152. Also, although not shown in the drawing, the lidar device may include the control unit 140.

The laser emitting unit 110 according to one embodiment may be installed on the upper base 20. Here, the light source unit 114 and the laser driver 115 may be arranged on the same side on the basis of the upper base 20. Also, the light source unit 114 and the laser driver 115 may be arranged on opposite sides on the basis of the upper base 20.

Also, as another example, the rotating polygonal mirror 127 may be installed on the lower base 10. Here, the light source unit 114 and the laser driver 115 may be arranged on the same side on the basis of the lower base 10. Also, the light source unit 114 and the laser driver 115 may be arranged on opposite sides on the basis of the lower base 10.

The laser dissipation unit 151 according to one embodiment may be disposed in an area adjacent to the laser emitting unit 110. For example, the laser dissipation unit 151 and the laser emitting unit 110 may be arranged on the upper base 20. Here, on the basis of the upper base 20, the laser emitting unit 110 and the laser dissipation unit 151 may be arranged on opposite sides. Also, on the basis of the upper base 20, the laser emitting unit 110 and the laser dissipation unit 151 may be arranged on the same side. As another example, the laser dissipation unit 151 and the laser emitting unit 110 may be installed on the lower base 10. Likewise, on the basis of the lower base 10, the laser emitting unit 110 and the laser dissipation unit 151 may be arranged on opposite sides. Also, on the basis of the lower base 10, the laser emitting unit 110 and the laser dissipation unit 151 may be arranged on the same side.

The rotating polygonal mirror 127 according to one embodiment may rotate along an axis perpendicular to the lower base 10. Here, the rotating polygonal mirror 127 may receive a rotating force from the driving unit and rotate. Also, the driving unit may be controlled by the control unit 140. For example, the control unit 140 may control a rotating speed and a rotational direction of the driving unit. Accordingly, the control unit 140 may control a rotating speed and a rotational direction of the rotating polygonal mirror 127.

Also, the rotating polygonal mirror 127 according to one embodiment may include a through hole formed along a rotational axis. For example, the through hole may have a polygonal cylinder shape. In detail, the through hole may have a square pillar shape. Also, the through hole may have a circular cross section when viewed from above. Here, the through hole may have a cylindrical shape. Also, the through hole may have a variety of shapes and is not limited to the above-described examples.

Also, on the basis of the laser dissipation unit 151, the laser emitting unit 110 and the rotating polygonal mirror 127 may be arranged on opposite sides. Accordingly, the laser dissipation unit 151 may transfer waste heat generated by the laser emitting unit 110 toward the rotating polygonal mirror 127. Of course, on the basis of the laser dissipation unit 151, the laser driver 115 and the rotating polygonal mirror 127 may be installed on opposite sides.

Also, the cooling fan 152 according to one embodiment may be disposed in an area adjacent to the laser dissipation unit 151. For example, the cooling fan 152 may be disposed below the laser dissipation unit 151 and may supply an air current to the laser dissipation unit 151.

Also, the cooling fan 152 according to one embodiment may be installed on an opposite side from the laser emitting unit 110 on the basis of the laser dissipation unit 151. In detail, the cooling fan 152 may be installed on an opposite side from the laser driver 115 on the basis of the laser dissipation unit 151.

Also, the cooling fan 152 according to one embodiment may be installed on the same side as that of the laser emitting unit 110 on the basis of the laser dissipation unit 151.

Also, the cooling fan 152 according to one embodiment may be disposed on a rotational axis of the rotating polygonal mirror 127. Here, the cooling fan 152 may be disposed in a through hole of the rotating polygonal mirror 127 and be disposed on top on the basis of a vertical center of the rotating polygonal mirror 127. Accordingly, waste heat transferred from the laser emitting unit 110 to the laser dissipation unit 151 may be effectively dissipated.

Also, the cooling fan 152 may generate an air current which passes through the through hole of the rotating polygonal mirror 127. The cooling fan 152 may generate an air current which moves from a bottom to a top of the rotating polygonal mirror 127 while passing through the through hole.

Meanwhile, the cooling fan 152 according to one embodiment may be coupled to and integrally rotated with the rotating polygonal mirror 127. Accordingly, since an additional motor for driving the cooling fan 152 is not necessary, an effect of decreasing manufacturing costs of the lidar device 100 may be present.

Also, a rotating speed and a rotational direction of the cooling fan 152 according to one embodiment may be adjusted by the control unit 140. For example, the lidar device 100 may include the driving unit which provides a rotating force to the rotating polygonal mirror 127. Here, the control unit 140 may adjust a rotating speed and a rotational direction of the driving unit. Accordingly, the rotating speeds and the rotational directions of the rotating polygonal mirror 127 and the cooling fan 152 may be adjusted.

Figure 26:
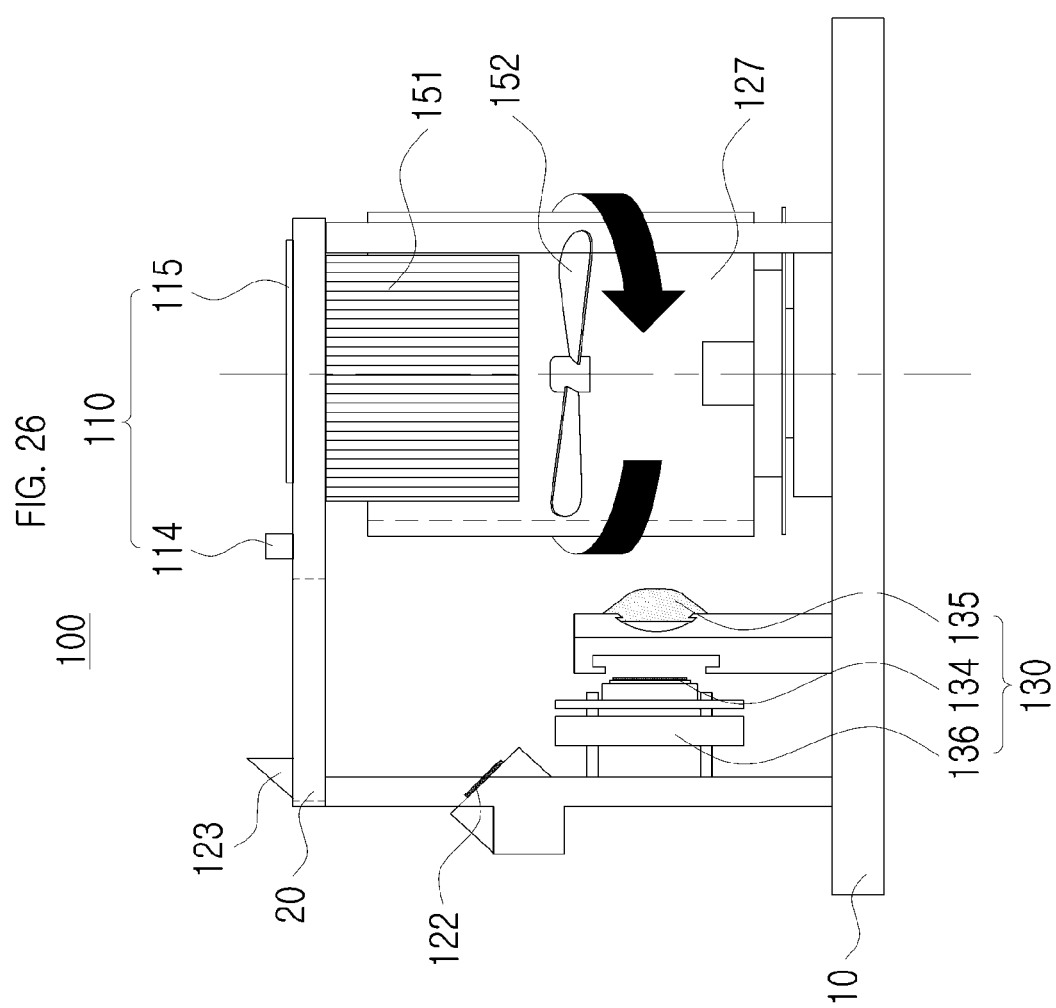
FIG. 26 is a side view of the lidar device according to a second implementation example.

FIG. 26 is a side view of the lidar device according to a second implementation example.

Referring to FIG. 26, the lidar device according to the second implementation example may include the lower base 10, the upper base 20, the laser emitting unit 110, the nodding mirror 122, the flat mirror 123, the rotating polygonal mirror 127, the sensor unit 130, the laser dissipation unit 151, and the cooling fan 152. Also, although not shown in the drawing, the lidar device may include the control unit 140.

The laser emitting unit 110 according to one embodiment may be installed on the upper base 20. Here, the light source unit 114 and the laser driver 115 may be arranged on the same side on the basis of the upper base 20.

The rotating polygonal mirror 127 according to one embodiment may rotate along an axis perpendicular to the lower base 10. Here, the rotating polygonal mirror 127 may receive a rotating force from the driving unit and rotate. Also, the driving unit may be controlled by the control unit 140. For example, the control unit 140 may control a rotating speed and a rotational direction of the driving unit. Accordingly, the control unit 140 may control a rotating speed and a rotational direction of the rotating polygonal mirror 127.

Also, the rotating polygonal mirror 127 according to one embodiment may include a through hole formed along a rotational axis. For example, the through hole may have a polygonal cylinder shape. In detail, the through hole may have a square pillar shape. Also, the through hole may have a circular cross section when viewed from above. Here, the through hole may have a cylindrical shape. Also, the through hole may have a variety of shapes and is not limited to the above-described examples.

Also, on the basis of the laser dissipation unit 151, the laser emitting unit 110 and the rotating polygonal mirror 127 may be arranged on opposite sides. Accordingly, the laser dissipation unit 151 may effectively transfer waste heat generated by the laser emitting unit 110 toward the rotating polygonal mirror 127.

Also, the laser dissipation unit 151 according to one embodiment may be disposed in an area adjacent to the laser emitting unit 110. For example, the laser dissipation unit 151 and the laser emitting unit 110 may be arranged on the upper base 20. Here, on the basis of the upper base 20, the laser emitting unit 110 and the laser dissipation unit 151 may be arranged on opposite sides.

Also, the laser dissipation unit 151 according to one embodiment may be inserted into the through hole of the rotating polygonal mirror 127 along the rotational axis of the rotating polygonal mirror 127. For example, the laser dissipation unit 151 may be inserted into the through hole in a direction perpendicular to the upper base 20. Accordingly, the laser dissipation unit 151 may transfer waste heat absorbed from the laser emitting unit 110 to an inside of the through hole of the rotating polygonal mirror 127. Also, a heat exchange area between the laser dissipation unit 151 and ambient air may increase. Accordingly, a waste heat dissipation effect of the laser dissipation unit 151 may be improved.

Also, the cooling fan 152 according to one embodiment may be disposed in an area adjacent to the laser dissipation unit 151. For example, the cooling fan 152 may be disposed below the laser dissipation unit 151 and may supply an air current to the laser dissipation unit 151.

Also, the cooling fan 152 according to one embodiment may be installed on an opposite side from the laser emitting unit 110 on the basis of the laser dissipation unit 151. In detail, the cooling fan 152 may be installed on an opposite side from the laser driver 115 on the basis of the laser dissipation unit 151.

Also, the cooling fan 152 according to one embodiment may be disposed on the rotational axis of the rotating polygonal mirror 127. Here, the cooling fan 152 may be disposed in the through hole of the rotating polygonal mirror 127 and be disposed on a vertical center of the rotating polygonal mirror 127. Accordingly, waste heat transferred from the laser emitting unit 110 to the laser dissipation unit 151 may be effectively dissipated.

Also, the cooling fan 152 may generate an air current which passes through the through hole of the rotating polygonal mirror 127. The cooling fan 152 may generate an air current which moves from a bottom to a top of the rotating polygonal mirror 127 while passing through the through hole.

Meanwhile, the cooling fan 152 according to one embodiment may be coupled to and integrally rotated with the rotating polygonal mirror 127. Accordingly, since an additional motor for driving the cooling fan 152 is not necessary, an effect of decreasing manufacturing costs of the lidar device 100 may be present.

Also, a rotating speed and a rotational direction of the cooling fan 152 according to one embodiment may be adjusted by the control unit 140. For example, the lidar device 100 may include a driving unit which provides a rotating force to the rotating polygonal mirror 127. Here, the control unit 140 may adjust a rotating speed and a rotational direction of the driving unit. Accordingly, the rotating speeds and the rotational directions of the rotating polygonal mirror 127 and the cooling fan 152 may be adjusted.

Figure 27:
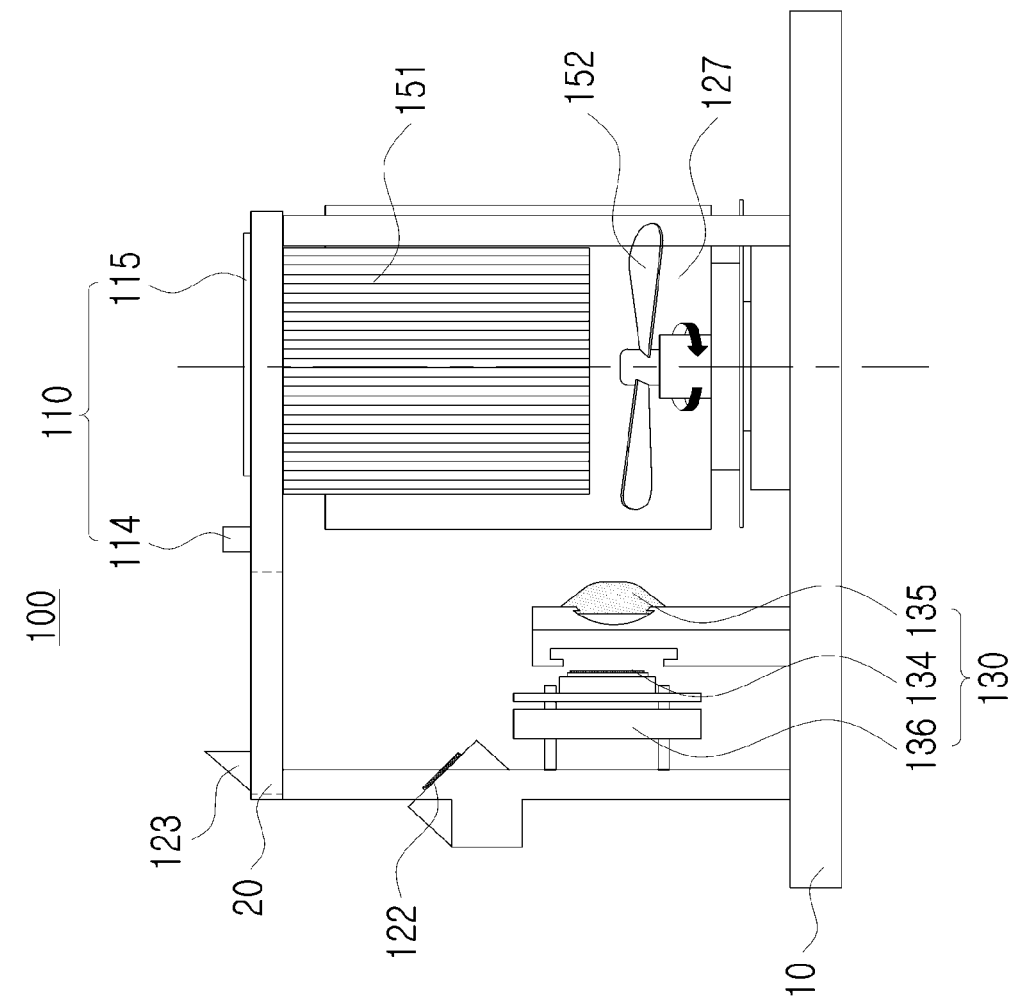
FIG. 27 is a side view of the lidar device according to a third implementation example.

FIG. 27 is a side view of the lidar device according to a third implementation example.

Referring to FIG. 27, the lidar device according to the third implementation example may include the lower base 10, the upper base 20, the laser emitting unit 110, the nodding mirror 122, the flat mirror 123, the rotating polygonal mirror 127, the sensor unit 130, the laser dissipation unit 151, and the cooling fan 152. Also, although not shown in the drawing, the lidar device may include the control unit 140.

The laser emitting unit 110 according to one embodiment may be installed on the upper base 20. Here, the light source unit 114 and the laser driver 115 may be arranged on the same side on the basis of the upper base 20.

The rotating polygonal mirror 127 according to one embodiment may rotate along an axis perpendicular to the lower base 10. Here, the rotating polygonal mirror 127 may receive a rotating force from the cooling fan 152 and rotate. Also, the cooling fan 152 may receive a rotating force from the driving unit. Here, the driving unit may be controlled by the control unit 140. For example, the control unit 140 may control a rotating speed and a rotational direction of the driving unit. Accordingly, the control unit 140 may control a rotating speed and a rotational direction of the rotating polygonal mirror 127.

Also, the rotating polygonal mirror 127 according to one embodiment may include a through hole formed along a rotational axis. For example, the through hole may have a polygonal cylinder shape. In detail, the through hole may have a square pillar shape. Also, the through hole may have a circular cross section when viewed from above. Here, the through hole may have a cylindrical shape. Also, the through hole may have a variety of shapes and is not limited to the above-described examples.

Also, on the basis of the laser dissipation unit 151, the laser emitting unit 110 and the rotating polygonal mirror 127 may be arranged on opposite sides. Accordingly, the laser dissipation unit 151 may effectively transfer waste heat generated by the laser emitting unit 110 toward the rotating polygonal mirror 127.

Also, the laser dissipation unit 151 according to one embodiment may be disposed in an area adjacent to the laser emitting unit 110. For example, the laser dissipation unit 151 and the laser emitting unit 110 may be arranged on the upper base 20. Here, on the basis of the upper base 20, the laser emitting unit 110 and the laser dissipation unit 151 may be arranged on opposite sides.

Also, the laser dissipation unit 151 according to one embodiment may be inserted into the through hole of the rotating polygonal mirror 127 along the rotational axis of the rotating polygonal mirror 127. For example, the laser dissipation unit 151 may be inserted into the through hole in a direction perpendicular to the upper base 20. Accordingly, the laser dissipation unit 151 may transfer waste heat absorbed from the laser emitting unit 110 to an inside of the through hole of the rotating polygonal mirror 127. Also, a heat exchange area between the laser dissipation unit 151 and ambient air may increase. Accordingly, a waste heat dissipation effect of the laser dissipation unit 151 may be improved.

In detail, the laser dissipation unit 151 according to one embodiment may be inserted into the through hole to a bottom of a vertical center of the rotating polygonal mirror 127. Accordingly, in comparison to the first implementation example and the second implementation example, a heat exchange area between the laser dissipation unit 151 and ambient air may increase. Accordingly, a waste heat dissipation effect of the laser dissipation unit 151 may be improved.

Also, the cooling fan 152 according to one embodiment may be disposed in an area adjacent to the laser dissipation unit 151. For example, the cooling fan 152 may be disposed below the laser dissipation unit 151 and may supply an air current to the laser dissipation unit 151.

Also, the cooling fan 152 according to one embodiment may be installed on an opposite side from the laser emitting unit 110 on the basis of the laser dissipation unit 151. In detail, the cooling fan 152 may be installed on an opposite side from the laser driver 115 on the basis of the laser dissipation unit 151.

Also, the cooling fan 152 according to one embodiment may be disposed on a rotational axis of the rotating polygonal mirror 127. Here, the cooling fan 152 may be disposed in the through hole of the rotating polygonal mirror 127 and be disposed at a bottom of a vertical center of the rotating polygonal mirror 127. Accordingly, waste heat transferred from the laser emitting unit 110 to the laser dissipation unit 151 may be effectively dissipated.

Also, the cooling fan 152 may generate an air current which passes through the through hole of the rotating polygonal mirror 127. The cooling fan 152 may rotate and generate an air current which moves from a bottom to a top of the rotating polygonal mirror 127 while passing through the through hole.

Meanwhile, a rotating force of the cooling fan 152 according to one embodiment may be provided from the driving unit. That is, the driving unit may provide a rotating force to the cooling fan 152. Also, the cooling fan 152 may transfer the rotating force provided by the driving unit to the rotating polygonal mirror 127.

Meanwhile, the cooling fan 152 may be coupled to and integrally rotated with the rotating polygonal mirror 127. Accordingly, since an additional motor for driving the rotating polygonal mirror 127 is not necessary, an effect of decreasing manufacturing costs of the lidar device 100 may be present.

Also, a rotating speed and a rotational direction of the cooling fan 152 according to one embodiment may be adjusted by the control unit 140. For example, the lidar device 100 may include the driving unit which provides a rotating force to the cooling fan 152. Here, the control unit 140 may adjust a rotating speed and a rotational direction of the driving unit. Accordingly, the rotating speeds and the rotational directions of the rotating polygonal mirror 127 and the cooling fan 152 may be adjusted.

Figure 28:
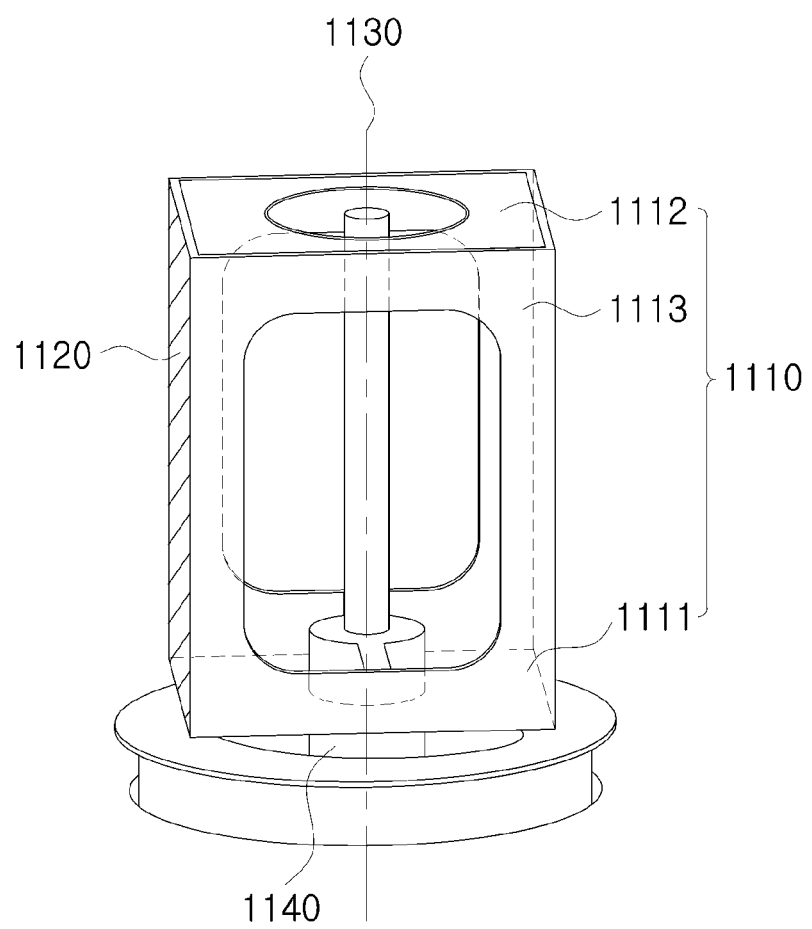
FIG. 28 is a view illustrating a rotating polygonal mirror according to one embodiment.

FIG. 28 is a view illustrating a rotating polygonal mirror according to one embodiment.

Referring to FIG. 28, a rotating polygonal mirror 1100 according to one embodiment may include a reflecting surface 1120 and a body 1110 and may rotate on a rotating shaft 1130 which perpendicularly passes through centers of an upper part 1112 and a lower part 1111 of the body 1110. However, the rotating polygonal mirror 1100 may include only some of the above-described components or may include more components. For example, the rotating polygonal mirror 1100 may include the reflecting surface 1120 and the body 1110, and the body 1110 may include only the lower part 1111. Here, the reflecting surface 1120 may be supported by the lower part 1111 of the body 1110.

The reflecting surface 1120 is a surface for reflecting a transferred laser and may include a reflecting mirror, plastic capable of reflecting, and the like but is not limited thereto.

Also, the reflecting surface 1120 may be installed on all sides except the upper part 1112 and the lower part 1111 of the body 1110 such that the rotating shaft 1130 intersects at right angles with a normal line of each reflecting surface 1120. Such a configuration is for repeatedly scanning the same scanning area by allowing scanning areas of lasers projected by the reflecting surfaces 1120 to be equal to one another.

Also, the reflecting surface 1120 may be installed on all sides except the upper part 1112 and the lower part 1111 of the body 1110 such that the normal line lines of the reflecting surfaces 1120 have angles different from that of the rotating shaft 1130. Such a configuration is for extending a scanning area of the lidar device by allowing scanning areas of lasers projected by the reflecting surfaces 1120 to be different from one another.

Also, the reflecting surface 1120 may have a rectangular shape but is not limited thereto and may have a variety of shapes such as a triangular shape, a trapezoidal shape, and the like.

Also, the body 1110 is for supporting the reflecting surfaces 1120 and may include the upper part 1112, the lower part 1111, and a pillar 1113 which connects the upper part 1112 to the lower part 1111. Here, the pillar 1113 may be installed to connect centers of the upper part 1112 and the lower part 1111 of the body 1110, may be installed to connect apexes of the upper part 1112 and the lower part 1111 of the body 1110, or may be installed to connect corners of the upper part 1112 and the lower part 1111 of the body 1110. However, there is no limitation in structure for connecting and supporting the upper part 1112 and the lower part 1111 of the body 1110.

Also, the body 1110 may be fastened to a driving unit 1140 to receive a driving force to rotate, may be fastened to the driving unit 1140 through the lower part 1111 of the body 1110, and may be fastened to the driving unit 1140 through the upper part 1112.

Also, the upper part 1112 and the lower part 1111 of the body 1110 may have a polygonal shape. Here, the upper part 1112 of the body 1110 and the lower part 1111 of the body 1110 may have the same shape but are not limited thereto and may have different shapes.

Also, the upper part 1112 and the lower part 1111 of the body 1110 may be the same size. However, the upper part 1112 of the body 1110 and the lower part 1111 of the body 1110 are not limited thereto and may have different sizes.

Also, the upper part 1112 and/or the lower part 1111 of the body 1110 may have an empty space through which air may pass.

Although the rotating polygonal mirror 1100 is illustrated as a hexahedron having a square pillar shape including four reflecting surfaces 1120 in FIG. 28, the number of reflecting surfaces 1120 of the rotating polygonal mirror 1100 are not necessarily four and the reflecting surface 1120 does not necessarily have the shape of the hexahedron having the square pillar shape.

Also, the lidar device may further include an encoder unit to detect a rotation angle of the rotating polygonal mirror 1100. Also, the lidar device may control an operation of the rotating polygonal mirror 1100 by using the detected rotation angle. Here, the encoder may be included in the rotating polygonal mirror 1100 or may be disposed to be spaced apart from the rotating polygonal mirror 1100.

Also, the lidar device 100 may have a different FOV which varies according to necessity for each use thereof. For example, a fixed lidar device for three-dimensional mapping may require a maximally wide FOV in vertical and horizontal directions, and a lidar device disposed in a vehicle may require a relatively narrower FOV in a vertical direction than a relatively wide FOV in a horizontal direction. Also, a lidar device disposed in a drone may require a maximally wide FOV in vertical and horizontal directions.

Also, a scanning area of a lidar device may be determined on the basis of the number of reflecting surfaces of a rotating polygonal mirror such that an FOV of the lidar device may be determined. Accordingly, on the basis of a necessary FOV of the lidar device, the number of the reflecting surfaces of the rotating polygonal mirror may be determined.

Figure 29:
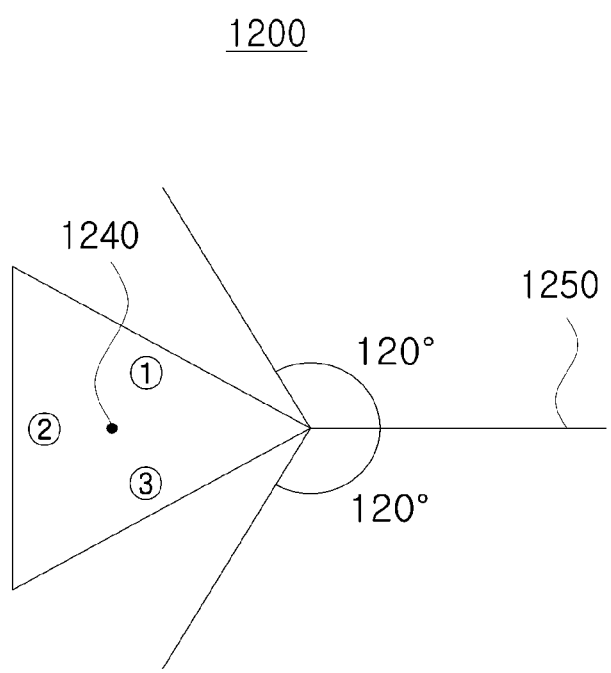
FIG. 29 is a top view illustrating a field of view (FOV) of a rotating polygonal mirror which has three reflecting surfaces and a body with an upper part and a lower part which have an equilateral-triangular shape.
Figure 30:
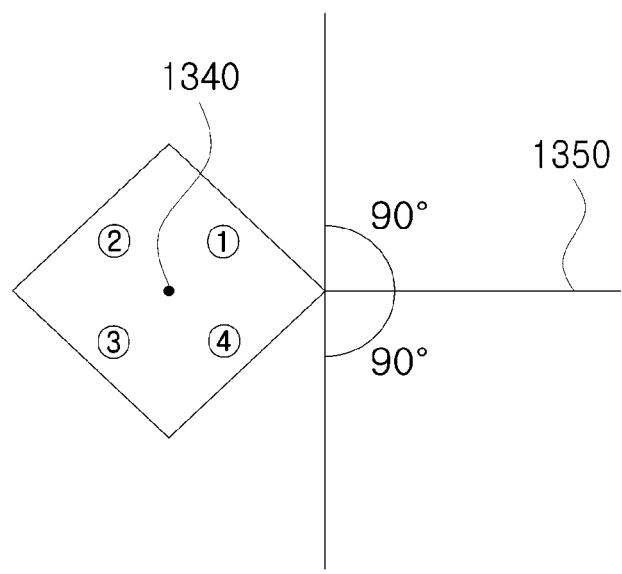
FIG. 30 is a top view illustrating an FOV of a rotating polygonal mirror which has four reflecting surfaces and a body with an upper part and a lower part which have a square shape.
Figure 31:
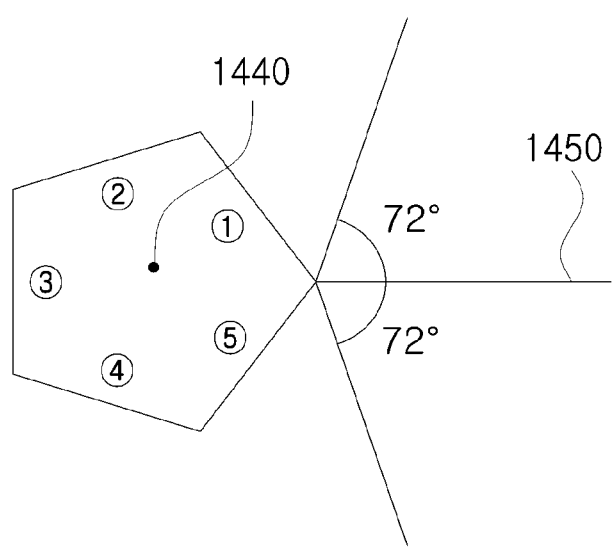
FIG. 31 is a top view illustrating an FOV of a rotating polygonal mirror which has five reflecting surfaces and a body with an upper part and a lower part which have a regular-pentagonal shape.

FIGS. 29 to 31 are views illustrating a relationship between the number of reflecting surfaces and an FOV.

Although three, four, and five reflecting surfaces are illustrated in FIGS. 29 to 31, the number of the reflecting surfaces is not fixed and it is possible to easily calculate the number of reflecting surfaces by analogizing a following description. Also, although an upper part and a lower part of a body are illustrated as having a regular-polygonal shape in FIGS. 27 to 31, it is possible to easily calculate by analogizing a following description even when the upper part and the lower part of the body do not have a regular-polygonal shape.

FIG. 29 is a top view illustrating an FOV of a rotating polygonal mirror 1200 which has three reflecting surfaces and a body with an upper part and a lower part which have an equilateral-triangular shape.

Referring to FIG. 29, a laser 1250 may be incident in a direction which coincides with a rotational axis 1240 of the rotating polygonal mirror 1200. Here, since an upper part of the rotating polygonal mirror 1200 has the equilateral-triangular shape, each angle formed by three reflecting surfaces may be 60 degrees. Also, referring to FIG. 29, the laser may be reflected toward a top in the drawing when the rotating polygonal mirror 1200 is located in a position of being slightly rotated clockwise, and the laser may be reflected toward a bottom in the drawing when the rotating polygonal mirror 1200 is located in a position of being slightly rotated counterclockwise. Accordingly, when a path of the reflected laser is calculated with reference to FIG. 29, a maximum FOV of the rotating polygonal mirror 1200 may be determined.

For example, when a laser is reflected by a first reflecting surface of the rotating polygonal mirror 1200, the laser may be reflected upward with the incident laser 1250 at an angle of 120 degrees. Also, when a laser is reflected by a third reflecting surface of the rotating polygonal mirror, the laser may be reflected downward with the incident laser at an angle of 120 degrees.

Accordingly, when the number of the reflecting surfaces of the rotating polygonal mirror 1200 is three and the upper part and the lower part of the body have an equilateral-triangular shape, a maximum FOV of the rotating polygonal mirror 1200 may be 240 degrees.

FIG. 30 is a top view illustrating an FOV of a rotating polygonal mirror 1300 which has four reflecting surfaces and a body with an upper part and a lower part which have a square shape.

Referring to FIG. 30, a laser 1350 may be incident in a direction which coincides with a rotational axis 1340 of the rotating polygonal mirror 1300. Here, since an upper part of the rotating polygonal mirror 1300 has the square shape, each angle formed by four reflecting surfaces may be 90 degrees. Also, referring to FIG. 30, the laser may be reflected toward a top in the drawing when the rotating polygonal mirror 1300 slightly rotates clockwise and is located, and the laser may be reflected toward a bottom in the drawing when the rotating polygonal mirror 1300 slightly rotates counterclockwise and is located. Accordingly, when a path of the reflected laser is calculated with reference to FIG. 30, a maximum FOV of the rotating polygonal mirror 1300 may be seen.

For example, when a laser is reflected by a first reflecting surface of the rotating polygonal mirror 1300, the laser may be reflected upward with the incident laser 1350 at an angle of 90 degrees. Also, when a laser is reflected by a fourth reflecting surface of the rotating polygonal mirror 1300, the laser may be reflected downward with the incident laser 1350 at an angle of 90 degrees.

Accordingly, when the number of the reflecting surfaces of the rotating polygonal mirror 1300 is four and the upper part and the lower part of the body have a square shape, a maximum FOV of the rotating polygonal mirror 1300 may be 180 degrees.

FIG. 31 is a top view illustrating an FOV of a rotating polygonal mirror 1400 which has five reflecting surfaces and a body with an upper part and a lower part which have a regular-pentagonal shape.

Referring to FIG. 31, a laser 1450 may be incident in a direction which coincides with a rotational axis 1440 of the rotating polygonal mirror 1400. Here, since an upper part of the rotating polygonal mirror 1400 has the regular-pentagonal shape, each angle formed by five reflecting surfaces may be 108 degrees. Also, referring to FIG. 31, the laser may be reflected toward a top in the drawing when the rotating polygonal mirror 1400 slightly rotates clockwise and is located, and the laser may be reflected toward a bottom in the drawing when the rotating polygonal mirror 1400 slightly rotates counterclockwise and is located. Accordingly, when a path of the reflected laser is calculated with reference to FIG. 31, a maximum FOV of the rotating polygonal mirror may be seen.

For example, when a laser is reflected by a first reflecting surface of the rotating polygonal mirror 1400, the laser may be reflected upward with the incident laser 1450 at an angle of 72 degrees. Also, when a laser is reflected by a fifth reflecting surface of the rotating polygonal mirror 1400, the laser may be reflected downward with the incident laser 1450 at an angle of 72 degrees.

Accordingly, when the number of the reflecting surfaces of the rotating polygonal mirror 1400 is five and the upper part and the lower part of the body have a regular-pentagonal shape, a maximum FOV of the rotating polygonal mirror 1400 may be 144 degrees.

As a result, referring to FIGS. 29 to 31, when the number of reflecting surfaces of the rotating polygonal mirror is N and the upper part, the lower part of the body has an N-gonal shape, and an internal angle of the N-gonal shape is referred to as theta, a maximum FOV of the rotating polygonal mirror may be 360 degrees-2θ.

However, since the above-described FOV of the rotating polygonal mirror is merely a calculated maximum value, an FOV determined by the rotating polygonal mirror in the lidar device may be smaller than the calculated maximum value. Also, here, the lidar device may use parts of the reflecting surfaces of the rotating polygonal mirror for scanning.

When a scanning unit of a lidar device includes a rotating polygonal mirror, the rotating polygonal mirror may be used to emit a laser emitted by a laser emitting unit toward a scanning area of the lidar device and may be used to allow the laser reflected by an object, which is present in the scanning area, to be received by a sensor unit.

Here, a part of each reflecting surface of the rotating polygonal mirror which is used for projecting the emitted laser toward the scanning area of the lidar device will be referred to as a projecting portion. Also, a part of each reflecting surface of the rotating polygonal mirror which is used for allowing the laser reflected by the object, which is present in the scanning area, to be received by the sensor unit will be referred to as a receiving portion.

Figure 32:
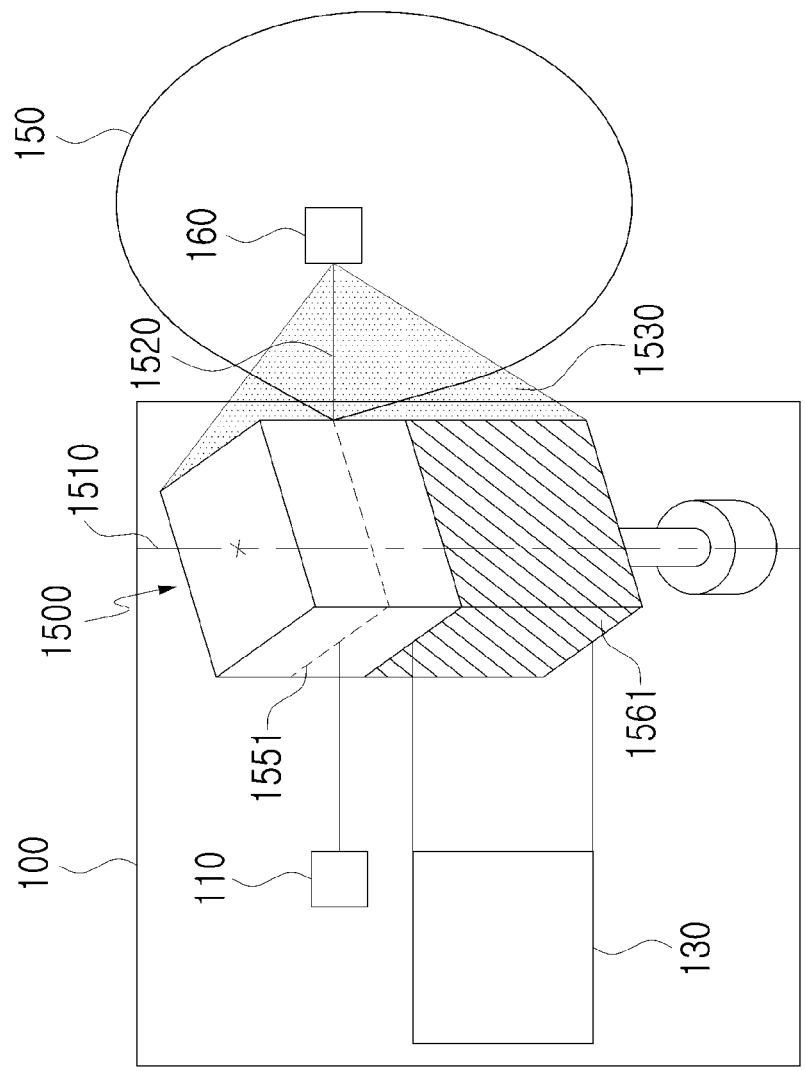
FIG. 32 is a view illustrating a projecting portion and a receiving portion of the rotating polygonal mirror according to one embodiment.

FIG. 32 is a view illustrating a projecting portion and a receiving portion of the rotating polygonal mirror according to one embodiment.

Referring to FIG. 32, a laser emitted by the laser emitting unit 110 may have a dot-shaped projection area and may be incident on a reflecting surface of a rotating polygonal mirror 1500. However, although not shown in FIG. 32, the laser emitted by the laser emitting unit 110 may have a linear or surface-shaped projection area.

When the laser emitted by the laser emitting unit 110 has a dot-shaped projection area, a projecting portion 1551 in the rotating polygonal mirror 1500 may have a line shape formed by connecting dots where the emitted laser meets the rotating polygonal mirror 1500 in a rotational direction of the rotating polygonal mirror 1500. Accordingly, here, the projecting portion 1551 of the rotating polygonal mirror 1500 may be located on each reflecting surface as a linear shape in a direction perpendicular to a rotating shaft 1510 of the rotating polygonal mirror 1500.

Also, a laser, which is projected by the projecting portion 1551 of the rotating polygonal mirror 1500 toward the scanning area of the lidar device 100, may be reflected by the object 160 present in the scanning area 150, and a laser 1530 reflected by the object 160 may be reflected within a range greater than that of the projected laser 1520. Accordingly, the laser 1530 reflected by the object 160 may be parallel to the projected laser and may be received within a larger range by the lidar device 100.

Here, the laser 1530 reflected by the object 160 may be transferred while having a larger size than a size of the reflecting surface of the rotating polygonal mirror 1500. However, a receiving portion 1561 of the rotating polygonal mirror 1500 is a portion for allowing the laser 1530 reflected by the object 160 to be received by the sensor unit 130 and may be one portion of the reflecting surface of the rotating polygonal mirror 1500 which is smaller than the reflecting surface. For example, as shown in FIG. 32, when the laser 1530 reflected by the object 160 is transferred toward the sensor unit 130 through the rotating polygonal mirror 1500, a portion of the reflecting surface of the rotating polygonal mirror 1500 which reflects and transfers the laser 1530 toward the sensor unit 130 may be the receiving portion 1561. Accordingly, the receiving portion 1561 of the rotating polygonal mirror 1500 may be a portion formed by extending one portion of the reflecting surface, which reflects and transfers a laser toward the sensor unit 130, in a rotational direction of the rotating polygonal mirror 1500.

Also, when a condensing lens is further included between the rotating polygonal mirror 1500 and the sensor unit 130, the receiving portion 1561 of the rotating polygonal mirror 1500 may be a portion formed by extending one portion of the reflecting surface, which reflects and transfers a laser toward the condensing lens, in the rotational direction of the rotating polygonal mirror 1500.

However, although it has been described with reference to FIG. 32 that the projecting portion 1551 and the receiving portion 1561 of the rotating polygonal mirror 1550 are spaced apart, the projecting portion 1551 and the receiving portion 1561 of the rotating polygonal mirror 1550 may partially overlap each other and the projecting portion 1551 may be included in the receiving portion 1561.

Figure 33:
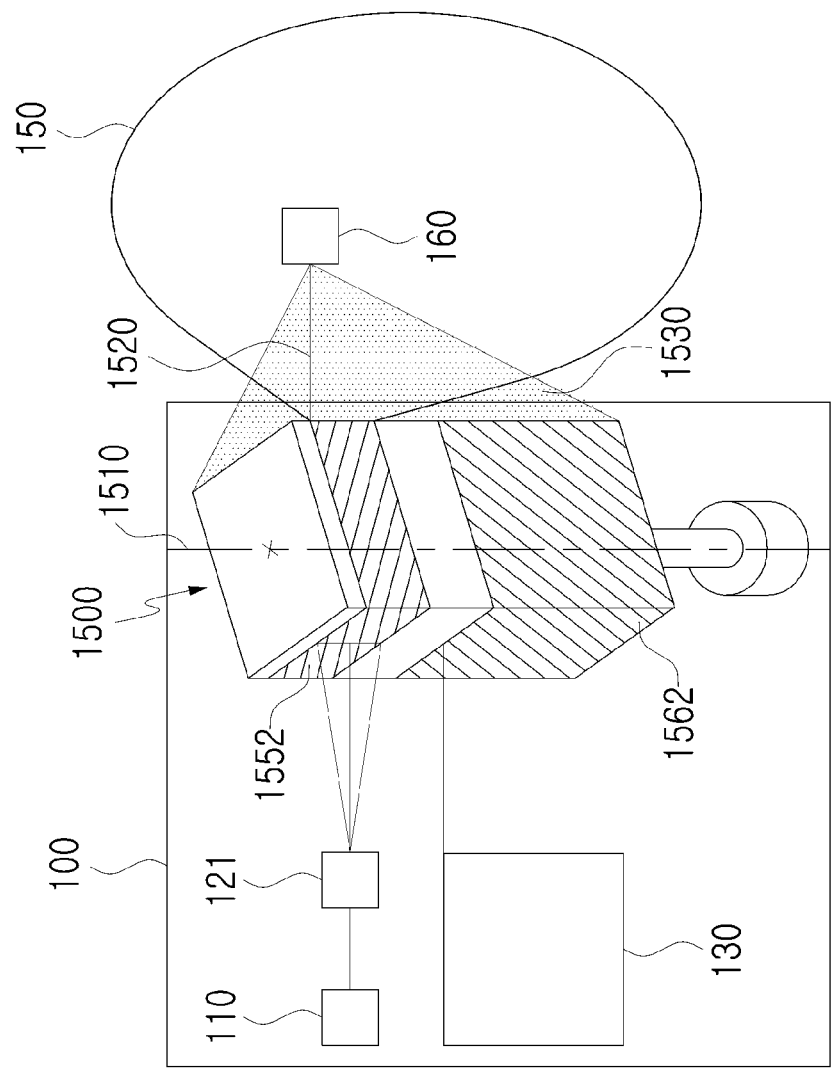
FIG. 33 is a view of a projecting portion and a receiving portion of a rotating polygonal mirror according to another embodiment.

FIG. 33 is a view of a projecting portion and a receiving portion of a rotating polygonal mirror according to another embodiment.

Referring to FIG. 33, a laser projected by the first scanning unit 121 may have a linear projection area and may be incident on the reflecting surface of the rotating polygonal mirror 1500. However, although not shown in FIG. 33, a laser projected by the first scanning unit 121 may have a surface-shaped projection area.

When a laser projected by the first scanning unit 121 has a linear projection area, a projecting portion 1552 of the rotating polygonal mirror 1500 may have a surface shape formed by connecting a linear group of dots, at which a projection area of the projected laser meets the rotating polygonal mirror 1500, in a rotational direction of the rotating polygonal mirror 1500. Accordingly, in this case, the projecting portion 1552 of the rotating polygonal mirror 1500 may be located on each reflecting surface as a surface shape having a normal line perpendicular to the rotating shaft 1510 of the rotating polygonal mirror 1500.

Also, a laser, which is projected by the projecting portion 1552 of the rotating polygonal mirror 1500 toward the scanning area of the lidar device 100, may be reflected by the object 160 present in the scanning area 150, and the laser 1530 reflected by the object 160 may be reflected within a range greater than that of the projected laser. Accordingly, the laser 1530 reflected by the object 160 may be parallel to the projected laser 1520 and may be received within a larger range by the lidar device 100.

Here, the laser 1530 reflected by the object 160 may be transferred while having a larger size than a size of the reflecting surface of the rotating polygonal mirror 1500. However, a receiving portion 1562 of the rotating polygonal mirror 1500 is a portion for allowing the laser 1530 reflected by the object 160 to be received by the sensor unit 130 and may be one portion of the reflecting surface of the rotating polygonal mirror 1500 which is smaller than the reflecting surface. For example, as shown in FIG. 33, when the laser 1530 reflected by the object 160 is transferred toward the sensor unit 130 through the rotating polygonal mirror 1500, a portion of the reflecting surface of the rotating polygonal mirror 1500 which reflects and transfers the laser 1530 toward the sensor unit 130 may be the receiving portion 1562. Accordingly, the receiving portion 1562 of the rotating polygonal mirror 1500 may be a portion formed by extending one portion of the reflecting surface, which reflects and transfers the laser 1530 toward the sensor unit 130, in a rotational direction of the rotating polygonal mirror 1500.

Also, when a condensing lens is further included between the rotating polygonal mirror 1500 and the sensor unit 130, the receiving portion 1562 of the rotating polygonal mirror 1500 may be a portion formed by extending one portion of the reflecting surface, which reflects and transfers a laser toward the condensing lens, in the rotational direction of the rotating polygonal mirror 1500.

However, although it has been described with reference to FIG. 33 that the projecting portion 1552 and the receiving portion 1562 of the rotating polygonal mirror 1500 are spaced apart, the projecting portion 1552 and the receiving portion 1562 of the rotating polygonal mirror 1550 may partially overlap each other and the projecting portion 1552 may be included in the receiving portion 1562.

Figure 34:
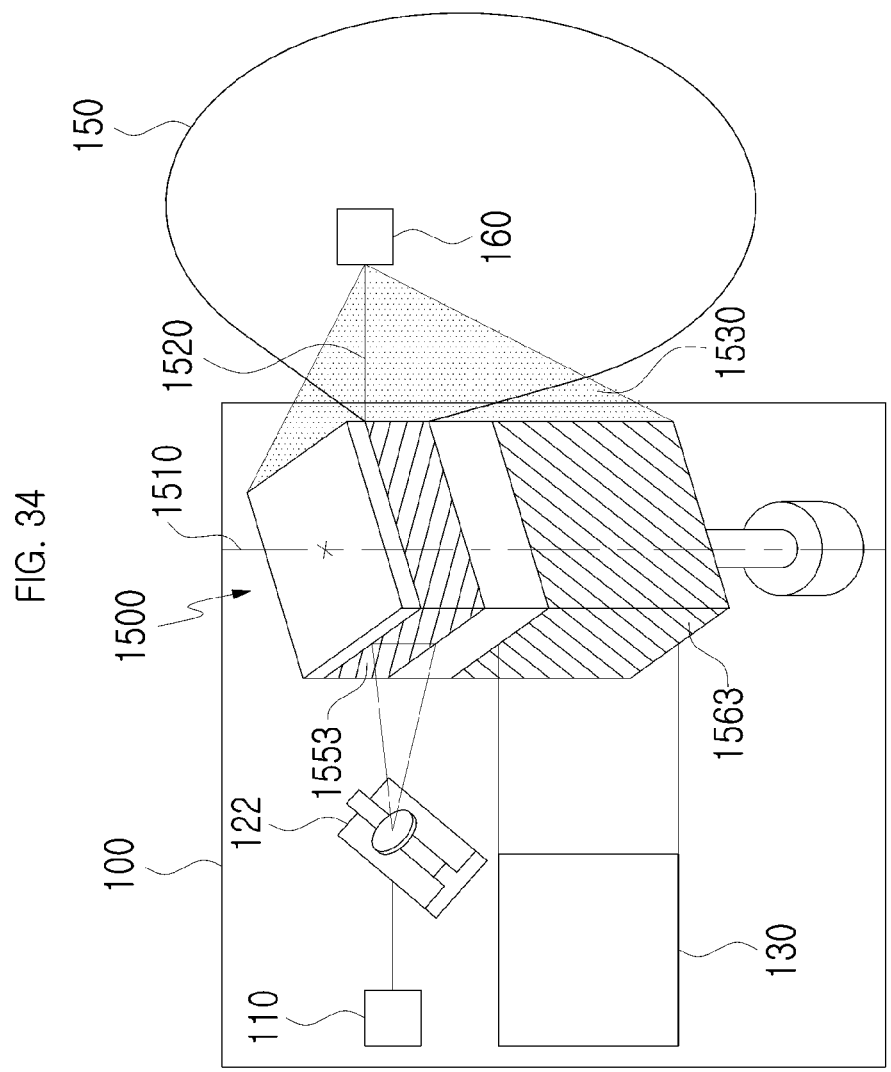
FIG. 34 is a view of a projecting portion and a receiving portion of a rotating polygonal mirror according to still another embodiment.

FIG. 34 is a view of a projecting portion and a receiving portion of a rotating polygonal mirror according to still another embodiment.

Referring to FIG. 34, a laser projected by the nodding mirror 122 may have a linear projection area and may be incident on the reflecting surface of the rotating polygonal mirror 1500. However, although not shown in FIG. 34, a laser projected by the nodding mirror 122 may have a surface-shaped projection area.

When a laser projected by the nodding mirror 122 has a linear projection area, a projecting portion 1553 of the rotating polygonal mirror 1500 may have a surface shape formed by connecting lines, at which a projection area of the projected laser meets the rotating polygonal mirror 1500, in a rotational direction of the rotating polygonal mirror 1500. Accordingly, in this case, the projecting portion 1553 of the rotating polygonal mirror 1500 may be located on each reflecting surface as a surface shape having a normal line perpendicular to the rotating shaft 1510 of the rotating polygonal mirror 1500.

Also, a laser, which is projected by the projecting portion 1553 of the rotating polygonal mirror 1500 toward the scanning area of the lidar device 100, may be reflected by the object 160 present in the scanning area 150, and the laser 1530 reflected by the object 160 may be reflected within a range greater than that of the projected laser 1520. Accordingly, the laser 1530 reflected by the object 160 may be parallel to the projected laser 1520 and may be received within a larger range by the lidar device 100.

Here, the laser 1530 reflected by the object 160 may be transferred while having a larger size than a size of the reflecting surface of the rotating polygonal mirror 1500. However, a receiving portion 1563 of the rotating polygonal mirror 1500 is a portion for allowing the laser 1530 reflected by the object 160 to be received by the sensor unit 130 and may be one portion of the reflecting surface of the rotating polygonal mirror 1500 which is smaller than the reflecting surface. For example, as shown in FIG. 34, when the laser 1530 reflected by the object 160 is transferred toward the sensor unit 130 through the rotating polygonal mirror 1500, a portion of the reflecting surface of the rotating polygonal mirror 1500 which allows and transfers the laser 1530 toward the sensor unit 130 may be the receiving portion 1563. Accordingly, the receiving portion 1563 of the rotating polygonal mirror 1500 may be a portion formed by extending one portion of the reflecting surface, which reflects and transfers the laser 1530 toward the sensor unit 130, in a rotational direction of the rotating polygonal mirror 1500.

Also, when a condensing lens is further included between the rotating polygonal mirror 1500 and the sensor unit 130, the receiving portion 1563 of the rotating polygonal mirror 1500 may be a portion formed by extending one portion of the reflecting surface, which reflects and transfers a laser toward the condensing lens, in the rotational direction of the rotating polygonal mirror 1500.

However, although it has been described with reference to FIG. 34 that the projecting portion 1553 and the receiving portion 1563 of the rotating polygonal mirror 1500 are spaced apart, the projecting portion 1553 and the receiving portion 1563 of the rotating polygonal mirror 1550 may partially overlap each other and the projecting portion 1553 may be included in the receiving portion 1563.

A path of a laser emitted by a laser emitting unit of a lidar device to reach an object located in a scanning area will be referred to as a projection path, and a path of the laser reflected by the object to reach a sensor unit will be referred to as a receiving path.

Hereinafter, a projection path and a receiving path of a lidar device including a rotating polygonal mirror having a projecting portion and a receiving portion will be described.

Referring back to FIG. 32, the lidar device 100 according to one embodiment may include the laser emitting unit 110, the rotating polygonal mirror 1500, and the sensor unit 130.

Here, a laser emitted by the laser emitting unit 110 of the lidar device 100 may be projected toward the scanning area 150 of the lidar device 100 through the rotating polygonal mirror 1500.

In detail, the laser emitting unit 110 may emit a laser toward the rotating polygonal mirror 1500, and the rotating polygonal mirror 1500 may receive and reflect the emitted laser so as to project the laser toward the scanning area 150 of the lidar device 100. Here, a projection area of the emitted laser may have a dot shape.

Here, the projecting portion 1551 of the rotating polygonal mirror 1500 may have a linear shape formed by connecting dots, at which the projected laser meets the rotating polygonal mirror 1500, in a rotational direction of the rotating polygonal mirror 1500. Accordingly, here, the projecting portion 1551 of the rotating polygonal mirror 1500 may be located on each reflecting surface as a linear shape in a direction perpendicular to the rotating shaft 1510 of the rotating polygonal mirror 1500.

Also, a projection path of the lidar device 100 may be a path which starts from the laser emitting unit 110 to the scanning area 150 via the projecting portion 1551 of the rotating polygonal mirror 1500. Accordingly, the projecting portion 1551 of the rotating polygonal mirror 1500 may be included in the projection path of the lidar device 100.

Also, the laser projected toward the scanning area 150 of the lidar device 100 may be reflected by the object 160 which is present in the scanning area 150 and may be projected toward the sensor unit 130 via the rotating polygonal mirror 1500.

In detail, the laser projected toward the scanning area 150 of the lidar device 100 may be reflected by the object 160 which is present in the scanning area 150 of the lidar device 100. Also, the laser reflected by the object 160 may move toward the rotating polygonal mirror 1500, and the rotating polygonal mirror 1500 may receive and reflect so as to project the laser 1530 reflected by the object 160 toward the sensor unit 130.

Here, the receiving portion 1561 of the rotating polygonal mirror 1500 is a portion for allowing the laser 1530 reflected by the object 160 to be received by the sensor unit 130 and may be one portion of the reflecting surface of the rotating polygonal mirror 1500 which is smaller than the reflecting surface. Accordingly, in this case, the receiving portion 1561 of the rotating polygonal mirror 1500 may be a portion formed by extending one portion of the reflecting surface, which reflects and transfers the laser 1530 toward the sensor unit 130, in the rotational direction of the rotating polygonal mirror 1500.

Also, a receiving path of the lidar device 100 may be a path which starts from the object 160 and continues to the sensor unit 130 via the receiving portion 1561 of the rotating polygonal mirror 1500. Accordingly, the receiving portion 1561 of the rotating polygonal mirror 1500 may be included in the receiving path of the lidar device 100.

Also, the laser 1530 reflected by the object 160 may be projected toward the sensor unit 130 through the rotating polygonal mirror 1500. That is, the laser 1530 reflected by the object 160 may be projected toward the sensor unit 130 through the rotating polygonal mirror 1500, and another optical device such as a condensing lens and the like may be included between the rotating polygonal mirror 1500 and the sensor unit 130.

Referring back to FIG. 33, the lidar device according to one embodiment may include the laser emitting unit 110, the first scanning unit 121, the rotating polygonal mirror 1500, and the sensor unit 130.

Here, a laser emitted by the laser emitting unit 110 of the lidar device 100 may be projected toward the scanning area 150 of the lidar device 100 through the first scanning unit 121 and the rotating polygonal mirror 1500.

In detail, the laser emitting unit 110 may emit a laser toward the first scanning unit 121, the first scanning unit 121 may project the emitted laser toward the rotating polygonal mirror 1500, and the rotating polygonal mirror 1500 may receive and reflect so as to project the projected laser toward the scanning area 150 of the lidar device 100. Here, a projection area of the projected laser may have a dot shape, and a projection area of the laser projected by the first scanning unit 121 may have a linear or surface shape.

When a laser projected by the first scanning unit 121 has a linear projection area, a projecting portion 1552 of the rotating polygonal mirror 1500 may have a surface shape formed by connecting lines, at which a projection area of the projected laser meets the rotating polygonal mirror 1500 in a rotational direction of the rotating polygonal mirror 1500. Accordingly, in this case, the projecting portion 1552 of the rotating polygonal mirror 1500 may be located on each reflecting surface as a surface shape having a normal line perpendicular to the rotating shaft 1510 of the rotating polygonal mirror 1500.

Also, a projection path of the lidar device 100 may be a path which starts from the laser emitting unit 110 and continues toward the projecting portion of the rotating polygonal mirror 1500 via the first scanning unit 121 and is connected to the scanning area 150 through the projecting portion 1552 of the rotating polygonal mirror 1500. Accordingly, the projecting portion 1552 of the rotating polygonal mirror 1500 may be included in the projection path of the lidar device 100.

Also, the laser projected toward the scanning area 150 of the lidar device 100 may be reflected by the object 160 which is present in the scanning area 150 and may be projected toward the sensor unit 130 via the rotating polygonal mirror 1500.

In detail, the laser projected toward the scanning area 150 of the lidar device 100 may be reflected by the object 160 which is present in the scanning area 150 of the lidar device 100. Also, the laser 1530 reflected by the object 160 may move toward the rotating polygonal mirror 1500, and the rotating polygonal mirror 1500 may receive and reflect so as to project the laser 1530 reflected by the object 160 toward the sensor unit 130.

Here, the receiving portion 1562 of the rotating polygonal mirror 1500 is a portion for allowing the laser 1530 reflected by the object 160 to be received by the sensor unit 130 and may be one portion of the reflecting surface of the rotating polygonal mirror 1500 which is smaller than the reflecting surface. Accordingly, in this case, the receiving portion 1562 of the rotating polygonal mirror 1500 may be a portion formed by extending one portion of the reflecting surface, which reflects and transfers the laser 1530 toward the sensor unit 130, in the rotational direction of the rotating polygonal mirror 1500.

Also, a receiving path of the lidar device 100 may be a path which starts from the object 160 and continues to the sensor unit 130 via the receiving portion 1562 of the rotating polygonal mirror 1500. Accordingly, the receiving portion 1562 of the rotating polygonal mirror 1500 may be included in the receiving path of the lidar device 100.

Also, the laser reflected by the object 160 may be projected toward the sensor unit 130 through the rotating polygonal mirror 1500. That is, the laser 1530 reflected by the object 160 may be projected toward the sensor unit 130 through the rotating polygonal mirror 1500, and another optical device such as a condensing lens and the like may be included between the rotating polygonal mirror 1500 and the sensor unit 130.

Referring back to FIG. 34, the lidar device 100 according to one embodiment may include the laser emitting unit 110, the nodding mirror 122, the rotating polygonal mirror 1500, and the sensor unit 130.

Here, a laser emitted by the laser emitting unit 110 of the lidar device 100 may be projected toward the scanning area 150 of the lidar device 100 through the nodding mirror 122 and the rotating polygonal mirror 1500.

In detail, the laser emitting unit 110 may emit a laser toward the nodding mirror 122, the nodding mirror 122 may project the emitted laser toward the rotating polygonal mirror 1500, and the rotating polygonal mirror 1500 may receive and reflect so as to project the emitted laser toward the scanning area 150 of the lidar device 100. Here, a projection area of the projected laser may have a dot shape, and a projection area of the laser projected by the nodding mirror 122 may have a linear or surface shape.

When a laser projected by the nodding mirror 122 has a linear projection area, the projecting portion 1553 of the rotating polygonal mirror 1500 may have a surface shape formed by connecting lines, at which a projection area of the projected laser meets the rotating polygonal mirror 1500, in a rotational direction of the rotating polygonal mirror 1500. Accordingly, in this case, the projecting portion 1553 of the rotating polygonal mirror 1500 may be located on each reflecting surface as a surface shape having a normal line perpendicular to the rotating shaft of the rotating polygonal mirror 1500.

Also, a projection path of the lidar device 100 may be a path which starts from the laser emitting unit 110 toward the projecting portion 1553 of the rotating polygonal mirror 1500 via the nodding mirror 122 and is connected to the scanning area 150 through the projecting portion 1553 of the rotating polygonal mirror 1500. Accordingly, the projecting portion 1553 of the rotating polygonal mirror 1500 may be included in the projection path of the lidar device 100.

Also, the laser projected toward the scanning area 150 of the lidar device 100 may be reflected by the object 160 which is present in the scanning area 150 and may be projected toward the sensor unit 130 via the rotating polygonal mirror 1500.

In detail, the laser projected toward the scanning area 150 of the lidar device 100 may be reflected by the object 160 which is present in the scanning area 150 of the lidar device 100. Also, the laser 1530 reflected by the object 160 may move toward the rotating polygonal mirror 1500, and the rotating polygonal mirror 1500 may receive and reflect so as to project the laser 1530 reflected by the object 160 toward the sensor unit 130.

Here, the receiving portion 1563 of the rotating polygonal mirror 1500 is a portion for allowing the laser 1530 reflected by the object 160 to be received by the sensor unit 130 and may be one portion of the reflecting surface of the rotating polygonal mirror 1500 which is smaller than the reflecting surface. Accordingly, in this case, the receiving portion 1563 of the rotating polygonal mirror 1500 may be a portion formed by extending one portion of the reflecting surface, which reflects and transfers the laser 1530 toward the sensor unit 130, in the rotational direction of the rotating polygonal mirror 1500.

Also, a receiving path of the lidar device 100 may be a path which starts from the object 160 and continues to the sensor unit 130 via the receiving portion 1563 of the rotating polygonal mirror 1500. Accordingly, the receiving portion 1563 of the rotating polygonal mirror 1500 may be included in the receiving path of the lidar device 100.

Also, the laser 1530 reflected by the object 160 may be projected toward the sensor unit 130 through the rotating polygonal mirror 1500. That is, the laser 1530 reflected by the object 160 may be projected toward the sensor unit 130 through the rotating polygonal mirror 1500, and another optical device such as a condensing lens and the like may be included between the rotating polygonal mirror 1500 and the sensor unit 130.

Figure 35:
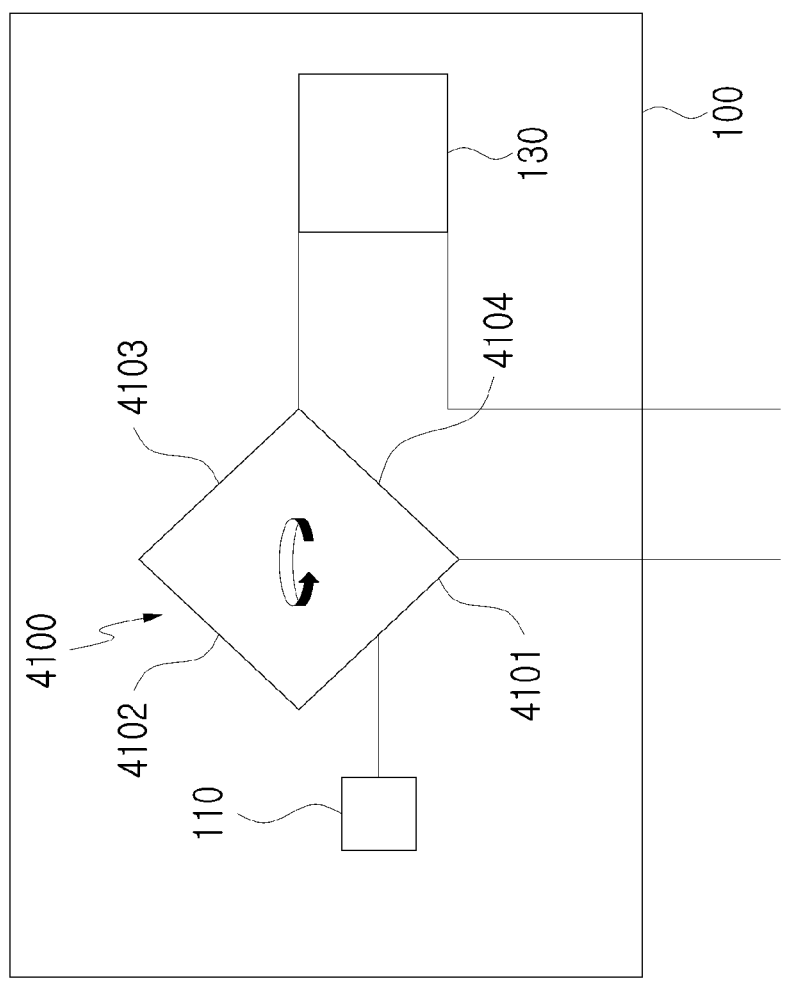
FIG. 35 is a top view illustrating a function of a rotating polygonal mirror according to one embodiment.

FIG. 35 is a top view illustrating a function of a rotating polygonal mirror according to one embodiment.

Referring to FIG. 35, the lidar device 100 according to one embodiment may include the laser emitting unit 110, a rotating polygonal mirror 4100, and the sensor unit 130. Also, although the rotating polygonal mirror 4100 is shown as having four reflecting surfaces in FIG. 35, the number of reflecting surfaces of the rotating polygonal mirror 4100 is not limited thereto.

Here, a laser emitted by the laser emitting unit 110 of the lidar device 100 may be projected toward a scanning area of the lidar device 100 through reflecting surfaces 4101, 4102, 4103, and 4104 of the rotating polygonal mirror 4100, and a reflecting surface used for projecting the laser toward the scanning area of the lidar device 100 may be changed as the rotating polygonal mirror 4100 rotates. For example, as shown in FIG. 35, a laser emitted by the laser emitting unit 110 may be projected toward the scanning area of the lidar device 100 through a first reflecting surface 4101 of the rotating polygonal mirror 4100.

Also, the laser projected toward the scanning area of the lidar device 100 may be reflected by an object which is present in the scanning area of the lidar device 100. Here, the laser reflected by the object may move toward the rotating polygonal mirror 4100, and the rotating polygonal mirror 4100 may receive and reflect so as to project the laser reflected by the object toward the sensor unit 130.

In detail, the laser reflected by the object may move toward the rotating polygonal mirror 4100 and may be projected toward the sensor unit 130 through another reflecting surface of the rotating polygonal mirror 4100 instead of the first reflecting surface 4101. For example, as shown in FIG. 35, a laser reflected by the object may be projected toward the sensor unit 130 through a fourth reflecting surface 4104 of the rotating polygonal mirror 4100.

Figure 36:
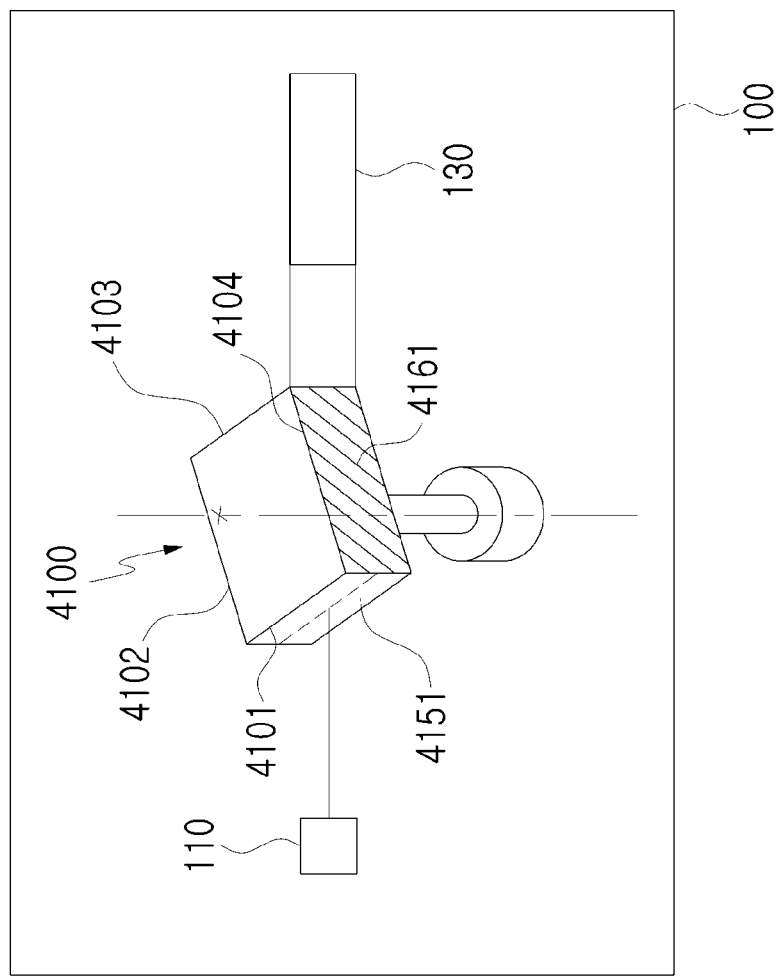
FIG. 36 is a view illustrating a projecting portion and a receiving portion of the rotating polygonal mirror according to one embodiment.

FIG. 36 is a view illustrating a projecting portion and a receiving portion of the rotating polygonal mirror according to one embodiment.

Referring to FIG. 36, a projecting portion 4151 and a receiving portion 4161 of the rotating polygonal mirror 4100 according to one embodiment may be located on different reflecting surfaces.

In detail, a laser emitted by the laser emitting unit 110 may have a dot-shaped projection area and may be incident on a reflecting surface of the rotating polygonal mirror 4100. However, although not shown in FIG. 36, the laser emitted by the laser emitting unit 110 may have a linear or surface-shaped projection area.

When the laser emitted by the laser emitting unit 110 has a dot-shaped projection area, the projecting portion 4151 in the rotating polygonal mirror 4100 may have a line shape formed by connecting dots, at which the emitted laser meets the rotating polygonal mirror 4100, in a rotational direction of the rotating polygonal mirror 4100. Accordingly, in this case, the projecting portion 4151 of the rotating polygonal mirror 4100 may be located on each reflecting surface as a linear shape in a direction perpendicular to a rotating shaft of the rotating polygonal mirror 4100.

Also, since the rotating polygonal mirror 4100 rotates, the projecting portion 4151 of the rotating polygonal mirror 4100 may be located on a different reflecting surface according to a rotation angle of the rotating polygonal mirror 4100. For example, in the rotating polygonal mirror 4100 having four reflecting surfaces as shown in FIG. 36, when an angle at which a laser emitted by the laser emitting unit 110 starts being incident on the first reflecting surface 4101 of the rotating polygonal mirror 4100 is referred to as an offset state, the projecting portion 4151 of the rotating polygonal mirror 4100 may be located in a linear shape on the first reflecting surface 4101 until the rotating polygonal mirror 4100 rotates by 90 degrees from the offset state. Also, the projecting portion 4151 of the rotating polygonal mirror 4100 may be located in a linear shape on a second reflecting surface 4102 until the rotating polygonal mirror 4100 rotates by 180 degrees from a state of rotating by 90 degrees on the basis of the offset state, may be located in a linear shape on a third reflecting surface 4103 until the rotating polygonal mirror 4100 rotates by 270 degrees from a state of rotating by 180 degrees, and may be located in a linear shape on a fourth reflecting surface 4104 until the rotating polygonal mirror 4100 rotates by 360 degrees from a state of rotating by 270 degrees.

Also, a laser, which is projected by the projecting portion 4151 of the rotating polygonal mirror 4100 toward a scanning area of the lidar device 100, may be reflected by an object present in the scanning area, and the laser reflected by the object may be reflected within a larger range than that of the projected laser. Accordingly, the laser reflected by the object may be parallel to the projected laser and may be received, in a larger range, by the lidar device.

Here, the laser reflected by the object may be transferred with a larger size than that of the rotating polygonal mirror 4100. However, the receiving portion 4161 of the rotating polygonal mirror 4100 is a portion for allowing the laser reflected by the object to be received by the sensor unit 130 and may be one portion smaller than the rotating polygonal mirror 4100.

Also, since the rotating polygonal mirror 4100 rotates, the receiving portion 4161 of the rotating polygonal mirror 4100 may be located on a different reflecting surface according to a rotation angle of the rotating polygonal mirror 4100. For example, in the rotating polygonal mirror 4100 having four reflecting surfaces as shown in FIG. 36, when the projecting portion 4151 is located on the first reflecting surface 4101 of the rotating polygonal mirror 4100, the receiving portion 4161 of the rotating polygonal mirror 4100 may be located on the fourth reflecting surface 4104. Also, when the projecting portion 4151 is located on the second reflecting surface 4102 of the rotating polygonal mirror 4100, the receiving portion 4161 of the rotating polygonal mirror 4100 may be located on the first reflecting surface 4101. When the projecting portion 4151 is located on the third reflecting surface 4103 of the rotating polygonal mirror 4100, the receiving portion 4161 of the rotating polygonal mirror 4100 may be located on the second reflecting surface 4102. When the projecting portion 4151 is located on the fourth reflecting surface 4104 of the rotating polygonal mirror 4100, the receiving portion 4161 of the rotating polygonal mirror 4100 may be located on the third reflecting surface 4103.

Accordingly, in a case in which the projecting portion 4151 and the receiving portion 4161 of the rotating polygonal mirror 4100 are located on adjacent reflecting surfaces and the number of reflecting surfaces of the rotating polygonal mirror 4100 is N, when the projecting portion 4151 of the rotating polygonal mirror 4100 is located on a first reflecting surface, the receiving portion 4161 of the rotating polygonal mirror 4100 may be located on an Nth reflecting surface, and when the projecting portion 4151 of the rotating polygonal mirror 4100 is located on an Mth reflecting surface (here, M is a natural number satisfying 1<M≤N), the receiving portion 4161 of the rotating polygonal mirror 4100 may be located on an M−1th reflecting surface.

However, although the projecting portion 4151 and the receiving portion 4161 of the rotating polygonal mirror 4100 have been described as being located on adjacent reflecting surfaces in FIG. 36, the projecting portion 4151 and the receiving portion 4161 of the rotating polygonal mirror 4100 may be located on the same reflecting surface or may be located on different reflecting surfaces which are not adjacent to each other.

When a rotating polygonal mirror used in a lidar device has a projecting portion and a receiving portion, and the projecting portion and the receiving portion are located on different reflecting surfaces, a height of the rotating polygonal mirror may be set on the basis of a higher one of heights of the projecting portion and the receiving portion.

Referring back to FIG. 36, when a laser emitted by the laser emitting unit 110 has a dot-shaped projection area, the projecting portion 4151 in the rotating polygonal mirror 4100 may have a line shape formed by connecting dots, at which the emitted laser meets the rotating polygonal mirror 4100, in a rotational direction of the rotating polygonal mirror 4100. Accordingly, the height of the projecting portion 4151 of the rotating polygonal mirror 4100 may be determined on the basis of a diameter of the laser emitted by the laser emitting unit 110.

Also, when a laser reflected by an object present in a scanning area of the lidar device 100 is transferred toward the sensor unit through the rotating polygonal mirror 4100, a portion of the reflecting surface of the rotating polygonal mirror 4100 which reflects and transfers the laser toward the sensor unit 130 may be the receiving portion 4161. Also, a surface shape may be formed by connecting portions, which reflect and transfer the laser toward the sensor unit 130, in the rotational direction of the rotating polygonal mirror 4100. Accordingly, the height of the receiving portion 4161 of the rotating polygonal mirror 4100 may be determined on the basis of a size of the sensor unit 130.

Here, since the height of the rotating polygonal mirror 4100 should be the higher one of the heights of the projecting portion 4151 and the receiving portion 4161, the height of the rotating polygonal mirror 4100 may be determined on the basis of a greater one of a diameter of the laser emitted by the laser emitting unit 110 and a size of the sensor unit 130.

Also, when the lidar device 100 further includes a condensing lens between the rotating polygonal mirror 4100 and the sensor unit 130, the receiving portion 4161 of the rotating polygonal mirror 4100 may be a portion formed by extending one portion of the reflecting surface, which reflects and transfers a laser toward the condensing lens, in the rotational direction of the rotating polygonal mirror 4100. Accordingly, the receiving portion 4161 of the rotating polygonal mirror 4100 may be determined on the basis of a diameter of the condensing lens.

Here, since the height of the rotating polygonal mirror 4100 should be the higher one of the heights of the projecting portion 4151 and the receiving portion 4161, the height of the rotating polygonal mirror 4100 may be determined on the basis of a greater one of a diameter of the laser emitted by the laser emitting unit 110 and the diameter of the condensing lens.

Figure 37:
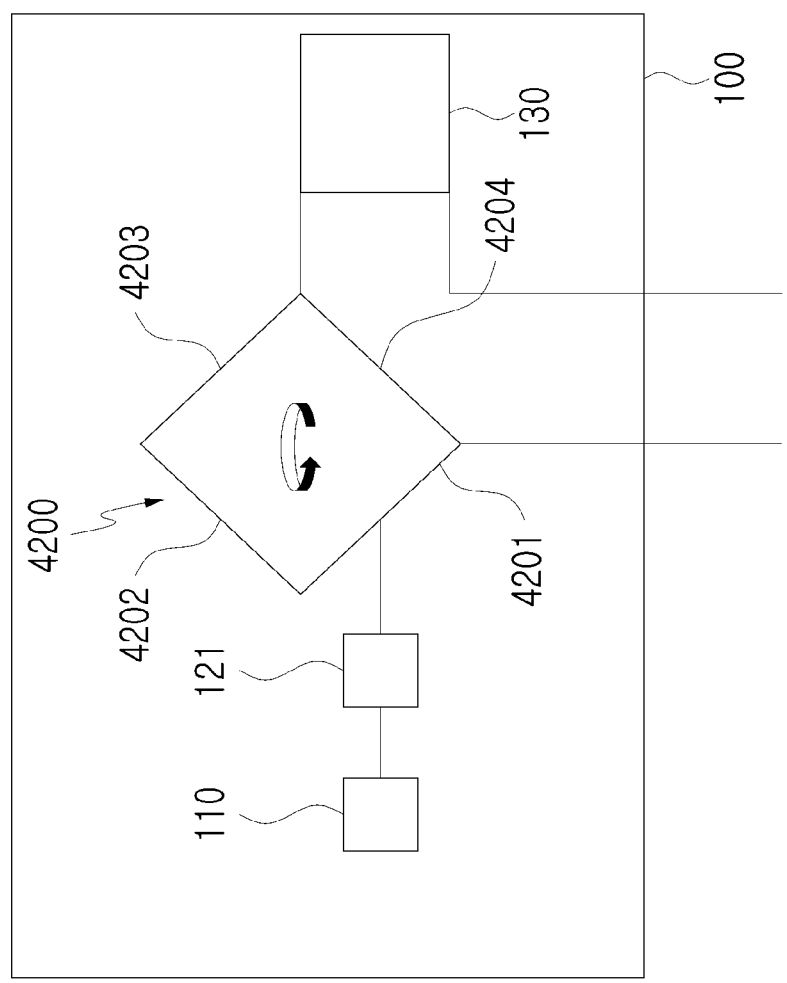
FIG. 37 is a top view illustrating a function of a rotating polygonal mirror according to another embodiment.

FIG. 37 is a top view illustrating a function of a rotating polygonal mirror according to another embodiment.

Referring to FIG. 37, the lidar device 100 according to one embodiment may include the laser emitting unit 110, the first scanning unit 121, a rotating polygonal mirror 4200, and the sensor unit 130. Also, although the rotating polygonal mirror 4200 is shown as having four reflecting surfaces in FIG. 37, the number of reflecting surfaces of the rotating polygonal mirror 4200 is not limited thereto.

Here, a laser emitted by the laser emitting unit 110 of the lidar device 100 may be projected toward the rotating polygonal mirror 4200 through the first scanning unit 121, the laser projected by the first scanning unit 121 may be projected toward a scanning area of the lidar device 100 through each reflecting surface of the rotating polygonal mirror 4200, and a reflecting surface used for projecting a laser toward the scanning area of the lidar device 100 may vary as the rotating polygonal mirror 4200 rotates. For example, as shown in FIG. 37, a laser projected by the first scanning unit 121 may be projected toward the scanning area of the lidar device 100 through a first reflecting surface 4201 of the rotating polygonal mirror 4200.

Also, the laser projected toward the scanning area of the lidar device 100 may be reflected by an object which is present in the scanning area of the lidar device 100. Here, the laser reflected by the object may move toward the rotating polygonal mirror 4200, and the rotating polygonal mirror 4200 may receive and reflect so as to project the laser reflected by the object toward the sensor unit 130.

In detail, the laser reflected by the object may move toward the rotating polygonal mirror 4200 and may be projected toward the sensor unit 130 through another reflecting surface of the rotating polygonal mirror 4200 instead of the first reflecting surface 4201. For example, as shown in FIG. 37, a laser reflected by the object may be projected toward the sensor unit 130 through a fourth reflecting surface 4204 of the rotating polygonal mirror 4200.

Figure 38:
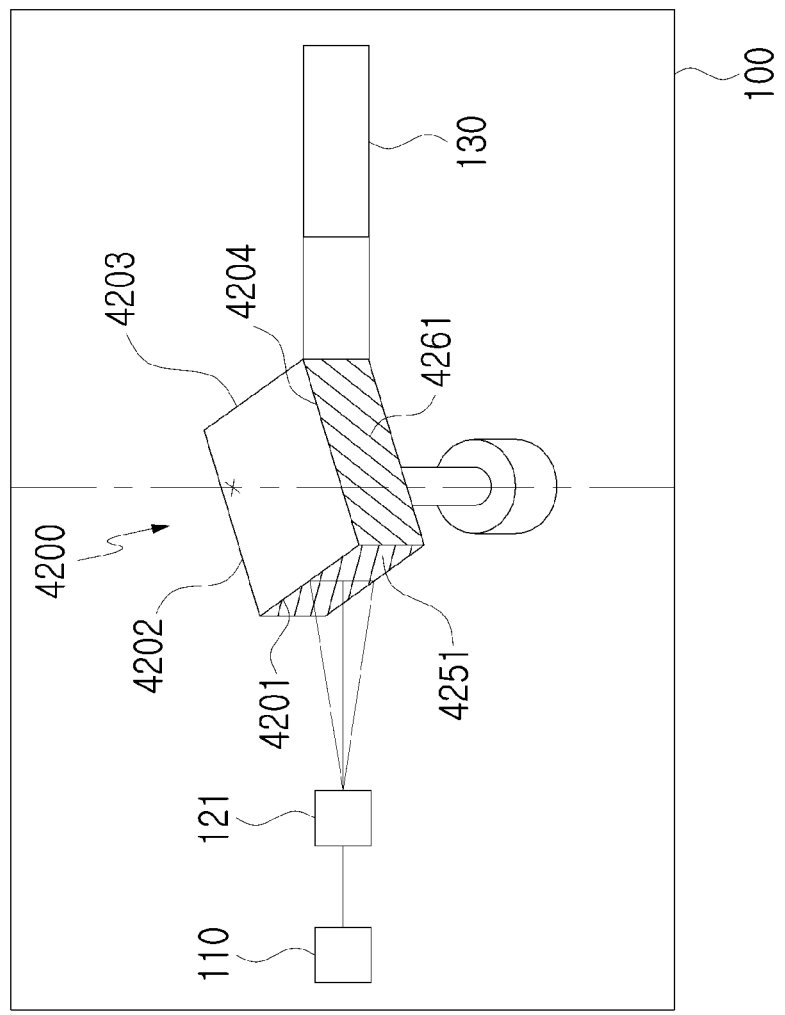
FIG. 38 is a view illustrating a projecting portion and a receiving portion of the rotating polygonal mirror according to another embodiment.

FIG. 38 is a view illustrating a projecting portion and a receiving portion of the rotating polygonal mirror according to another embodiment.

Referring to FIG. 38, a projecting portion 4251 and a receiving portion 4261 of the rotating polygonal mirror 4200 according to another embodiment may be located on different reflecting surfaces.

In detail, a laser projected by the first scanning unit 121 may have a linear projection area and may be incident on the reflecting surface of the rotating polygonal mirror 4200. However, although not shown in FIG. 38, a laser projected by the first scanning unit 121 may have a surface-shaped projection area.

When a laser projected by the first scanning unit 121 has a linear projection area, the projecting portion 4251 of the rotating polygonal mirror 4200 may have a surface shape formed by connecting a linear group of dots, at which a projection area of the emitted laser meets the rotating polygonal mirror 4200, in a rotational direction of the rotating polygonal mirror 4200. Accordingly, in this case, the projecting portion 4251 of the rotating polygonal mirror 4200 may be located on each reflecting surface as a surface shape having a normal line perpendicular to a rotating shaft of the rotating polygonal mirror 4200.

Also, since the rotating polygonal mirror 4200 rotates, the projecting portion 4251 of the rotating polygonal mirror 4200 may be located on a different reflecting surface according to a rotation angle of the rotating polygonal mirror 4200. For example, in the rotating polygonal mirror 4200 having four reflecting surfaces as shown in FIG. 38, when an angle, at which a laser projected by the first scanning unit 121 starts being incident on the first reflecting surface 4201 of the rotating polygonal mirror 4200, is referred to as an offset state, the projecting portion 4251 of the rotating polygonal mirror 4200 may be located in a surface shape on the first reflecting surface 4201 until the rotating polygonal mirror 4200 rotates by 90 degrees from the offset state. Also, the projecting portion 4251 of the rotating polygonal mirror 4200 may be located in a surface shape on a second reflecting surface 4202 until the rotating polygonal mirror 4200 rotates by 180 degrees from a state of rotating by 90 degrees on the basis of the offset state, may be located in a surface shape on a third reflecting surface 4203 until the rotating polygonal mirror 4200 rotates by 270 degrees from a state of rotating by 180 degrees, and may be located in a surface shape on a fourth reflecting surface 4204 until the rotating polygonal mirror 4200 rotates by 360 degrees from a state of rotating by 270 degrees.

Also, a laser, which is projected by the projecting portion 4251 of the rotating polygonal mirror 4200 toward a scanning area of the lidar device 100, may be reflected by an object present in the scanning area, and the laser reflected by the object may be reflected within a larger range than that of the emitted laser. Accordingly, the laser reflected by the object may be parallel to the emitted laser and may be received, in a larger range, by the lidar device 100.

Here, the laser reflected by the object may be transferred with a larger size than that of the rotating polygonal mirror 4200. However, the receiving portion 4261 of the rotating polygonal mirror 4200 is a portion for allowing the laser reflected by the object to be received by the sensor unit 130 and may be one portion smaller than the rotating polygonal mirror 4200.

Also, since the rotating polygonal mirror 4200 rotates, the receiving portion 4261 of the rotating polygonal mirror 4200 may be located on a different reflecting surface according to a rotation angle of the rotating polygonal mirror 4200. For example, in the rotating polygonal mirror 4200 having four reflecting surfaces as shown in FIG. 38, when the projecting portion 4251 is located on the first reflecting surface 4201 of the rotating polygonal mirror 4200, the receiving portion 4261 of the rotating polygonal mirror 4200 may be located on the fourth reflecting surface 4204. Also, when the projecting portion 4251 is located on the second reflecting surface 4202 of the rotating polygonal mirror 4200, the receiving portion 4261 of the rotating polygonal mirror 4200 may be located on the first reflecting surface 4201. When the projecting portion 4251 is located on the third reflecting surface 4203 of the rotating polygonal mirror 4200, the receiving portion 4161 of the rotating polygonal mirror 4200 may be located on the second reflecting surface 4202. When the projecting portion 4251 is located on the fourth reflecting surface 4204 of the rotating polygonal mirror 4200 the receiving portion 4261 of the rotating polygonal mirror 4200 may be located on the third reflecting surface 4203.

Accordingly, in a case in which the projecting portion 4251 and the receiving portion 4261 of the rotating polygonal mirror 4200 are located on adjacent reflecting surfaces and the number of reflecting surfaces of the rotating polygonal mirror 4200 is N, when the projecting portion 4251 of the rotating polygonal mirror 4200 is located on a first reflecting surface, the receiving portion 4261 of the rotating polygonal mirror 4200 may be located on an Nth reflecting surface, and when the projecting portion 4251 of the rotating polygonal mirror 4200 is located on an Mth reflecting surface (here, M is a natural number satisfying 1<M≤N), the receiving portion 4261 of the rotating polygonal mirror 4200 may be located on an M−1th reflecting surface.

However, although the projecting portion 4251 and the receiving portion 4261 of the rotating polygonal mirror 4200 have been described as being located on adjacent reflecting surfaces in FIG. 38, the projecting portion 4251 and the receiving portion 4261 of the rotating polygonal mirror 4200 may be located on the same reflecting surface or may be located on different reflecting surfaces which are not adjacent to each other.

Referring back to FIG. 38, when a laser projected by the first scanning unit 121 has a linear projection area, the projecting portion 4251 of the rotating polygonal mirror 4200 may have a surface shape formed by connecting a linear group of dots, at which a projection area of the projected laser meets the rotating polygonal mirror 4200, in a rotational direction of the rotating polygonal mirror 4200. Accordingly, a height of the projecting portion 4251 of the rotating polygonal mirror 4200 may be determined on the basis of a distance between the first scanning unit 121 and the rotating polygonal mirror 4200 and an angle from the first scanning unit 121 to the projection area.

Also, when a laser reflected by an object present in a scanning area of the lidar device 100 is transferred toward the sensor unit 130 through the rotating polygonal mirror 4200, a portion of the reflecting surface of the rotating polygonal mirror 4200 which reflects and transfers the laser toward the sensor unit 130 may be the receiving portion 4261. Also, a surface shape may be formed by connecting portions, which reflect and transfer the laser toward the sensor unit 130, in the rotational direction of the rotating polygonal mirror 4200. Accordingly, the height of the receiving portion 4261 of the rotating polygonal mirror 4200 may be determined on the basis of a size of the sensor unit 130.

Here, since the height of the rotating polygonal mirror 4200 should be a higher one of the heights of the projecting portion 4251 and the receiving portion 4261, the height of the rotating polygonal mirror 4200 may be determined on the basis of a distance between the first scanning unit 121 and the rotating polygonal mirror 4200, the angle from the first scanning unit 121 to the projection area, and the size of the sensor unit 130.

Also, when the lidar device 100 further includes a condensing lens between the rotating polygonal mirror 4200 and the sensor unit 130, the receiving portion 4261 of the rotating polygonal mirror 4200 may be a portion formed by extending one portion of the reflecting surface which reflects and transfers a laser toward the condensing lens, in the rotational direction of the rotating polygonal mirror 4200. Accordingly, the receiving portion 4261 of the rotating polygonal mirror 4200 may be determined on the basis of a diameter of the condensing lens.

Here, since the height of the rotating polygonal mirror 4200 should be a higher one of the heights of the projecting portion 4251 and the receiving portion 4261, the height of the rotating polygonal mirror 4200 may be determined on the basis of the distance between the first scanning unit 121 and the rotating polygonal mirror 4200, the angle from the first scanning unit 121 to the projection area, and the diameter of the condensing lens.

Figure 39:
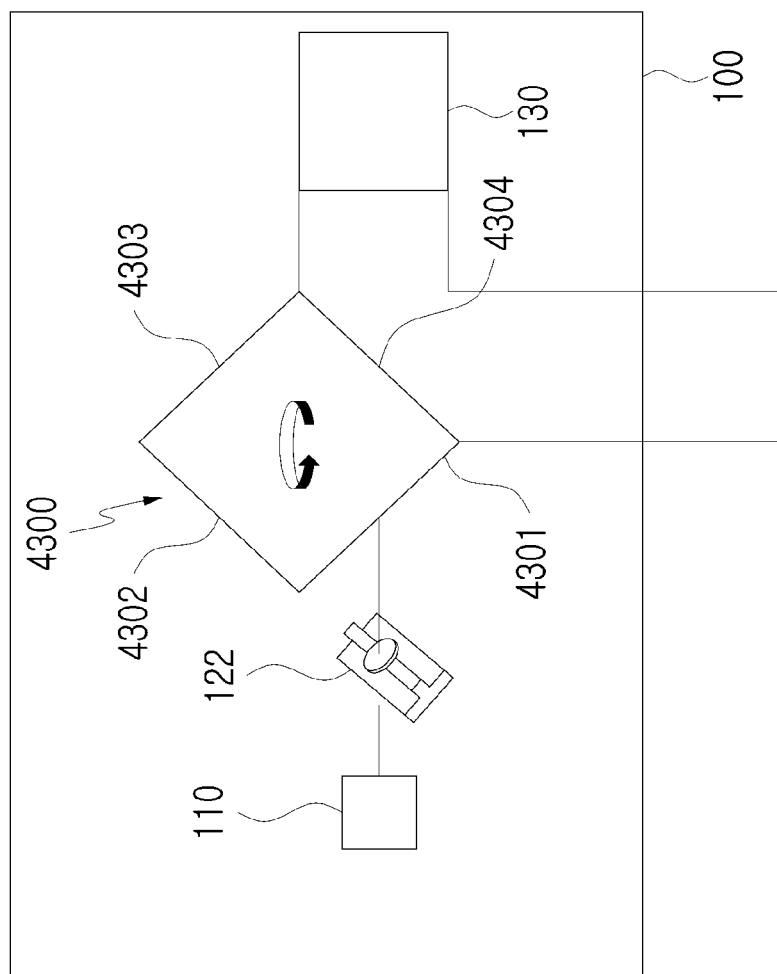
FIG. 39 is a top view illustrating a function of a rotating polygonal mirror according to another embodiment.

FIG. 39 is a top view illustrating a function of a rotating polygonal mirror according to another embodiment.

Referring to FIG. 39, the lidar device 100 according to one embodiment may include the laser emitting unit 110, the nodding mirror 122, a rotating polygonal mirror 4300, and the sensor unit 130. Also, although the rotating polygonal mirror 4300 is shown as having four reflecting surfaces in FIG. 39, the number of reflecting surfaces of the rotating polygonal mirror 4300 is not limited thereto.

Here, a laser emitted by the laser emitting unit 110 of the lidar device 100 may be projected toward the rotating polygonal mirror 4300 through the nodding mirror 122, the laser projected by the nodding mirror 122 may be projected toward a scanning area of the lidar device 100 through each reflecting surface of the rotating polygonal mirror 4300, and a reflecting surface used for projecting a laser toward the scanning area of the lidar device 100 may vary as the rotating polygonal mirror 4300 rotates. For example, as shown in FIG. 39, a laser projected by the nodding mirror 122 may be projected toward the scanning area of the lidar device 100 through a first reflecting surface 4301 of the rotating polygonal mirror 4300.

Also, the laser projected toward the scanning area of the lidar device 100 may be reflected by an object which is present in the scanning area of the lidar device 100. Here, the laser reflected by the object may move toward the rotating polygonal mirror 4300, and the rotating polygonal mirror 4300 may receive and reflect so as to project the laser reflected by the object toward the sensor unit 130.

In detail, the laser reflected by the object may move toward the rotating polygonal mirror 4300 and may be projected toward the sensor unit 130 through another reflecting surface of the rotating polygonal mirror 4300 instead of the first reflecting surface 4301. For example, as shown in FIG. 39, a laser reflected by the object may be projected toward the sensor unit 130 through a fourth reflecting surface 4304 of the rotating polygonal mirror 4300.

Figure 40:
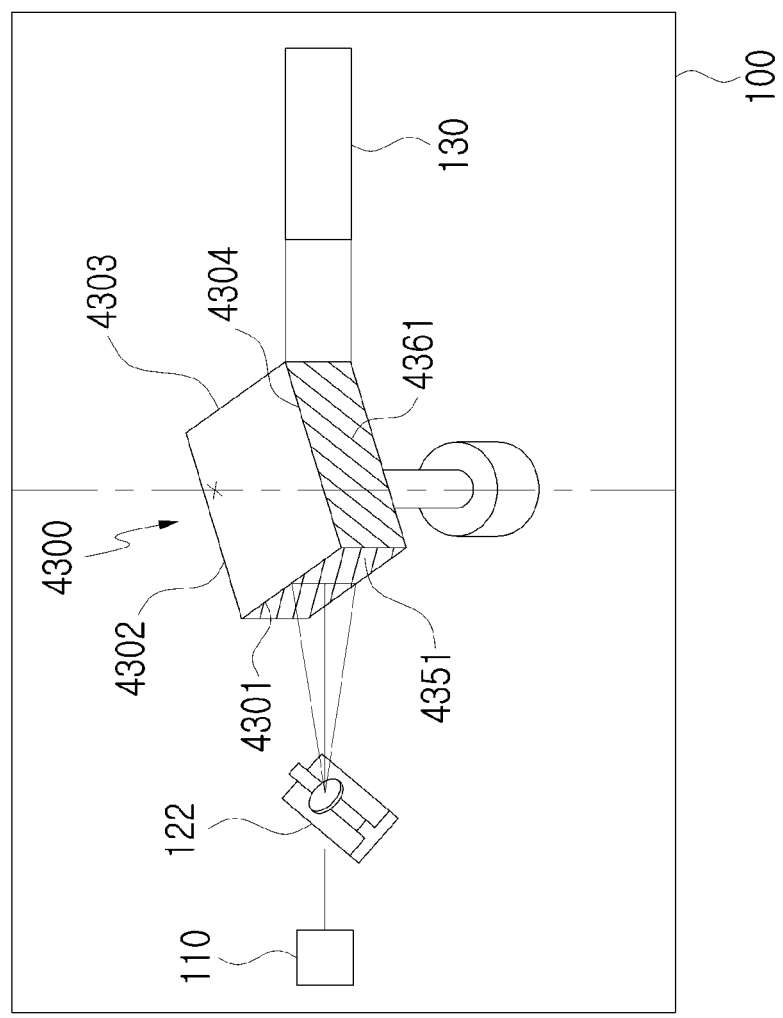
FIG. 40 is a view illustrating a projecting portion and a receiving portion of the rotating polygonal mirror according to another embodiment.

FIG. 40 is a view illustrating a projecting portion and a receiving portion of the rotating polygonal mirror according to another embodiment.

Referring to FIG. 40, a projecting portion 4351 and a receiving portion 4361 of the rotating polygonal mirror 4300 according to another embodiment may be located on different reflecting surfaces.

In detail, a laser projected by the nodding mirror 122 may have a linear projection area and may be incident on the reflecting surface of the rotating polygonal mirror 4300. However, although not shown in FIG. 40, a laser projected by the nodding mirror 122 may have a surface-shaped projection area.

When a laser projected by the nodding mirror 122 has a linear projection area, the projecting portion 4351 of the rotating polygonal mirror 4300 may have a surface shape formed by connecting a linear group of dots, at which a projection area of the projected laser meets the rotating polygonal mirror 4300, in a rotational direction of the rotating polygonal mirror 4300. Accordingly, in this case, the projecting portion 4351 of the rotating polygonal mirror 4300 may be located on each reflecting surface as a surface shape having a normal line perpendicular to a rotating shaft of the rotating polygonal mirror 4300.

Also, since the rotating polygonal mirror 4300 rotates, the projecting portion 4351 of the rotating polygonal mirror 4300 may be located on a different reflecting surface according to a rotation angle of the rotating polygonal mirror 4300. For example, in the rotating polygonal mirror 4300 having four reflecting surfaces as shown in FIG. 40, when an angle, at which a laser projected by the nodding mirror 122 starts being incident on the first reflecting surface 4301 of the rotating polygonal mirror 4300, is referred to as an offset state, the projecting portion 4351 of the rotating polygonal mirror 4300 may be located in a surface shape on the first reflecting surface 4301 until the rotating polygonal mirror 4300 rotates by 90 degrees from the offset state. Also, the projecting portion 4351 of the rotating polygonal mirror 4300 may be located in a surface shape on a second reflecting surface 4302 until the rotating polygonal mirror 4300 rotates by 180 degrees from a state of rotating by 90 degrees on the basis of the offset state, may be located in a surface shape on a third reflecting surface 4303 until the rotating polygonal mirror 4300 rotates by 270 degrees from a state of rotating by 180 degrees, and may be located in a surface shape on a fourth reflecting surface 4304 until the rotating polygonal mirror 4300 rotates by 360 degrees from a state of rotating by 270 degrees.

Also, a laser, which is projected by the projecting portion 4351 of the rotating polygonal mirror 4300 toward a scanning area of the lidar device 100, may be reflected by an object present in the scanning area, and the laser reflected by the object may be reflected within a larger range than that of the projected laser. Accordingly, the laser reflected by the object may be parallel to the projected laser and may be received, in a larger range, by the lidar device 100.

Here, the laser reflected by the object may be transferred with a larger size than that of the rotating polygonal mirror 4300. However, the receiving portion 4361 of the rotating polygonal mirror 4300 is a portion for allowing the laser reflected by the object to be received by the sensor unit 130 and may be one portion smaller than the rotating polygonal mirror 4300.

Also, since the rotating polygonal mirror 4300 rotates, the receiving portion 4361 of the rotating polygonal mirror 4300 may be located on a different reflecting surface according to a rotation angle of the rotating polygonal mirror 4300. For example, in the rotating polygonal mirror 4300 having four reflecting surfaces as shown in FIG. 40, when the projecting portion 4351 is located on the first reflecting surface 4301 of the rotating polygonal mirror 4300, the receiving portion 4361 of the rotating polygonal mirror 4300 may be located on the fourth reflecting surface 4304. Also, when the projecting portion 4351 is located on the second reflecting surface 4302 of the rotating polygonal mirror 4300, the receiving portion 4361 of the rotating polygonal mirror 4300 may be located on the first reflecting surface 4301. When the projecting portion 4351 is located on the third reflecting surface 4303 of the rotating polygonal mirror 4300, the receiving portion 4361 of the rotating polygonal mirror 4300 may be located on the second reflecting surface 4302. When the projecting portion 4351 is located on the fourth reflecting surface 4304 of the rotating polygonal mirror 4300, the receiving portion 4361 of the rotating polygonal mirror 4300 may be located on the third reflecting surface 4303.

Accordingly, in a case in which the projecting portion 4351 and the receiving portion 4361 of the rotating polygonal mirror 4300 are located on adjacent reflecting surfaces and the number of reflecting surfaces of the rotating polygonal mirror 4300 is N, when the projecting portion 4351 of the rotating polygonal mirror 4300 is located on a first reflecting surface, the receiving portion 4361 of the rotating polygonal mirror 4300 may be located on an Nth reflecting surface, and when the projecting portion 4351 of the rotating polygonal mirror 4300 is located on an Mth reflecting surface (here, M is a natural number satisfying 1<M≤N), the receiving portion 4361 of the rotating polygonal mirror 4300 may be located on an M−1th reflecting surface.

However, although the projecting portion 4351 and the receiving portion 4361 of the rotating polygonal mirror 4300 have been described as being located on adjacent reflecting surfaces in FIG. 40, the projecting portion 4351 and the receiving portion 4361 of the rotating polygonal mirror 4300 may be located on the same reflecting surface or may be located on different reflecting surfaces which are not adjacent to each other.

Referring back to FIG. 40, when a laser projected by the nodding mirror 122 has a linear projection area, the projecting portion 4351 of the rotating polygonal mirror 4300 may have a surface shape formed by connecting a linear group of dots, at which a projection area of the projected laser meets the rotating polygonal mirror 4300, in a rotational direction of the rotating polygonal mirror 4300. Accordingly, a height of the projecting portion 4351 of the rotating polygonal mirror 4300 may be determined on the basis of a distance between the nodding mirror 122 and the rotating polygonal mirror 4300 and an angle from the nodding mirror 122 to the projection area.

Also, when a laser reflected by an object present in a scanning area of the lidar device 100 is transferred toward the sensor unit 130 through the rotating polygonal mirror 4300, a portion of the reflecting surface of the rotating polygonal mirror 4300 which reflects and transfers the laser toward the sensor unit 130 may be the receiving portion 4361. Also, a surface shape may be formed by connecting portions, which reflect and transfer the laser toward the sensor unit 130, in the rotational direction of the rotating polygonal mirror 4300. Accordingly, the height of the receiving portion 4361 of the rotating polygonal mirror 4300 may be determined on the basis of a size of the sensor unit 130.

Here, since the height of the rotating polygonal mirror 4300 should be a higher one of the heights of the projecting portion 4351 and the receiving portion 4361, a height of the rotating polygonal mirror 4300 may be determined on the basis of a distance between the nodding mirror 122 and the rotating polygonal mirror 4300, the angle from the nodding mirror 122 to the projection area, and the size of the sensor unit 130.

Also, when the lidar device 100 further includes a condensing lens between the rotating polygonal mirror 4300 and the sensor unit 130, the receiving portion 4361 of the rotating polygonal mirror 4300 may be a portion formed by extending one portion of the reflecting surface which reflects and transfers a laser toward the condensing lens, in the rotational direction of the rotating polygonal mirror 4300. Accordingly, the receiving portion 4361 of the rotating polygonal mirror 4300 may be determined on the basis of a diameter of the condensing lens.

Here, since the height of the rotating polygonal mirror 4300 should be a higher one of the heights of the projecting portion 4351 and the receiving portion 4361, the height of the rotating polygonal mirror 4300 may be determined on the basis of a distance between the nodding mirror 122 and the rotating polygonal mirror 4300, the angle from the nodding mirror 122 to the projection area, and the diameter of the condensing lens.

Figure 41:
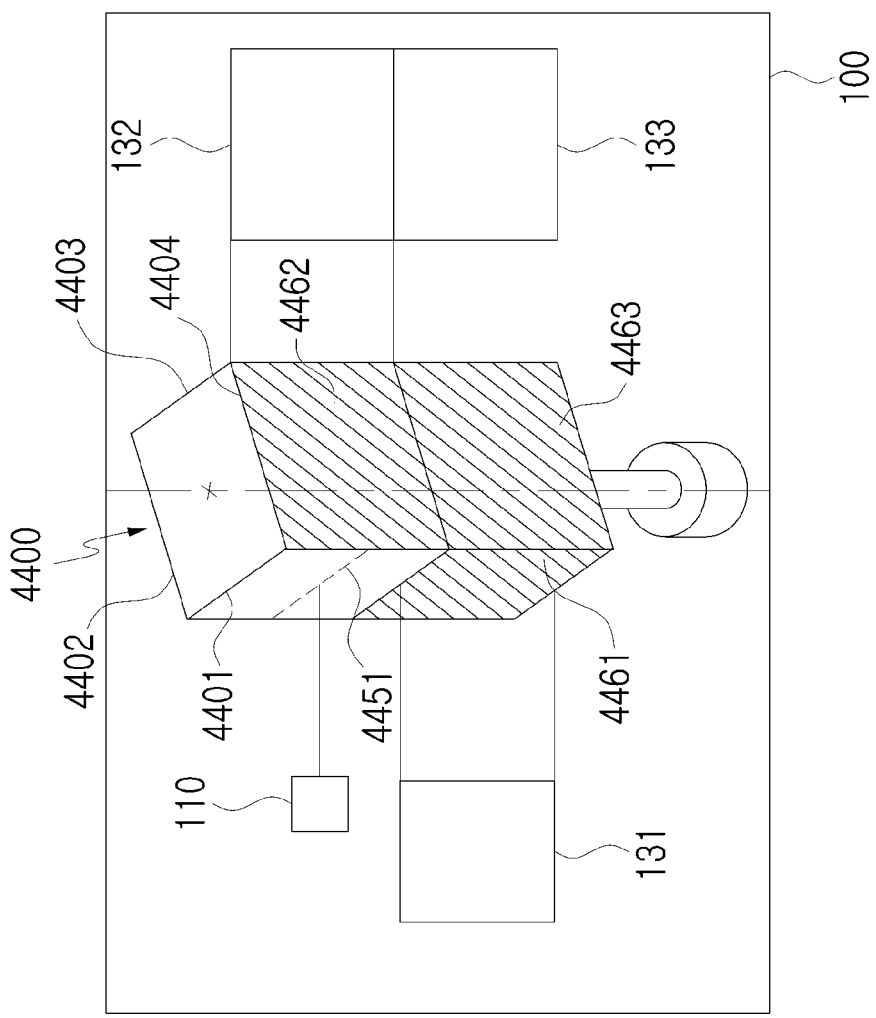
FIG. 41 is a view illustrating a projecting portion and a receiving portion of a rotating polygonal mirror of a lidar device including a plurality of sensor units according to one embodiment.

FIG. 41 is a view illustrating a projecting portion and a receiving portion of a rotating polygonal mirror of a lidar device including a plurality of sensor units according to one embodiment.

Referring to FIG. 41, the lidar device 100 according to one embodiment may include the laser emitting unit 110, a rotating polygonal mirror 4400, a first sensor unit 131, a second sensor unit 132, and a third sensor unit 133. Also, although the rotating polygonal mirror 4400 is shown as having four reflecting surfaces in FIG. 41, the number of reflecting surfaces of the rotating polygonal mirror 4400 is not limited thereto. Although the lidar device 100 is shown as including three sensor units in FIG. 41, the number of sensor units is not limited thereto.

Here, a laser emitted by the laser emitting unit 110 of the lidar device 100 may be projected toward a scanning area of the lidar device 100 through each reflecting surface of the rotating polygonal mirror 4400, and a reflecting surface used for projecting the laser toward the scanning area of the lidar device 100 may be changed as the rotating polygonal mirror 4400 rotates. For example, as shown in FIG. 41, a laser emitted by the laser emitting unit 110 may be projected toward the scanning area of the lidar device 100 through a first reflecting surface 4401 of the rotating polygonal mirror 4400.

Also, the laser projected toward the scanning area of the lidar device 100 may be reflected by an object which is present in the scanning area of the lidar device 100. Here, the laser reflected by the object may move toward the rotating polygonal mirror 4400, and the rotating polygonal mirror 4400 may receive and reflect so as to project the laser reflected by the object toward the first sensor unit 131, the second sensor unit 132, and the third sensor unit 133.

In detail, the laser reflected by the object may move toward the rotating polygonal mirror 4400, may be projected toward the first sensor unit 131 through the first reflecting surface 4401 of the rotating polygonal mirror 4400, and may be projected toward the second sensor unit 132 and the third sensor unit 133 through another reflecting surface of the rotating polygonal mirror 4400 instead of the first reflecting surface 4401. For example, as shown in FIG. 41, the laser reflected by the object may be projected toward the first sensor unit 131 through the first reflecting surface 4401 of the rotating polygonal mirror 4400 and may be projected toward the second sensor unit 132 and the third sensor unit 133 through a fourth reflecting surface 4404 of the rotating polygonal mirror 4400.

Referring back to FIG. 41, the rotating polygonal mirror 4400 according to one embodiment may include a projecting portion 4451, a first receiving portion 4461, a second receiving portion 4462, and a third receiving portion 4463. Here, the first receiving portion 4461 may mean a portion of a reflecting surface of the rotating polygonal mirror 4400 which reflects and transfers a laser to the first sensor unit 131. The second receiving portion 4462 may mean a portion of the reflecting surface of the rotating polygonal mirror 4400 which reflects and transfers a laser to the second sensor unit 132. The third receiving portion 4463 may mean a portion of the reflecting surface of the rotating polygonal mirror 4400 which reflects and transfers a laser to the third sensor unit 133.

In detail, a laser emitted by the laser emitting unit 110 may have a dot-shaped projection area and may be incident on the reflecting surface of the rotating polygonal mirror 4400. However, although not shown in FIG. 41, the laser emitted by the laser emitting unit 110 may have a linear or surface-shaped projection area.

When the laser emitted by the laser emitting unit 110 has a dot-shaped projection area, the projecting portion 4451 in the rotating polygonal mirror 4400 may have a line shape formed by connecting dots, at which the projected laser meets the rotating polygonal mirror 4400, in a rotational direction of the rotating polygonal mirror 4400. Accordingly, in this case, the projecting portion 4451 of the rotating polygonal mirror 4400 may be located on each reflecting surface as a linear shape in a direction perpendicular to a rotating shaft of the rotating polygonal mirror 4400.

Also, since the rotating polygonal mirror 4400 rotates, the projecting portion 4451 of the rotating polygonal mirror 4400 may be located on a different reflecting surface according to a rotation angle of the rotating polygonal mirror 4400. For example, in the rotating polygonal mirror 4400 having four reflecting surfaces as shown in FIG. 41, when an angle at which a laser emitted by the laser emitting unit 110 starts being incident on the first reflecting surface 4401 of the rotating polygonal mirror 4400 is referred to as an offset state, the projecting portion 4451 of the rotating polygonal mirror 4400 may be located in a linear shape on the first reflecting surface 4401 until the rotating polygonal mirror 4400 rotates by 90 degrees from the offset state. Also, the projecting portion 4451 of the rotating polygonal mirror 4400 may be located in a linear shape on a second reflecting surface 4402 until the rotating polygonal mirror 4400 rotates by 180 degrees from a state of rotating by 90 degrees on the basis of the offset state, may be located in a linear shape on a third reflecting surface 4403 until the rotating polygonal mirror 4300 rotates by 270 degrees from a state of rotating by 180 degrees, and may be located in a linear shape on the fourth reflecting surface 4404 until the rotating polygonal mirror 4400 rotates by 360 degrees from a state of rotating by 270 degrees.

Also, a laser, which is emitted by the projecting portion 4451 of the rotating polygonal mirror 4400 toward a scanning area of the lidar device 100, may be reflected by an object present in the scanning area, and the laser reflected by the object may be reflected within a larger range than that of the projected laser. Accordingly, the laser reflected by the object may be parallel to the projected laser and may be received, in a larger range, by the lidar device 100.

Here, the first receiving portion 4461 of the rotating polygonal mirror 4400 may be located on the same reflecting surface on which the projecting portion 4451 is located, and the second receiving portion 4462 and the third receiving portion 4463 of the rotating polygonal mirror 4400 may be located on a different reflecting surface from the reflecting surface on which the projecting portion 4451 is located.

Also, since the rotating polygonal mirror 4400 rotates, the first receiving portion 4461, the second receiving portion 4462, and the third receiving portion 4463 of the rotating polygonal mirror 4400 may be located on different reflecting surfaces according to a rotation angle of the rotating polygonal mirror 4400. For example, in the rotating polygonal mirror 4400 having four reflecting surfaces as shown in FIG. 41, when the projecting portion 4451 of the rotating polygonal mirror 4400 is located on the first reflecting surface 4401, the first receiving portion 4461 of the rotating polygonal mirror 4400 may be located on the first reflecting surface 4401 and the second receiving portion 4462 and the third receiving portion 4463 of the rotating polygonal mirror 4400 may be located on the fourth reflecting surface 4404 of the rotating polygonal mirror 4400. Also, when the projecting portion 4451 of the rotating polygonal mirror 4400 is located on the second reflecting surface 4402, the first receiving portion 4461 of the rotating polygonal mirror 4400 may be located on the second reflecting surface 4402 and the second receiving portion 4462 and the third receiving portion 4463 of the rotating polygonal mirror 4400 may be located on the first reflecting surface 4401 of the rotating polygonal mirror 4400. Also, when the projecting portion 4451 of the rotating polygonal mirror 4400 is located on the third reflecting surface 4403, the first receiving portion 4461 of the rotating polygonal mirror 4400 may be located on the third reflecting surface 4403 and the second receiving portion 4462 and the third receiving portion 4463 of the rotating polygonal mirror 4400 may be located on the second reflecting surface 4402 of the rotating polygonal mirror 4400. Also, when the projecting portion 4451 of the rotating polygonal mirror 4400 is located on the fourth reflecting surface 4404, the first receiving portion 4461 of the rotating polygonal mirror 4400 may be located on the fourth reflecting surface 4404 and the second receiving portion 4462 and the third receiving portion 4463 of the rotating polygonal mirror 4400 may be located on the third reflecting surface 4403 of the rotating polygonal mirror 4400.

Accordingly, in a case in which a reflecting surface, on which the projecting portion 4451 and the first receiving portion 4461 of the rotating polygonal mirror 4400 are located, and a reflecting surface, on which the second receiving portion 4462 and the third receiving portion 4463 are located, are adjacent to each other and the number of reflecting surfaces of the rotating polygonal mirror 4400 is N, when the projecting portion 4451 and the first receiving portion 4461 of the rotating polygonal mirror 4400 are located on a first reflecting surface, the second receiving portion 4462 and the third receiving portion 4463 of the rotating polygonal mirror 4400 may be located on an Nth reflecting surface, and when the projecting portion 4451 and the first receiving portion 4461 of the rotating polygonal mirror 4400 are located on an Mth reflecting surface (here, M is a natural number satisfying 1<M≤N), the second receiving portion 4462 and the third receiving portion 4463 of the rotating polygonal mirror 4400 may be located on an M−1th reflecting surface.

However, although it has been described with reference to FIG. 41 that the reflecting surface, on which the projecting portion 4451 and the first receiving portion 4461 of the rotating polygonal mirror 4400 are located, and the reflecting surface, on which the second receiving portion 4462 and the third receiving portion 4463 of the rotating polygonal mirror 4400 are located, are adjacent to each other, the reflecting surface, on which the projecting portion 4451 and the first receiving portion 4461 of the rotating polygonal mirror 4400 are located, and the reflecting surface, on which the second receiving portion 4462 and the third receiving portion 4463 of the rotating polygonal mirror 4400 are located, may not be adjacent to each other.

Also, here, the projecting portion 4451 and the first receiving portion 4461 may be located on the same reflecting surface and may be set while being divided on the basis of a first virtual cross section perpendicular to a rotating shaft of the rotating polygonal mirror 4400.

Also, the second receiving portion 4462 and the third receiving portion 4463 may be located on the same reflecting surface and may be set while being divided on the basis of a second virtual cross section perpendicular to the rotating shaft of the rotating polygonal mirror 4400.

Here, the first virtual cross section and the second virtual cross section are shown as being at the same position in FIG. 41 but are not limited thereto and may be at different positions.

Also, any one of the projecting portion 4451 and the first receiving portion 4461 may be set on top on the basis of the first virtual cross section. Here, another may be set on bottom on the basis of the first virtual cross section.

Also, any one of the second receiving portion 4462 and the third receiving portion 4463 may be set on top on the basis of the second virtual cross section. Here, another may be set on bottom on the basis of the second virtual cross section.

Referring back to FIG. 41, when a laser emitted by the laser emitting unit 110 has a dot-shaped projection area, the projecting portion 4451 in the rotating polygonal mirror 4400 may have a line shape formed by connecting dots, at which the emitted laser meets the rotating polygonal mirror 4400, in a rotational direction of the rotating polygonal mirror 4400. Accordingly, a height of the projecting portion 4451 of the rotating polygonal mirror 4400 may be determined on the basis of a diameter of the laser emitted by the laser emitting unit 110.

Also, when a laser reflected by an object present in a scanning area of the lidar device 100 is transferred toward the first sensor unit 131, the second sensor unit 132, and the third sensor unit 133 through the rotating polygonal mirror 4400, a portion of a reflecting surface of the rotating polygonal mirror 4400 which reflects and transfers the laser toward the first sensor unit 131 may be the first receiving portion 4461, a portion thereof which reflects and transfers the laser toward the second sensor unit 132 may be the second receiving portion 4462, and a portion thereof which reflects and transfers the laser toward the third sensor unit 133 may be the third receiving portion 4463. Accordingly, a height of the first receiving portion 4461 of the rotating polygonal mirror 4400 may be determined on the basis of a size of the first sensor unit 131, a height of the second receiving portion 4462 of the rotating polygonal mirror 4400 may be determined on the basis of a size of the second sensor unit 132, and a height of the third receiving portion 4463 of the rotating polygonal mirror 4400 may be determined on the basis of a size of the third sensor unit 133.

Here, a height of the rotating polygonal mirror 4400 may be a higher one of a height, which is obtained by adding the heights of the projecting portion 4451 and the first receiving portion 4461, and a height, which is obtained by adding the heights of the second receiving portion 4462 and the third receiving portion 4463.

Also, when the lidar device 100 further includes first, second, and third condensing lenses disposed between the rotating polygonal mirror 4400 and the sensor units 131, 132, and 133, the first receiving portion 4461, the second receiving portion 4462, and the third receiving portion 4463 of the rotating polygonal mirror 4400 may be determined on the basis of diameters of the first, second, and third condensing lenses.

Figure 42:
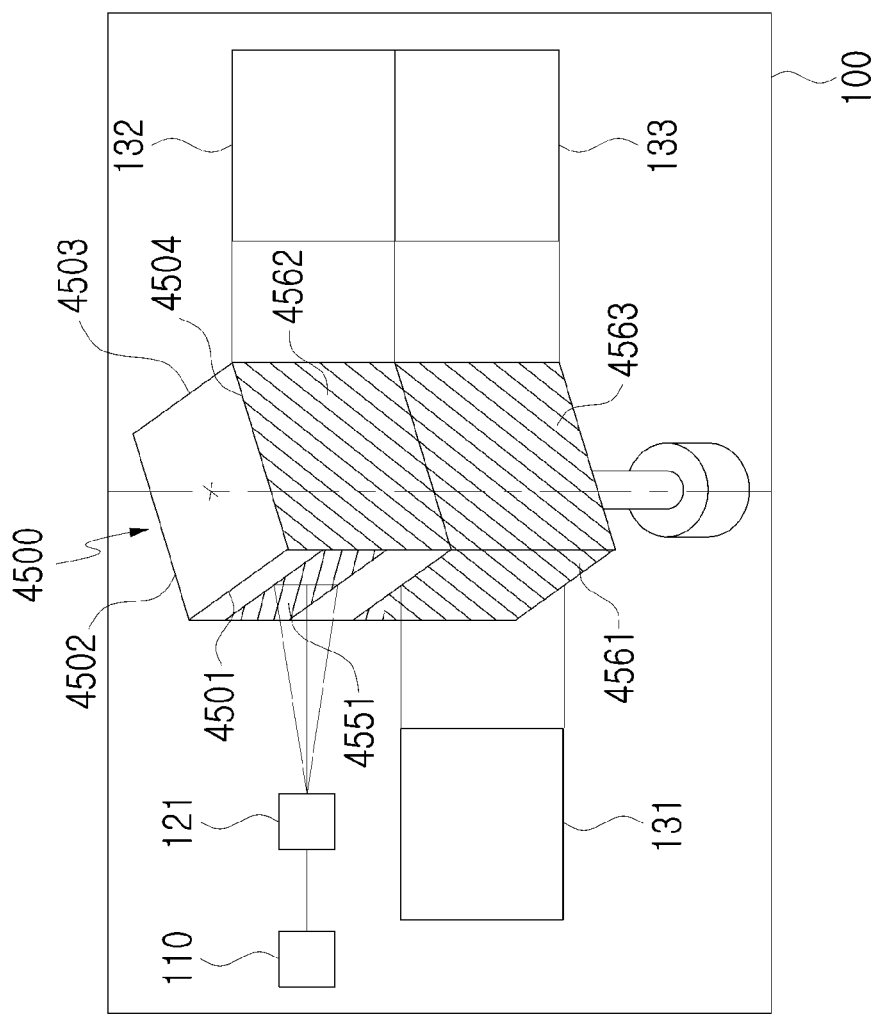
FIG. 42 is a view illustrating a projecting portion and a receiving portion of a rotating polygonal mirror of the lidar device including a plurality of sensor units according to another embodiment.

FIG. 42 is a view illustrating a projecting portion and a receiving portion of a rotating polygonal mirror of the lidar device including a plurality of sensor units according to another embodiment.

Referring to FIG. 42, the lidar device 100 according to one embodiment may include the laser emitting unit 110, the first scanning unit 121, a rotating polygonal mirror 4500, the first sensor unit 131, the second sensor unit 132, and the third sensor unit 133. Also, although the rotating polygonal mirror 4500 is shown as having four reflecting surfaces in FIG. 42, the number of reflecting surfaces of the rotating polygonal mirror 4500 is not limited thereto. Although the lidar device 100 is shown as including three sensor units in FIG. 42, the number of sensor units is not limited thereto.

Here, a laser emitted by the laser emitting unit 110 of the lidar device 100 may be projected toward the rotating polygonal mirror 4500 through the first scanning unit 121, the laser projected by the first scanning unit 121 may be projected toward a scanning area of the lidar device 100 through each reflecting surface of the rotating polygonal mirror 4500, and a reflecting surface used for projecting a laser toward the scanning area of the lidar device 100 may vary as the rotating polygonal mirror 4500 rotates. For example, as shown in FIG. 42, a laser emitted by the first scanning unit 121 may be projected toward the scanning area of the lidar device 100 through a first reflecting surface 4501 of the rotating polygonal mirror 4500.

Also, the laser projected toward the scanning area of the lidar device 100 may be reflected by an object which is present in the scanning area of the lidar device 100. Here, the laser reflected by the object may move toward the rotating polygonal mirror 4500, and the rotating polygonal mirror 4500 may receive and reflect so as to project the laser reflected by the object toward the first sensor unit 131, the second sensor unit 132, and the third sensor unit 133.

In detail, the laser reflected by the object may move toward the rotating polygonal mirror 4500, may be projected toward the first sensor unit 131 through the first reflecting surface 4501 of the rotating polygonal mirror 4500, and may be projected toward the second sensor unit 132 and the third sensor unit 133 through another reflecting surface of the rotating polygonal mirror 4500 instead of the first reflecting surface 4501. For example, as shown in FIG. 42, the laser reflected by the object may be projected toward the first sensor unit 131 through the first reflecting surface 4501 of the rotating polygonal mirror 4500 and may be projected toward the second sensor unit 132 and the third sensor unit 133 through a fourth reflecting surface 4504 of the rotating polygonal mirror 4500.

Referring back to FIG. 42, the rotating polygonal mirror 4500 according to one embodiment may include a projecting portion 4551, a first receiving portion 4561, a second receiving portion 4562, and a third receiving portion 4563. Here, the first receiving portion 4561 may mean a portion of a reflecting surface of the rotating polygonal mirror 4500 which reflects and transfers a laser to the first sensor unit 131. The second receiving portion 4562 may mean a portion of the reflecting surface of the rotating polygonal mirror 4500 which reflects and transfers a laser to the second sensor unit 132. The third receiving portion 4563 may mean a portion of the reflecting surface of the rotating polygonal mirror 4500 which reflects and transfers a laser to the third sensor unit 133.

In detail, a laser projected by the first scanning unit 121 may have a linear projection area and may be incident on the reflecting surface of the rotating polygonal mirror 4500. However, although not shown in FIG. 42, a laser projected by the first scanning unit 121 may have a surface-shaped projection area.

When the laser projected by the first scanning unit 121 has a linear projection area, the projecting portion 4551 of the rotating polygonal mirror 4500 may have a surface shape formed by connecting a linear group of dots, at which the projected laser meets the rotating polygonal mirror 4500, in a rotational direction of the rotating polygonal mirror 4500. Accordingly, in this case, the projecting portion 4551 of the rotating polygonal mirror 4500 may be located on each reflecting surface as a surface shape having a normal line perpendicular to a rotating shaft of the rotating polygonal mirror 4500.

Also, since the rotating polygonal mirror 4500 rotates, the projecting portion 4551 of the rotating polygonal mirror 4500 may be located on a different reflecting surface according to a rotation angle of the rotating polygonal mirror 4500. For example, in the rotating polygonal mirror 4500 having four reflecting surfaces as shown in FIG. 42, when an angle, at which a laser emitted by the first scanning unit 121 starts being incident on the first reflecting surface 4501 of the rotating polygonal mirror 4500, is referred to as an offset state, the projecting portion 4551 of the rotating polygonal mirror 4500 may be located in a surface shape on the first reflecting surface 4501 until the rotating polygonal mirror 4500 rotates by 90 degrees from the offset state. Also, the projecting portion 4551 of the rotating polygonal mirror 4500 may be located in a surface shape on a second reflecting surface 4502 until the rotating polygonal mirror 4500 rotates by 180 degrees from a state of rotating by 90 degrees on the basis of the offset state, may be located in a surface shape on a third reflecting surface 4503 until the rotating polygonal mirror 4500 rotates by 270 degrees from a state of rotating by 180 degrees, and may be located in a surface shape on the fourth reflecting surface 4504 until the rotating polygonal mirror 4500 rotates by 360 degrees from a state of rotating by 270 degrees.

Also, a laser, which is projected by the projecting portion 4551 of the rotating polygonal mirror 4500 toward a scanning area of the lidar device 100, may be reflected by an object present in the scanning area, and the laser reflected by the object may be reflected within a larger range than that of the projected laser. Accordingly, the laser reflected by the object may be parallel to the projected laser and may be received, in a larger range, by the lidar device 100.

Here, the first receiving portion 4561 of the rotating polygonal mirror 4500 may be located on the same reflecting surface on which the projecting portion 4551 is located, and the second receiving portion 4562 and the third receiving portion 4563 of the rotating polygonal mirror 4500 may be located on a different reflecting surface from the reflecting surface on which the projecting portion 4551 is located.

Also, since the rotating polygonal mirror 4500 rotates, the first receiving portion 4561, the second receiving portion 4562, and the third receiving portion 4563 of the rotating polygonal mirror 4500 may be located on different reflecting surfaces according to a rotation angle of the rotating polygonal mirror 4500. For example, in the rotating polygonal mirror 4500 having four reflecting surfaces as shown in FIG. 42, when the projecting portion 4551 of the rotating polygonal mirror 4500 is located on the first reflecting surface 4501, the first receiving portion 4561 of the rotating polygonal mirror 4500 may be located on the first reflecting surface 4501 and the second receiving portion 4562 and the third receiving portion 4563 of the rotating polygonal mirror 4500 may be located on the fourth reflecting surface 4504 of the rotating polygonal mirror 4500. Also, when the projecting portion 4551 of the rotating polygonal mirror 4500 is located on the second reflecting surface 4502, the first receiving portion 4561 of the rotating polygonal mirror 4500 may be located on the second reflecting surface 4502 and the second receiving portion 4562 and the third receiving portion 4563 of the rotating polygonal mirror 4500 may be located on the first reflecting surface 4501 of the rotating polygonal mirror 4500. Also, when the projecting portion 4551 of the rotating polygonal mirror 4500 is located on the third reflecting surface 4503, the first receiving portion 4561 of the rotating polygonal mirror 4500 may be located on the third reflecting surface 4503 and the second receiving portion 4562 and the third receiving portion 4563 of the rotating polygonal mirror 4500 may be located on the second reflecting surface 4502 of the rotating polygonal mirror 4500. Also, when the projecting portion 4551 of the rotating polygonal mirror 4500 is located on the fourth reflecting surface 4504, the first receiving portion 4561 of the rotating polygonal mirror 4500 may be located on the fourth reflecting surface 4504 and the second receiving portion 4562 and the third receiving portion 4563 of the rotating polygonal mirror 4500 may be located on the third reflecting surface 4503 of the rotating polygonal mirror 4500.

Accordingly, in a case in which a reflecting surface, on which the projecting portion 4551 and the first receiving portion 4561 of the rotating polygonal mirror 4500 are located, and a reflecting surface, on which the second receiving portion 4562 and the third receiving portion 4563 are located, are adjacent to each other and the number of reflecting surfaces of the rotating polygonal mirror 4500 is N, when the projecting portion 4551 and the first receiving portion 4561 of the rotating polygonal mirror 4500 are located on a first reflecting surface, the second receiving portion 4562 and the third receiving portion 4563 of the rotating polygonal mirror 4500 may be located on an Nth reflecting surface, and when the projecting portion 4551 and the first receiving portion 4561 of the rotating polygonal mirror 4500 are located on an Mth reflecting surface (here, M is a natural number satisfying 1<M≤N), the second receiving portion 4562 and the third receiving portion 4563 of the rotating polygonal mirror 4500 may be located on an M−1th reflecting surface.

However, although it has been described with reference to FIG. 42 that the reflecting surface, on which the projecting portion 4551 and the first receiving portion 4561 of the rotating polygonal mirror 4500 are located, and the reflecting surface, on which the second receiving portion 4562 and the third receiving portion 4563 of the rotating polygonal mirror 4500 are located, are adjacent to each other, the reflecting surface, on which the projecting portion 4551 and the first receiving portion 4561 of the rotating polygonal mirror 4500 are located, and the reflecting surface, on which the second receiving portion 4562 and the third receiving portion 4563 of the rotating polygonal mirror 4500 are located, may not be adjacent to each other.

Also, here, the projecting portion 4551 and the first receiving portion 4561 may be located on the same reflecting surface and may be set while being divided on the basis of a first virtual cross section perpendicular to a rotating shaft of the rotating polygonal mirror 4500.

Also, the second receiving portion 4562 and the third receiving portion 4563 may be located on the same reflecting surface and may be set while being divided on the basis of a second virtual cross section perpendicular to the rotating shaft of the rotating polygonal mirror 4500.

Here, the first virtual cross section and the second virtual cross section are shown as being at the same position in FIG. 42 but are not limited thereto and may be at different positions.

Also, any one of the projecting portion 4551 and the first receiving portion 4561 may be set on top on the basis of the first virtual cross section. Here, another may be set on bottom on the basis of the first virtual cross section.

Also, any one of the second receiving portion 4562 and the third receiving portion 4563 may be set on top on the basis of the second virtual cross section. Here, another may be set on bottom on the basis of the second virtual cross section.

Referring back to FIG. 42, when a laser projected by the first scanning unit 121 has a linear projection area, the projecting portion 4551 of the rotating polygonal mirror 4500 may have a surface shape formed by connecting a linear group of dots, at which a projection area of the projected laser meets the rotating polygonal mirror 4500, in a rotational direction of the rotating polygonal mirror 4500. Accordingly, a height of the projecting portion 4551 of the rotating polygonal mirror 4500 may be determined on the basis of a distance between the first scanning unit 121 and the rotating polygonal mirror 4500 and an angle from the first scanning unit 121 to the projection area.

Also, when a laser reflected by an object present in a scanning area of the lidar device 100 is transferred toward the first sensor unit 131, the second sensor unit 132, and the third sensor unit 133 through the rotating polygonal mirror 4500, a portion of a reflecting surface of the rotating polygonal mirror 4500 which reflects and transfers the laser toward the first sensor unit 131 may be the first receiving portion 4561, a portion thereof which reflects and transfers the laser toward the second sensor unit 132 may be the second receiving portion 4562, and a portion thereof which reflects and transfers the laser toward the third sensor unit 133 may be the third receiving portion 4563. Accordingly, a height of the first receiving portion 4561 of the rotating polygonal mirror 4500 may be determined on the basis of a size of the first sensor unit 131, a height of the second receiving portion 4562 of the rotating polygonal mirror 4500 may be determined on the basis of a size of the second sensor unit 132, and a height of the third receiving portion 4563 of the rotating polygonal mirror 4500 may be determined on the basis of a size of the third sensor unit 133.

Here, a height of the rotating polygonal mirror 4500 may be a higher one of a height, which is obtained by adding the heights of the projecting portion 4551 and the first receiving portion 4561, and a height, which is obtained by adding the heights of the second receiving portion 4562 and the third receiving portion 4563.

Also, when the lidar device 100 further includes first, second, and third condensing lenses disposed between the rotating polygonal mirror 4500 and the sensor units 131, 132, and 133, the first receiving portion 4561, the second receiving portion 4562, and the third receiving portion 4563 of the rotating polygonal mirror 4500 may be determined on the basis of diameters of the first, second, and third condensing lenses.

FIG. 43 is a view illustrating a projecting portion and a receiving portion of a rotating polygonal mirror of the lidar device including a plurality of sensor units according to another embodiment.

Referring to FIG. 43, the lidar device 100 according to one embodiment may include the laser emitting unit 110, the nodding mirror 122, a rotating polygonal mirror 4600, the first sensor unit 131, the second sensor unit 132, and the third sensor unit 133. Also, although the rotating polygonal mirror 4600 is shown as having four reflecting surfaces in FIG. 43, the number of reflecting surfaces of the rotating polygonal mirror 4600 is not limited thereto. Although the lidar device 100 is shown as including three sensor units in FIG. 43, the number of sensor units is not limited thereto.

Here, a laser emitted by the laser emitting unit 110 of the lidar device 100 may be projected toward the rotating polygonal mirror 4600 through the nodding mirror 122, the laser projected by the nodding mirror 122 may be projected toward a scanning area of the lidar device 100 through each reflecting surface of the rotating polygonal mirror 4600, and a reflecting surface used for projecting a laser toward the scanning area of the lidar device 100 may vary as the rotating polygonal mirror 4600 rotates. For example, as shown in FIG. 43, a laser projected by the nodding mirror 122 may be projected toward the scanning area of the lidar device 100 through a first reflecting surface 4601 of the rotating polygonal mirror 4600.

Also, the laser projected toward the scanning area of the lidar device 100 may be reflected by an object which is present in the scanning area of the lidar device 100. Here, the laser reflected by the object may move toward the rotating polygonal mirror 4600, and the rotating polygonal mirror 4600 may receive and reflect so as to project the laser reflected by the object toward the first sensor unit 131, the second sensor unit 132, and the third sensor unit 133.

In detail, the laser reflected by the object may move toward the rotating polygonal mirror 4600, may be projected toward the first sensor unit 131 through the first reflecting surface 4601 of the rotating polygonal mirror 4600, and may be projected toward the second sensor unit 132 and the third sensor unit 133 through another reflecting surface of the rotating polygonal mirror 4600 instead of the first reflecting surface 4601. For example, as shown in FIG. 43, the laser reflected by the object may be projected toward the first sensor unit 131 through the first reflecting surface 4601 of the rotating polygonal mirror 4600 and may be projected toward the second sensor unit 132 and the third sensor unit 133 through a fourth reflecting surface 4604 of the rotating polygonal mirror 4600.

Referring back to FIG. 43, the rotating polygonal mirror 4600 according to one embodiment may include a projecting portion 4651, a first receiving portion 4661, a second receiving portion 4662, and a third receiving portion 4663. Here, the first receiving portion 4661 may mean a portion of a reflecting surface of the rotating polygonal mirror 4600 which reflects and transfers a laser to the first sensor unit 131. The second receiving portion 4662 may mean a portion of the reflecting surface of the rotating polygonal mirror 4600 which reflects and transfers a laser to the second sensor unit 132. The third receiving portion 4663 may mean a portion of the reflecting surface of the rotating polygonal mirror 4600 which reflects and transfers a laser to the third sensor unit 133.

In detail, a laser projected by the nodding mirror 122 may have a linear projection area and may be incident on the reflecting surface of the rotating polygonal mirror 4600. However, although not shown in FIG. 43, a laser projected by the nodding mirror 122 may have a surface-shaped projection area.

When a laser projected by the nodding mirror 122 has a linear projection area, the projecting portion 4651 of the rotating polygonal mirror 4600 may have a surface shape formed by connecting a linear group of dots, at which the projected laser meets the rotating polygonal mirror 4600, in a rotational direction of the rotating polygonal mirror 4600. Accordingly, in this case, the projecting portion 4651 of the rotating polygonal mirror 4600 may be located on each reflecting surface as a surface shape having a normal line perpendicular to a rotating shaft of the rotating polygonal mirror 4600.

Also, since the rotating polygonal mirror 4600 rotates, the projecting portion 4651 of the rotating polygonal mirror 4600 may be located on a different reflecting surface according to a rotation angle of the rotating polygonal mirror 4600. For example, in the rotating polygonal mirror 4600 having four reflecting surfaces as shown in FIG. 43, when an angle, at which a laser emitted by the nodding mirror 122 starts being incident on the first reflecting surface 4601 of the rotating polygonal mirror 4600, is referred to as an offset state, the projecting portion 4651 of the rotating polygonal mirror 4600 may be located in a surface shape on the first reflecting surface 4601 until the rotating polygonal mirror 4600 rotates by 90 degrees from the offset state. Also, the projecting portion 4651 of the rotating polygonal mirror 4600 may be located in a surface shape on a second reflecting surface 4602 until the rotating polygonal mirror 4600 rotates by 180 degrees from a state of rotating by 90 degrees on the basis of the offset state, may be located in a surface shape on a third reflecting surface 4603 until the rotating polygonal mirror 4600 rotates by 270 degrees from a state of rotating by 180 degrees, and may be located in a surface shape on the fourth reflecting surface 4604 until the rotating polygonal mirror 4600 rotates by 360 degrees from a state of rotating by 270 degrees.

Also, a laser, which is projected by the projecting portion 4651 of the rotating polygonal mirror 4600 toward a scanning area of the lidar device 100, may be reflected by an object present in the scanning area, and the laser reflected by the object may be reflected within a larger range than that of the emitted laser. Accordingly, the laser reflected by the object may be parallel to the emitted laser and may be received, in a larger range, by the lidar device.

Here, the first receiving portion 4661 of the rotating polygonal mirror 4600 may be located on the same reflecting surface on which the projecting portion 4651 is located, and the second receiving portion 4662 and the third receiving portion 4663 of the rotating polygonal mirror 4600 may be located on a different reflecting surface from the reflecting surface on which the projecting portion 4651 is located.

Also, since the rotating polygonal mirror 4600 rotates, the first receiving portion 4661, the second receiving portion 4662, and the third receiving portion 4663 of the rotating polygonal mirror 4600 may be located on different reflecting surfaces according to a rotation angle of the rotating polygonal mirror 4600. For example, in the rotating polygonal mirror 4600 having four reflecting surfaces as shown in FIG. 43, when the projecting portion 4651 of the rotating polygonal mirror 4600 is located on the first reflecting surface 4601, the first receiving portion 4661 of the rotating polygonal mirror 4600 may be located on the first reflecting surface 4601 and the second receiving portion 4662 and the third receiving portion 4663 of the rotating polygonal mirror 4600 may be located on the fourth reflecting surface 4604 of the rotating polygonal mirror 4600. Also, when the projecting portion 4651 of the rotating polygonal mirror 4600 is located on the second reflecting surface 4602, the first receiving portion 4661 of the rotating polygonal mirror 4600 may be located on the second reflecting surface 4602 and the second receiving portion 4662 and the third receiving portion 4663 of the rotating polygonal mirror 4600 may be located on the first reflecting surface 4601 of the rotating polygonal mirror 4600. Also, when the projecting portion 4651 of the rotating polygonal mirror 4600 is located on the third reflecting surface 4603, the first receiving portion 4661 of the rotating polygonal mirror 4600 may be located on the third reflecting surface 4603 and the second receiving portion 4662 and the third receiving portion 4663 of the rotating polygonal mirror 4600 may be located on the second reflecting surface 4602 of the rotating polygonal mirror 4600. Also, when the projecting portion 4651 of the rotating polygonal mirror 4600 is located on the fourth reflecting surface 4604, the first receiving portion 4661 of the rotating polygonal mirror 4600 may be located on the fourth reflecting surface 4604 and the second receiving portion 4662 and the third receiving portion 4663 of the rotating polygonal mirror 4600 may be located on the third reflecting surface 4603 of the rotating polygonal mirror 4600.

Accordingly, in a case in which a reflecting surface, on which the projecting portion 4651 and the first receiving portion 4661 of the rotating polygonal mirror 4600 are located, and a reflecting surface, on which the second receiving portion 4662 and the third receiving portion 4663 are located, are adjacent to each other and the number of reflecting surfaces of the rotating polygonal mirror 4600 is N, when the projecting portion 4651 and the first receiving portion 4661 of the rotating polygonal mirror 4600 are located on a first reflecting surface, the second receiving portion 4662 and the third receiving portion 4663 of the rotating polygonal mirror 4600 may be located on an Nth reflecting surface, and when the projecting portion 4651 and the first receiving portion 4661 of the rotating polygonal mirror 4600 are located on an Mth reflecting surface (here, M is a natural number satisfying 1<M≤N), the second receiving portion 4662 and the third receiving portion 4663 of the rotating polygonal mirror 4600 may be located on an M−1th reflecting surface.

However, although it has been described with reference to FIG. 43 that the reflecting surface, on which the projecting portion 4651 and the first receiving portion 4661 of the rotating polygonal mirror 4600 are located, and the reflecting surface, on which the second receiving portion 4662 and the third receiving portion 4663 of the rotating polygonal mirror 4600 are located, are adjacent to each other, the reflecting surface, on which the projecting portion 4651 and the first receiving portion 4661 of the rotating polygonal mirror 4600 are located, and the reflecting surface, on which the second receiving portion 4662 and the third receiving portion 4663 of the rotating polygonal mirror 4600 are located, may not be adjacent to each other.

Also, here, the projecting portion 4651 and the first receiving portion 4661 may be located on the same reflecting surface and may be set while being divided on the basis of a first virtual cross section perpendicular to a rotating shaft of the rotating polygonal mirror 4600.

Also, the second receiving portion 4662 and the third receiving portion 4663 may be located on the same reflecting surface and may be set while being divided on the basis of a second virtual cross section perpendicular to the rotating shaft of the rotating polygonal mirror 4600.

Here, the first virtual cross section and the second virtual cross section are shown as being at the same position in FIG. 43 but are not limited thereto and may be at different positions.

Also, any one of the projecting portion 4651 and the first receiving portion 4661 may be set on top on the basis of the first virtual cross section. Here, another may be set on bottom on the basis of the first virtual cross section.

Also, any one of the second receiving portion 4662 and the third receiving portion 4663 may be set on top on the basis of the second virtual cross section. Here, another may be set on bottom on the basis of the second virtual cross section.

Referring back to FIG. 43, when a laser projected by the nodding mirror 122 has a linear projection area, the projecting portion 4651 of the rotating polygonal mirror 4600 may have a surface shape formed by connecting a linear group of dots, at which a projection area of the projected laser meets the rotating polygonal mirror 4600, in a rotational direction of the rotating polygonal mirror 4600. Accordingly, a height of the projecting portion 4651 of the rotating polygonal mirror 4600 may be determined on the basis of a distance between the nodding mirror 122 and the rotating polygonal mirror 4600 and an angle from the nodding mirror 122 to the projection area.

Also, when a laser reflected by an object present in a scanning area of the lidar device 100 is transferred toward the first sensor unit 131, the second sensor unit 132, and the third sensor unit 133 through the rotating polygonal mirror 4600, a portion of a reflecting surface of the rotating polygonal mirror 4600 which reflects and transfers the laser toward the first sensor unit 131 may be the first receiving portion 4661, a portion thereof which reflects and transfers the laser toward the second sensor unit 132 may be the second receiving portion 4662, and a portion thereof which reflects and transfers the laser toward the third sensor unit 133 may be the third receiving portion 4663. Accordingly, a height of the first receiving portion 4661 of the rotating polygonal mirror 4600 may be determined on the basis of a size of the first sensor unit 131, a height of the second receiving portion 4662 may be determined on the basis of a size of the second sensor unit 132, and a height of the third receiving portion 4663 may be determined on the basis of a size of the third sensor unit 133.

Here, a height of the rotating polygonal mirror 4600 may be a higher one of a height, which is obtained by adding the heights of the projecting portion 4651 and the first receiving portion 4661, and a height, which is obtained by adding the heights of the second receiving portion 4662 and the third receiving portion 4663.

Also, when the lidar device 100 further includes first, second, and third condensing lenses disposed between the rotating polygonal mirror 4600 and the sensor units 131, 132, and 133, the first receiving portion 4661, the second receiving portion 4662, and the third receiving portion 4663 of the rotating polygonal mirror 4600 may be determined on the basis of diameters of the first, second, and third condensing lenses.

However, projecting and receiving a laser has been described above with reference to the drawings as being performed using adjacent reflecting surfaces of a rotating polygonal mirror but is not limited thereto. FIG. 44 is a view illustrating a rotating polygonal mirror which projects and receives lasers using reflecting surfaces which are not adjacent to each other according to one embodiment. The lidar device, as shown in FIG. 44, may project and receive a laser by using reflecting surfaces of a rotating polygonal mirror 4700 which are not adjacent to each other, and positions of the reflecting surfaces for projecting and receiving the laser are not limited.

A method according to an embodiment may be embodied as a computer program command capable of being executed through a variety of computer means and being recorded in a computer-readable medium. The computer-readable medium may include a single, or a combination of, program command, data file, data structure, and the like. The program command recorded in the medium may be particularly designed for embodiments or may be well-known to those in the art of computer software to be used. Examples of a computer-readable recording medium include hardware devices particularly configured to store and perform program commands, such as a hard disk, a floppy disk, magnetic media such as a magnetic tape, optical media such as a compact disc read-only memory (CD-ROM) and a digital versatile disc (DVD), magneto-optical media such as a floptical disk, a ROM, a random-access memory (RAM), a flash memory, and the like. Examples of the program command include not only machine languages made by a compiler but also high-level language codes capable of being executed by a computer using an interpreter and the like. The hardware devices may be configured to operate as one or more software modules in order to perform operations of embodiments and vice versa.

According to one embodiment, performance of a lidar device may be improved by structurally solving a heat dissipation problem of the lidar device.

According to another embodiment, a measurable distance of a lidar device may be increased by increasing a gain of laser light reflected by an object through arrangement of components of the lidar device.

According to another embodiment, an object may be sensed using minimum power consumption by increasing a gain of laser light reflected by the object.

According to another embodiment, a lidar device may be miniaturized through arrangement of components of the lidar device.

According to another embodiment, heat of a lidar device may be dissipated by rotating a cooling fan using rotating force provided by a rotating polygonal mirror without an additional driving unit.

According to another embodiment, interference between laser beams may be minimized by separating a projecting portion, which is for projecting a laser to an object, from a receiving portion for receiving the laser reflected by the object among reflecting surfaces of a rotating polygonal mirror.

According to another embodiment, a distance of a long-range object may be obtained using minimum power consumption by using a plurality of lasers having different wavelengths.

Effects of the present disclosure will not be limited to the above-described effects, and unstated effects can be clearly understood by those skilled in the art through the specification and the attached drawings.

Although the limited embodiments have been described above with reference to the drawings, a variety of modifications and changes may be made by one of ordinary skill in the art from the above disclosure. For example, an adequate result may be achieved even when the above-described technologies are performed in a different sequence from the above-described method and/or the above-described components such as a system, a structure, a device, a circuit, and the like are coupled or combined in a different form from the above-described method or are replaced or substituted by other components or equivalents thereof.

Therefore, other implements, other embodiments, and equivalents of the claims will be included within the scope of the claims.

What is claimed is:

1. A light detection and ranging (lidar) device comprising:
   a laser emitting unit which emits a laser;
   a laser dissipation unit for dissipating waste heat generated by the laser emitting unit;
   a rotating polygonal mirror which has a polygonal cylinder shape with a though hole formed therein rotates along a rotational axis, reflects the laser emitted by the laser emitting unit toward an object, and is disposed in an area adjacent to the laser dissipation unit; and
   a cooling fan which is installed in the rotating polygonal mirror and generates an air flow which passes through the through hole and moves toward the laser dissipation unit.

2. The lidar device of claim 1, wherein the laser dissipation unit is disposed on the rotational axis of the rotating polygonal mirror.

3. The lidar device of claim 1, wherein the laser dissipation unit is inserted into the through hole.

4. The lidar device of claim 1, wherein the through hole has a cylindrical shape.

5. The lidar device of claim 1, wherein the cooling fan is coupled to the rotating polygonal mirror and integrally rotates with the rotating polygonal mirror along the rotational polygonal mirror.

6. The lidar device of claim 1, wherein the cooling fan is installed in the through hole.

7. The lidar device of claim 1, wherein the lidar device further comprising:
   a driving unit which provides a rotating force to the rotating polygonal mirror; and
   a rotating force transfer unit which transfers the rotating force provided by the driving unit to the cooling fan,
   wherein the cooling fan rotates along the rotational axis of the rotating polygonal mirror by using the transferred rotating force.

8. The lidar device of claim 7, wherein the cooling fan rotates in a direction opposite to that of the rotating polygonal mirror.

9. The lidar device of claim 1, wherein the lidar device further comprising:
   a driving unit which provides a rotating force to the rotating polygonal mirror; and
   wherein the cooling fan rotates using the provided rotating force, is coupled to the rotating polygonal mirror, and integrally rotates with the rotating polygonal mirror along the rotational axis of the rotating polygonal mirror.

10. The lidar device of claim 1, wherein the lidar device further comprising:

a driving unit which provides a rotating force to the rotating polygonal mirror;

wherein the driving unit controls a rotation speed of the rotating polygonal mirror as a temperature of the lidar device.

11. A light detection and ranging (lidar) device comprising:

a lower base having a flat plate shape;

an upper base disposed to face the lower base;

a laser emitting unit for emitting a laser;

a heat dissipating unit for dissipating heat generated from the laser emitting unit;

a rotating polygonal mirror which has a polygonal cylinder shape with a though hole formed therein rotates along a rotational axis, reflects the laser emitted by the laser emitting unit toward an object, and is disposed in an area adjacent to the laser dissipation unit; and a cooling fan which is installed in the rotating polygonal mirror and generates an air flow which passes through the through hole and moves toward the laser dissipation unit;

wherein the laser emitting unit is disposed on the upper base and the rotating polygonal mirror is disposed on the lower base.

12. The lidar device of claim 11, wherein the lower base comprise a hole through which an air flow generated by the cooling fan.

13. A rotating polygonal mirror which has a polygonal cylinder shape, rotates along a rotational axis, and reflects a laser provided from on side toward an object comprising:

a first surface which is parallel to the rotational axis;

a second surface which shares one side with the first surface and is parallel to the rotational axis;

a through hole which is formed in the rotating polygonal mirror, has a cylindrical shape, and has the rotational axis as a central axis; and a cooling fan which is installed in the through hole and generates an air flow which passes through the through hole.

14. The rotating polygonal mirror of claim 13, wherein an angle formed by the first surface and the second surface is at least 90 degrees or more.

15. The rotating polygonal mirror of claim 13, wherein the cooling fan integrally rotates with the first surface and the second surface.

16. The rotating polygonal mirror of claim 13, wherein the cooling fan rotates in a direction opposite to that of the first surface and the second surface.

* * * * *